(12) United States Patent  
Shahparnia et al.

(10) Patent No.: US 12,340,048 B2  
(45) Date of Patent: *Jun. 24, 2025

(54) TOUCH CONTROLLER ARCHITECTURE

(71) Applicant: Apple Inc., Cupertino, CA (US)

(72) Inventors: Shahrooz Shahparnia, Monte Sereno, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,934

(22) Filed: Jun. 15, 2023

(65) Prior Publication Data

US 2023/0325030 A1 Oct. 12, 2023

Related U.S. Application Data

(63) Continuation of application No. 16/953,303, filed on Nov. 19, 2020, now Pat. No. 11,687,192, which is a (Continued)

(51) Int. Cl.
*G06F 3/041* (2006.01)
*G06F 3/0354* (2013.01)
(Continued)

(52) U.S. Cl.
CPC .... *G06F 3/041661* (2019.05); *G06F 3/03545* (2013.01); *G06F 3/041* (2013.01);
(Continued)

(58) Field of Classification Search
CPC ........... G06F 3/041661; G06F 3/03545; G06F 3/041; G06F 3/0416; G06F 3/04162;
(Continued)

(56) References Cited

U.S. PATENT DOCUMENTS 3,462,692 A 8/1969 Bartlett
3,970,846 A 7/1976 Schofield et al.
(Continued)

FOREIGN PATENT DOCUMENTS

CN 1243282 A 2/2000
CN 1278348 A 12/2000
(Continued)

OTHER PUBLICATIONS

Proximity definition (Year: 2014).*
(Continued)

*Primary Examiner* — Jeff Piziali
(74) *Attorney, Agent, or Firm* — Kubota & Basol LLP

(57) ABSTRACT

A touch controller that can configure touch circuitry according to a scan plan, which can define a sequence of scan events to be performed on a touch panel is disclosed. The touch controller can include a configurable transmit section to generate stimulation signals to drive the panel, a configurable receive section to receive and process touch signals from the panel, and a configurable memory to store the touch signals. The touch controller can also include a programmable scan engine to configure the transmit section, the receive section, and the memory according to the scan plan. The touch controller advantageously provides more robust and flexible touch circuitry to handle various types of touch events at the panel. An active stylus that can generate stimulation signals that can be detected by the touch controller during various touch events at the panel is also disclosed.

20 Claims, 20 Drawing Sheets

Related U.S. Application Data continuation of application No. 14/333,457, filed on Jul. 16, 2014, now Pat. No. 10,845,901.

(60) Provisional application No. 61/860,816, filed on Jul. 31, 2013.

(51) Int. Cl.
*G06F 3/044* (2006.01)
*G09G 3/36* (2006.01)

(52) U.S. Cl.
CPC ........ *G06F 3/0416* (2013.01); *G06F 3/04162* (2019.05); *G06F 3/044* (2013.01); *G06F 3/0441* (2019.05); *G06F 3/0442* (2019.05); *G06F 3/0443* (2019.05); *G09G 3/3648* (2013.01)

(58) Field of Classification Search
CPC ...... G06F 3/044; G06F 3/0441; G06F 3/0442; G06F 3/0443; G09G 3/3648
See application file for complete search history.

(56) References Cited

U.S. PATENT DOCUMENTS

| | | |
|---|---|---|
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Pauelus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday et al. |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Berkel et al. |
| 5,360,426 A | 11/1994 | Mueller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | Den et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | Mccartney et al. |

(56) References Cited

U.S. PATENT DOCUMENTS

| | | |
|---|---|---|
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,117 A | 5/2000 | Horie et al. |
| 6,061,177 A | 5/2000 | Fujimoto |
| 6,064,374 A | 5/2000 | Fukuzaki |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward et al. |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter et al. |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,454,482 B1 | 9/2002 | Silverbrook et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,642,238 B2 | 11/2003 | Hester, Jr. |
| 6,646,636 B1 | 11/2003 | Popovich et al. |
| 6,667,740 B2 | 12/2003 | Ely et al. |
| 6,679,702 B1 | 1/2004 | Rau |
| 6,680,880 B1 | 1/2004 | Ripoll-Ensenat et al. |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,754,472 B1 | 6/2004 | Williams et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | Den |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | Den et al. |
| 6,956,564 B1 | 10/2005 | Williams |
| 6,972,753 B1 | 12/2005 | Kimura et al. |
| 6,995,743 B2 | 2/2006 | Boer et al. |
| 7,006,080 B2 | 2/2006 | Gettemy |
| 7,009,663 B2 | 3/2006 | Abileah et al. |
| 7,015,833 B1 | 3/2006 | Ambuehl et al. |
| 7,015,894 B2 | 3/2006 | Morohoshi |
| 7,023,503 B2 | 4/2006 | Den |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth et al. |
| 7,372,455 B2 | 5/2008 | Perski et al. |
| 7,408,598 B2 | 8/2008 | Den et al. |

(56) References Cited

U.S. PATENT DOCUMENTS

| | | |
|---|---|---|
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Kalmanovich et al. |
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 | 4/2014 | Coulson et al. |
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 | 1/2015 | Harley et al. |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,201,523 B1 | 12/2015 | Hwang et al. |
| 9,310,923 B2 | 4/2016 | Krah et al. |
| 9,310,943 B1 | 4/2016 | Omelchuk et al. |
| 9,329,703 B2 | 5/2016 | Falkenburg et al. |
| 9,377,905 B1 | 6/2016 | Grivna et al. |
| 9,519,361 B2 | 12/2016 | Harley et al. |
| 9,557,845 B2 | 1/2017 | Shahparnia |
| 9,582,105 B2 | 2/2017 | Krah et al. |
| 9,652,090 B2 | 5/2017 | Tan et al. |
| 9,921,684 B2 | 3/2018 | Falkenburg et al. |
| 9,939,935 B2 | 4/2018 | Shahparnia |
| 10,048,775 B2 | 8/2018 | Shahparnia et al. |
| 10,061,449 B2 | 8/2018 | Pant et al. |
| 10,061,450 B2 | 8/2018 | Shahparnia et al. |
| 10,067,580 B2 | 9/2018 | Shahparnia |
| 10,067,618 B2 | 9/2018 | Verma et al. |
| 10,845,901 B2 * | 11/2020 | Shahparnia .......... G06F 3/03545 |
| 11,687,192 B2 * | 6/2023 | Shahparnia ....... G06F 3/041661 |
| | | 345/173 |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0103589 A1 | 6/2003 | Nohara et al. |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | Boer et al. |
| 2003/0156100 A1 | 8/2003 | Gettemy |
| 2003/0156230 A1 | 8/2003 | Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | Boer |
| 2003/0218116 A1 | 11/2003 | Boer |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | Boer et al. |
| 2004/0081205 A1 | 4/2004 | Coulson |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | Den et al. |
| 2005/0270590 A1 | 12/2005 | Izumi et al. |
| 2005/0275616 A1 | 12/2005 | Park et al. |
| 2005/0285985 A1 | 12/2005 | Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley et al. |
| 2006/0012580 A1 | 1/2006 | Perski et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0159478 A1 | 7/2006 | Kikuchi |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0217064 A1 | 9/2006 | Glass et al. |
| 2006/0249763 A1 | 11/2006 | Mochizuki et al. |

(56) References Cited

U.S. PATENT DOCUMENTS

| | | |
|---|---|---|
| 2006/0250381 A1 | 11/2006 | Geaghan |
| 2006/0279690 A1 | 12/2006 | Yu et al. |
| 2006/0284854 A1 | 12/2006 | Cheng et al. |
| 2007/0030258 A1 | 2/2007 | Pittel et al. |
| 2007/0062852 A1 | 3/2007 | Zachut et al. |
| 2007/0109239 A1 | 5/2007 | Den et al. |
| 2007/0109286 A1 | 5/2007 | Nakamura et al. |
| 2007/0131991 A1 | 6/2007 | Sugawa |
| 2007/0146349 A1 | 6/2007 | Errico et al. |
| 2007/0216905 A1 | 9/2007 | Han et al. |
| 2007/0229468 A1 | 10/2007 | Peng et al. |
| 2007/0279346 A1 | 12/2007 | Den et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | Abileah et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | Den et al. |
| 2008/0055507 A1 | 3/2008 | Den et al. |
| 2008/0062156 A1 | 3/2008 | Abileah et al. |
| 2008/0062157 A1 | 3/2008 | Abileah et al. |
| 2008/0062343 A1 | 3/2008 | Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | Den et al. |
| 2008/0129913 A1 | 6/2008 | Den et al. |
| 2008/0129914 A1 | 6/2008 | De et al. |
| 2008/0142280 A1 | 6/2008 | Yamamoto et al. |
| 2008/0158165 A1 | 7/2008 | Geaghan et al. |
| 2008/0158167 A1 | 7/2008 | Hotelling et al. |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0242346 A1 | 10/2008 | Rofougaran et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1* | 12/2008 | Krah ............ G06F 3/041 345/173 |
| 2008/0309628 A1 | 12/2008 | Krah et al. |
| 2008/0309631 A1 | 12/2008 | Westerman et al. |
| 2009/0000831 A1 | 1/2009 | Miller et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0140986 A1 | 6/2009 | Karkkainen et al. |
| 2009/0153152 A1 | 6/2009 | Maharyta et al. |
| 2009/0153525 A1 | 6/2009 | Chang |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1* | 1/2010 | Elias ............ G06F 3/0445 178/19.03 |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu et al. |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0127991 A1* | 5/2010 | Yee ............ G06V 40/28 382/209 |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | Den et al. |
| 2010/0309171 A1 | 12/2010 | Mo et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0322484 A1 | 12/2010 | Hama et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-David |
| 2011/0042152 A1 | 2/2011 | Wu |
| 2011/0043489 A1 | 2/2011 | Yoshimoto et al. |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0118030 A1 | 5/2011 | Walley et al. |
| 2011/0153263 A1 | 6/2011 | Oda et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0193776 A1 | 8/2011 | Oda et al. |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304583 A1 | 12/2011 | Kruglick |
| 2011/0304592 A1 | 12/2011 | Booth et al. |
| 2012/0013555 A1 | 1/2012 | Maeda et al. |
| 2012/0019488 A1 | 1/2012 | Mccarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0139865 A1 | 6/2012 | Krah et al. |
| 2012/0146958 A1 | 6/2012 | Oda et al. |
| 2012/0154295 A1 | 6/2012 | Hinckley et al. |
| 2012/0154324 A1 | 6/2012 | Wright et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |

(56) References Cited

U.S. PATENT DOCUMENTS

| | | |
|---|---|---|
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon et al. |
| 2012/0327041 A1 | 12/2012 | Harley et al. |
| 2012/0331546 A1 | 12/2012 | Falkenburg et al. |
| 2013/0021294 A1 | 1/2013 | Maharyta et al. |
| 2013/0027361 A1 | 1/2013 | Perski et al. |
| 2013/0033461 A1 | 2/2013 | Silverbrook |
| 2013/0069905 A1 | 3/2013 | Krah et al. |
| 2013/0076648 A1 | 3/2013 | Krah et al. |
| 2013/0088465 A1 | 4/2013 | Geller et al. |
| 2013/0100071 A1 | 4/2013 | Wright et al. |
| 2013/0106714 A1 | 5/2013 | Shahparnia et al. |
| 2013/0106722 A1 | 5/2013 | Shahparnia et al. |
| 2013/0113707 A1 | 5/2013 | Perski et al. |
| 2013/0113762 A1 | 5/2013 | Geaghan |
| 2013/0127757 A1 | 5/2013 | Mann et al. |
| 2013/0141342 A1 | 6/2013 | Bokma et al. |
| 2013/0155007 A1 | 6/2013 | Huang et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028577 A1 | 1/2014 | Krah et al. |
| 2014/0028607 A1 | 1/2014 | Tan et al. |
| 2014/0077827 A1 | 3/2014 | Seguine |
| 2014/0132556 A1 | 5/2014 | Huang et al. |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0184554 A1 | 7/2014 | Walley |
| 2014/0253462 A1 | 9/2014 | Hicks |
| 2014/0253469 A1 | 9/2014 | Hicks et al. |
| 2014/0267071 A1 | 9/2014 | Shahparnia |
| 2014/0267075 A1 | 9/2014 | Shahparnia et al. |
| 2014/0267184 A1 | 9/2014 | Bathiche et al. |
| 2014/0347311 A1 | 11/2014 | Joharapurkar et al. |
| 2014/0354555 A1 | 12/2014 | Shahparnia et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |
| 2015/0177868 A1 | 6/2015 | Morein et al. |
| 2015/0338950 A1 | 11/2015 | Ningrat et al. |
| 2015/0363012 A1 | 12/2015 | Sundara-Rajan et al. |
| 2016/0014598 A1 | 1/2016 | Westhues |
| 2016/0077667 A1 | 3/2016 | Chiang et al. |
| 2016/0162011 A1 | 6/2016 | Verma et al. |
| 2016/0162101 A1 | 6/2016 | Pant et al. |
| 2016/0162102 A1 | 6/2016 | Shahparnia et al. |
| 2016/0179281 A1 | 6/2016 | Krah et al. |
| 2016/0337496 A1 | 11/2016 | Jeganathan et al. |
| 2016/0357343 A1 | 12/2016 | Falkenburg et al. |
| 2016/0378220 A1 | 12/2016 | Westhues et al. |
| 2017/0097695 A1 | 4/2017 | Ribeiro et al. |
| 2017/0115816 A1 | 4/2017 | Chang |
| 2017/0344174 A1 | 11/2017 | Pant et al. |
| 2019/0095006 A1 | 3/2019 | Shahparnia et al. |
| 2021/0149561 A1 | 5/2021 | Shahparnia et al. |

FOREIGN PATENT DOCUMENTS

| | | |
|---|---|---|
| CN | 1343353 A | 4/2002 |
| CN | 1518723 A | 8/2004 |
| CN | 201329722 Y | 10/2009 |
| CN | 101393488 B | 10/2010 |
| CN | 201837984 U | 5/2011 |
| CN | 103019485 A | 4/2013 |
| CN | 103034358 A | 4/2013 |
| CN | 103257740 A | 8/2013 |
| DE | 3602796 A1 | 8/1987 |
| DE | 19720925 A1 | 12/1997 |
| EP | 0306596 A2 | 3/1989 |
| EP | 0426362 A2 | 5/1991 |
| EP | 0426469 A2 | 5/1991 |
| EP | 0572009 A1 | 12/1993 |
| EP | 0572182 B1 | 12/1993 |
| EP | 0491436 B1 | 9/1995 |
| EP | 0366913 B1 | 11/1995 |
| EP | 0464908 B1 | 9/1996 |
| EP | 0490683 B1 | 12/1996 |
| EP | 0509589 B1 | 1/1997 |
| EP | 0488455 B1 | 2/1997 |
| EP | 0762319 A2 | 3/1997 |
| EP | 0384509 B1 | 5/1997 |
| EP | 0770971 A2 | 5/1997 |
| EP | 0762319 A3 | 6/1997 |
| EP | 0545709 B1 | 11/1997 |
| EP | 0601837 B1 | 10/1998 |
| EP | 0587236 B1 | 4/1999 |
| EP | 0618527 B1 | 9/1999 |
| EP | 0962881 A2 | 12/1999 |
| EP | 1022675 A2 | 7/2000 |
| EP | 1128170 A1 | 8/2001 |
| EP | 0633542 B1 | 10/2001 |
| EP | 1884863 A1 | 2/2008 |
| EP | 2040149 A2 | 3/2009 |
| EP | 2172834 A2 | 4/2010 |
| EP | 2221659 A1 | 8/2010 |
| EP | 2660689 A1 | 11/2013 |
| JP | S5574635 A | 6/1980 |
| JP | S57203129 A | 12/1982 |
| JP | S60179823 A | 9/1985 |
| JP | S64-6927 U | 1/1989 |
| JP | S6440004 A | 2/1989 |
| JP | H01196620 A | 8/1989 |
| JP | H02182581 A | 7/1990 |
| JP | H02211421 A | 8/1990 |
| JP | H519233 A | 1/1993 |
| JP | H05173707 A | 7/1993 |
| JP | H05243547 A | 9/1993 |
| JP | H08166849 A | 6/1996 |
| JP | H091279 A | 1/1997 |
| JP | H09185457 A | 7/1997 |
| JP | H09231002 A | 9/1997 |
| JP | H09274537 A | 10/1997 |
| JP | H1027068 A | 1/1998 |
| JP | H1040004 A | 2/1998 |
| JP | H10133817 A | 5/1998 |
| JP | H10133819 A | 5/1998 |
| JP | H10186136 A | 7/1998 |
| JP | H10198515 A | 7/1998 |
| JP | H11110110 A | 4/1999 |
| JP | H11242562 A | 9/1999 |
| JP | 2000020241 A | 1/2000 |
| JP | 2000163031 A | 6/2000 |
| JP | 2002342033 A | 11/2002 |
| JP | 2005129948 A | 5/2005 |
| JP | 2005352490 A | 12/2005 |
| JP | 2009054141 A | 3/2009 |
| KR | 20130028360 A | 3/2013 |
| KR | 20130109207 A | 10/2013 |
| TW | 200743986 A | 12/2007 |
| TW | 200925944 A | 6/2009 |
| TW | 201115414 A | 5/2011 |
| TW | 201118682 A | 6/2011 |
| TW | 201324242 A | 6/2013 |
| TW | 201419103 A | 5/2014 |
| TW | 201504874 A | 2/2015 |
| WO | 9740488 A1 | 10/1997 |
| WO | 9921160 A1 | 4/1999 |
| WO | 9922338 A1 | 5/1999 |
| WO | 0145283 A1 | 6/2001 |
| WO | 2006104214 A1 | 10/2006 |
| WO | 2007145346 A1 | 12/2007 |
| WO | 2007145347 A1 | 12/2007 |
| WO | 2008018201 A1 | 2/2008 |
| WO | 2008044368 A1 | 4/2008 |
| WO | 2008044369 A1 | 4/2008 |

(56) References Cited

FOREIGN PATENT DOCUMENTS

| | | | |
|---|---|---|---|
| WO | 2008044370 A1 | 4/2008 | |
| WO | 2008044371 A1 | 4/2008 | |
| WO | 2008047677 A1 | 4/2008 | |
| WO | 2009081810 A1 | 7/2009 | |
| WO | 2009105115 A2 | 8/2009 | |
| WO | 2011008533 A2 | 1/2011 | |
| WO | 2012177567 A1 | 12/2012 | |
| WO | 2012177569 A2 | 12/2012 | |
| WO | 2012177571 A1 | 12/2012 | |
| WO | 2012177573 A2 | 12/2012 | |
| WO | 2012177569 A3 | 3/2013 | |
| WO | 2014018233 A1 | 1/2014 | |
| WO | 2014143430 A1 | 9/2014 | |
| WO | 2015017196 A1 | 2/2015 | |

OTHER PUBLICATIONS

Advisory Action received for U.S. Appl. No. 14/333,457, mailed on Jun. 7, 2019, 3 pages.
Corrected Notice of Allowance received for U.S. Appl. No. 14/333,382, mailed on Nov. 29, 2017, 2 pages.
Corrected Notice of Allowance received for U.S. Appl. No. 14/869,982, mailed on Aug. 2, 2018, 2 pages.
Extended European Search Report received for European Patent Application No. 15196245.3, mailed on May 2, 2016, 12 pages.
Extended European Search Report received for European Patent Application No. 20174138.6, mailed on Sep. 23, 2020, 10 pages.
Final Office Action received for U.S. Appl. No. 10/217,798, mailed on Aug. 23, 2005, 10 pages.
Final Office Action received for U.S. Appl. No. 10/217,798, mailed on Mar. 4, 2004, 17 pages.
Final Office Action received for U.S. Appl. No. 10/217,798, mailed on Oct. 31, 2007, 10 pages.
Final Office Action received for U.S. Appl. No. 10/329,217, mailed on Jan. 21, 2005, 13 pages.
Final Office Action received for U.S. Appl. No. 10/371,413, mailed on Dec. 13, 2005, 7 pages.
Final Office Action received for U.S. Appl. No. 10/442,433, mailed on Aug. 9, 2005, 6 pages.
Final Office Action received for U.S. Appl. No. 11/137,753, mailed on May 23, 2007, 12 pages.
Final Office Action received for U.S. Appl. No. 11/351,098, mailed on Mar. 24, 2009, 11 pages.
Final Office Action received for U.S. Appl. No. 11/351,098, mailed on Oct. 18, 2007, 6 pages.
Final Office Action received for U.S. Appl. No. 11/595,071, mailed on Jun. 15, 2011, 9 pages.
Final Office Action received for U.S. Appl. No. 11/901,649, mailed on Feb. 10, 2011, 20 pages.
Final Office Action received for U.S. Appl. No. 11/977,279, mailed on Jul. 5, 2011, 12 pages.
Final Office Action received for U.S. Appl. No. 11/977,339, mailed on Nov. 17, 2011, 9 pages.
Final Office Action received for U.S. Appl. No. 11/977,911, mailed on Sep. 29, 2011, 23 pages.
Final Office Action received for U.S. Appl. No. 11/978,006, mailed on Jun. 24, 2011, 12 pages.
Final Office Action received for U.S. Appl. No. 11/978,031, mailed on May 18, 2011, 17 pages.
Final Office Action received for U.S. Appl. No. 12/566,455, mailed on Oct. 11, 2012, 8 pages.
Final Office Action received for U.S. Appl. No. 12/568,302, mailed on Oct. 25, 2012, 14 pages.
Final Office Action received for U.S. Appl. No. 12/568,316, mailed on Jan. 13, 2014, 15 pages.
Final Office Action received for U.S. Appl. No. 12/568,316, mailed on Oct. 25, 2012, 16 pages.
Final Office Action received for U.S. Appl. No. 13/166,699, mailed on Feb. 3, 2016, 15 pages.
Final Office Action received for U.S. Appl. No. 13/166,699, mailed on May 31, 2017, 16 pages.
Final Office Action received for U.S. Appl. No. 13/166,699, mailed on Oct. 31, 2013, 13 pages.
Final Office Action received for U.S. Appl. No. 13/166,711, mailed on Aug. 20, 2015, 6 pages.
Final Office Action received for U.S. Appl. No. 13/166,711, mailed on Jul. 14, 2014, 12 pages.
Final Office Action received for U.S. Appl. No. 13/560,958, mailed on Dec. 16, 2014, 12 pages.
Final Office Action received for U.S. Appl. No. 13/560,963, mailed on Feb. 1, 2016, 12 pages.
Final Office Action received for U.S. Appl. No. 13/560,973, mailed on Jan. 12, 2015, 6 pages.
Final Office Action received for U.S. Appl. No. 13/652,007, mailed on Apr. 28, 2014, 16 pages.
Final Office Action received for U.S. Appl. No. 13/831,318, mailed on Aug. 21, 2017, 9 pages.
Final Office Action received for U.S. Appl. No. 13/831,318, mailed on Mar. 9, 2016, 9 pages.
Final Office Action received for U.S. Appl. No. 14/333,382, mailed on Jun. 21, 2017, 18 pages.
Final Office Action received for U.S. Appl. No. 14/333,457, mailed on Nov. 30, 2017, 23 pages.
Final Office Action received for U.S. Appl. No. 14/333,461, mailed on Jun. 3, 2016, 9 pages.
Final Office Action received for U.S. Appl. No. 14/869,980, mailed on Aug. 7, 2017, 12 pages.
Final Office Action received for U.S. Appl. No. 14/869,982, mailed on Aug. 16, 2017, 10 pages.
Final Office Action received for U.S. Appl. No. 15/144,615, mailed on May 4, 2017, 5 pages.
Final Office action received for U.S. Appl. No. 15/169,679, mailed on Oct. 1, 2018, 34 pages.
Final Office Action received for U.S. Appl. No. 16/114,023, mailed on Dec. 5, 2019, 11 pages.
Final Office Action received for U.S. Appl. No. 14/333,457 , mailed on Jan. 25, 2019, 20 pages.
International Preliminary Report on Patentability and Written Opinion received for PCT Patent Application No. PCT/US02/25573, mailed on Dec. 30, 2004, 16 pages.
International Preliminary Report on Patentability and Written opinion received for PCT Patent Application No. PCT/US06/43741, issued on May 14, 2008, 4 pages.
Search Report received for PCT Patent Application No. PCT/US2002/025573, mailed on Apr. 14, 2003, 2 pages.
International Search Report received for PCT Patent Application No. PCT/US2003/03277, mailed on Nov. 11, 2003, 3 pages.
Search Report received for PCT Patent Application No. PCT/US2003/05300, mailed on Jun. 16, 2003, 2 pages.
International Search Report received for PCT Patent Application No. PCT/US2006/043741, mailed on Sep. 21, 2007, 1 page.
International Search Report received for PCT Patent Application No. PCT/US2012/043021, mailed on Jan. 16, 2013, 6 pages.
International Search Report received for PCT Patent Application No. PCT/US2014/013927, mailed on Apr. 23, 2014, 4 pages.
International Search Report received for PCT Patent Application No. PCT/US2014/047658, mailed on Oct. 30, 2014, 4 pages.
Non-Final Office Action received for U.S. Appl. No. 10/217,798, mailed on Dec. 10, 2004, 10 pages.
Non-Final Office Action received for U.S. Appl. No. 10/217,798, mailed on Jan. 13, 2006, 9 pages.
Non-Final Office Action received for U.S. Appl. No. 10/217,798, mailed on Jun. 4, 2003, 17 pages.
Non-Final Office Action received for U.S. Appl. No. 10/217,798, mailed on Jun. 29, 2007, 11 pages.
Non-Final Office Action received for U.S. Appl. No. 10/217,798, mailed on May 12, 2006, 8 pages.
Non-Final Office Action received for U.S. Appl. No. 10/307,106, mailed on Nov. 26, 2004, 9 pages.
Non-Final Office Action received for U.S. Appl. No. 10/329,217, mailed on May 21, 2004, 14 pages.

(56) References Cited

OTHER PUBLICATIONS

Non-Final Office Action received for U.S. Appl. No. 10/347,149, mailed on Jan. 21, 2005, 10 pages.
Non-Final Office Action received for U.S. Appl. No. 10/347,149, mailed on Jul. 12, 2005, 4 pages.
Non-Final Office Action received for U.S. Appl. No. 10/371,413, mailed on Apr. 15, 2005, 5 pages.
Non-Final Office Action received for U.S. Appl. No. 10/371,413, mailed on Aug. 28, 2006, 7 pages.
Non-Final Office Action received for U.S. Appl. No. 10/442,433, mailed on Sep. 21, 2004, 7 pages.
Non-Final Office Action received for U.S. Appl. No. 10/739,455, mailed on Jun. 22, 2005, 11 pages.
Non-Final Office Action received for U.S. Appl. No. 11/137,753, mailed on Feb. 25, 2008, 16 pages.
Non-Final Office Action received for U.S. Appl. No. 11/351,098, mailed on Jun. 24, 2008, 12 pages.
Non-Final Office Action received for U.S. Appl. No. 11/351,098, mailed on Jun. 28, 2007, 13 pages.
Non-Final Office Action received for U.S. Appl. No. 11/407,545, mailed on Nov. 23, 2009, 6 pages.
Non-Final Office Action received for U.S. Appl. No. 11/595,071, mailed on Jun. 5, 2012, 15 pages.
Non-Final Office Action received for U.S. Appl. No. 11/595,071, mailed on Oct. 14, 2010, 8 pages.
Non-Final Office Action received for U.S. Appl. No. 11/901,649, maild on Jul. 29, 2010, 22 pages.
Non-Final Office Action received for U.S. Appl. No. 11/977,279, maild on Feb. 27, 2014, 11 pages.
Non-Final Office Action received for U.S. Appl. No. 11/977,279, maild on Nov. 26, 2010, 10 pages.
Non-Final Office Action received for U.S. Appl. No. 11/977,339, maild on Dec. 13, 2010, 9 pages.
Non-Final Office Action received for U.S. Appl. No. 11/977,339, maild on Jun. 21, 2011, 11 pages.
Non-Final Office Action received for U.S. Appl. No. 11/977,339, maild on Mar. 14, 2014, 10 pages.
Non-Final Office Action received for U.S. Appl. No. 11/977,830, maild on Nov. 26, 2010, 8 pages.
Non-Final Office Action received for U.S. Appl. No. 11/977,864, maild on Jan. 10, 2012, 6 pages.
Non-Final Office Action received for U.S. Appl. No. 11/977,864, maild on Jun. 19, 2012, 8 pages.
Non-Final Office Action received for U.S. Appl. No. 11/977,911, maild on Apr. 29, 2011, 20 pages.
Non-Final Office Action received for U.S. Appl. No. 11/978,006, maild on Oct. 13, 2010, 9 pages.
Non-Final Office Action received for U.S. Appl. No. 11/978,031, maild on Feb. 1, 2011, 20 pages.
Non-Final Office Action received for U.S. Appl. No. 11/978,031, maild on Feb. 29, 2012, 20 pages.
Non-Final Office Action received for U.S. Appl. No. 11/980,029, mailed on Jun. 25, 2009, 10 pages.
Non-Final Office Action received for U.S. Appl. No. 12/566,455, mailed on Apr. 20, 2012, 9 pages.
Non-Final Office Action received for U.S. Appl. No. 12/566,477, mailed on Jan. 31, 2012, 11 pages.
Non-Final Office Action received for U.S. Appl. No. 12/566,477, mailed on Nov. 15, 2012, 12 pages.
Non-Final Office Action received for U.S. Appl. No. 12/568,302, mailed on Nov. 4, 2011, 30 pages.
Non-Final Office Action received for U.S. Appl. No. 12/568,316, mailed on Nov. 2, 2011, 32 pages.
Non-Final Office Action received for U.S. Appl. No. 12/852,883, mailed on Jun. 28, 2011, 16 pages.
Non-Final Office Action received for U.S. Appl. No. 13/166,699, mailed on Jun. 27, 2014, 13 pages.
Non-Final Office Action received for U.S. Appl. No. 13/560,958, mailed on Aug. 28, 2015, 11 pages.
Non-Final Office Action received for U.S. Appl. No. 13/560,973, mailed on May 8, 2014, 6 pages.
Non-Final Office Action received for U.S. Appl. No. 13/652,007, mailed on Sep. 18, 2013, 18 pages.
Non-Final Office Action received for U.S. Appl. No. 14/333,382, mailed on Jan. 23, 2017, 17 pages.
Non-Final Office Action received for U.S. Appl. No. 14/333,382, mailed on May 17, 2016, 17 pages.
Non-Final Office Action received for U.S. Appl. No. 14/333,457, mailed on Jul. 1, 2016, 28 pages.
Non-Final Office Action received for U.S. Appl. No. 14/333,461, mailed on Apr. 6, 2017, 7 pages.
Non-Final Office Action received for U.S. Appl. No. 14/333,461, mailed on Dec. 4, 2015, 16 pages.
Non-Final Office Action received for U.S. Appl. No. 14/578,051, mailed on Feb. 11, 2016, 9 pages.
Non-Final Office Action received for U.S. Appl. No. 14/869,975, mailed on Jan. 17, 2018, 18 pages.
Non-Final Office Action received for U.S. Appl. No. 14/869,980, mailed on Jan. 2, 2018, 12 pages.
Non-Final Office Action received for U.S. Appl. No. 14/869,980, mailed on Jan. 12, 2017, 11 pages.
Non-Final Office Action received for U.S. Appl. No. 14/869,982, mailed on Feb. 22, 2018, 11 pages.
Non-Final Office Action received for U.S. Appl. No. 14/869,982, mailed on Jan. 11, 2017, 10 pages.
Non-Final Office Action received for U.S. Appl. No. 15/057,035, mailed on May 13, 2016, 6 pages.
Non-Final Office action received for U.S. Appl. No. 15/169,679, mailed on Dec. 14, 2017, 25 pages.
Non-Final Office Action received for U.S. Appl. No. 16/114,023, mailed on Apr. 2, 2019, 10 pages.
Non-Final Office Action received for U.S. Appl. No. 12/960,068, mailed Feb. 7, 2013, 25 pages.
Notice of Allowance received for U.S. Appl. No. 13/166,711, mailed on Jan. 14, 2016, 5 pages.
Notice of Allowance received for U.S. Appl. No. 13/166,726, mailed on Feb. 3, 2014, 9 pages.
Notice of Allowance received for U.S. Appl. No. 13/166,726, mailed on May 12, 2014, 9 pages.
Notice of Allowance received for U.S. Appl. No. 13/166,726, mailed on Sep. 4, 2014, 10 pages.
Notice of Allowance received for U.S. Appl. No. 13/560,958, mailed on May 24, 2016, 10 pages.
Notice of Allowance received for U.S. Appl. No. 13/560,958, mailed on Sep. 9, 2016, 8 pages.
Notice of Allowance received for U.S. Appl. No. 13/560,973, mailed on Dec. 15, 2015, 9 pages.
Notice of Allowance received for U.S. Appl. No. 13/831,318, mailed on Apr. 18, 2018, 10 pages.
Notice of Allowance received for U.S. Appl. No. 14/333,382, mailed on Feb. 23, 2018, 5 pages.
Notice of Allowance received for U.S. Appl. No. 14/333,382, mailed on Nov. 9, 2017, 8 pages.
Notice of Allowance received for U.S. Appl. No. 14/333,457, mailed on Aug. 25, 2020, 10 pages.
Notice of Allowance received for U.S. Appl. No. 14/333,457, mailed on Feb. 26, 2020, 10 pages.
Notice of Allowance received for U.S. Appl. No. 14/333,461, mailed on Jul. 11, 2018, 6 pages.
Notice of Allowance received for U.S. Appl. No. 14/333,461, mailed on Oct. 26, 2017, 8 pages.
Notice of allowance received for U.S. Appl. No. 14/578,051, mailed on Aug. 10, 2016, 7 pages.
Notice of Allowance received for U.S. Appl. No. 14/869,975, mailed on Jun. 14, 2018, 8 pages.
Notice of Allowance received for U.S. Appl. No. 14/869,980, mailed on Jun. 6, 2018, 5 pages.
Notice of Allowance received for U.S. Appl. No. 14/869,982, mailed on Jun. 13, 2018, 5 pages.
Notice of Allowance received for U.S. Appl. No. 15/057,035, mailed on Oct. 31, 2016, 10 pages.

(56) References Cited

OTHER PUBLICATIONS

Notice of Allowance received for U.S. Appl. No. 15/144,615, mailed on Nov. 29, 2017, 8 pages.
Notice of Allowance received for U.S. Appl. No. 15/169,679, mailed on Jun. 26, 2019, 22 pages.
Notice of Allowance received for U.S. Appl. No. 16/114,023, mailed on Feb. 3, 2020, 7 pages.
Notification of Reasons for Rejection received for Japanese Patent Application No. 2008-540205, mailed on Dec. 19, 2011, 6 pages.
Restriction Requirement received for U.S. Appl. No. 14/333,457, mailed on May 13, 2016, 14 pages.
Abileah et al., "59.3: Integrated Optical Touch Panel in a 14.1' AMLCD", SID '04 Digest (Seattle), 2004, pp. 1544-1547.
Abileah et al., "Optical Sensors Embedded within AMLCD Panel: Design and Applications", Siggraph-07, San Diego, 2007, 5 pages.
Abileah et al., "U.S. Appl. No. 60/383,040, filed May 23, 2002".
Abileah et al., "U.S. Appl. No. 60/821,325, filed Aug. 3, 2006".
Boer et al., "56.3: Active Matrix LCD with Integrated Optical Touch Screen", SID '03 Digest (Baltimore), 2003, pp. 1494-1497.
Boer et al., "U.S. Appl. No. 60/359,263, filed Feb. 20, 2002, titled "Light sensitive display"".
Haines Lester, "Japanese Enable Human Area Network", Available online at: <http:/www.theregister.co.uk/2005/03/23/human_area_network/print.html>, Mar. 23, 2005, 2 pages.
Hong et al., "Smart LCD Using a-Si Photo Sensor", IMID'05 Digest, 2005, pp. 280-283.
Kim et al., "24.1: Fingerprint Scanner Using a-Si: H TFT-Array", SID '00 Digest, May 14, 2000, pp. 353-355.
Kis Attila, "Tactile Sensing and Analogic Algorithms", Ph.D. Dissertation, Peter Pazmany Catholic University, Budapest, Hungary, 2006, 122 pages.
Lee et al., "A Multi-Touch Three Dimensional Touch-Sensitive Tablet", CHI'85 Proceedings, Apr. 1985, pp. 21-25.
Rossiter et al., "A Novel Tactile Sensor Using a Matrix of LEDs Operating in Both Photoemitter and Photodetector Modes", IEEE, 2005, pp. 994-997.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 13/166,699, mailed on May 4, 2015, 20 pages.
Final Office Action received for U.S. Appl. No. 13/166,726, mailed on Jul. 26, 2013, 11 pages.
Final Office Action received for U.S. Appl. No. 13/560,963, mailed on Dec. 2, 2014, 11 pages.
International Preliminary Report on Patentability and Written Opinion received for PCT Patent Application No. PCT/US03/05300, mailed on Oct. 8, 2004, 8 pages.
International Search Report received for PCT Patent Application No. PCT/US2012/043019, mailed on Oct. 17, 2012, 4 pages.
International Search Report received for PCT Patent Application No. PCT/US2012/043023, mailed on Oct. 17, 2012, 5 pages.
International Search Report received for PCT Patent Application No. PCT/US2013/048977, mailed on Sep. 12, 2013, 3 pages.
Non-Final Office Action received for U.S. Appl. No. 13/166,699, mailed on Mar. 29, 2013, 13 pages.
Non-Final Office Action received for U.S. Appl. No. 13/166,699, mailed on Oct. 20, 2016, 19 pages.
Non-Final Office Action received for U.S. Appl. No. 13/166,699, mailed on Sep. 24, 2015, 17 pages.
Non-Final Office Action received for U.S. Appl. No. 13/166,711, mailed on Dec. 16, 2013, 13 pages.
Non-Final Office Action received for U.S. Appl. No. 13/166,711, mailed on Jan. 30, 2015, 13 pages.
Non-Final Office Action received for U.S. Appl. No. 13/166,711, mailed on Jun. 17, 2013, 9 pages.
Non-Final Office Action received for U.S. Appl. No. 13/166,726, mailed on Mar. 5, 2013, 16 pages.
Non-Final Office Action received for U.S. Appl. No. 13/560,958, mailed on Apr. 24, 2014, 11 pages.
Non-Final Office Action received for U.S. Appl. No. 13/560,963, mailed on Jul. 28, 2016, 13 pages.
Non-Final Office Action received for U.S. Appl. No. 13/560,963, mailed on Jun. 4, 2014, 10 pages.
Non-Final Office Action received for U.S. Appl. No. 13/560,963, mailed on May 14, 2015, 13 pages.
Non-Final Office Action received for U.S. Appl. No. 13/831,318, mailed on May 22, 2015, 9 pages.
Non-Final Office Action received for U.S. Appl. No. 13/831,318, mailed on Nov. 25, 2016, 9 pages.
Non-Final Office Action received for U.S. Appl. No. 15/144,615, mailed on Sep. 27, 2016, 6 pages.
Non-Final Office Action received for U.S. Appl. No. 16/953,303, mailed on Sep. 2, 2022, 15 pages.
Notice of Allowance received for U.S. Appl. No. 13/560,963, mailed on Feb. 14, 2017, 11 pages.
Notice of Allowance received for U.S. Appl. No. 16/953,303, mailed on Feb. 13, 2023., 10 pages.
Search Report received for Chinese Patent Application No. 201280030349.9, mailed on Sep. 6, 2015, 3 pages (English Translation only).
Search Report received for Chinese Patent Application No. 201280030351.6, mailed on Oct. 23, 2015, 1 pages (English Translation only).
Search Report received for Taiwanese Patent Application No. 101122107, mailed on Jul. 8, 2014, 1 page (English Translation only).
Search Report received for Taiwanese Patent Application No. 101122109, mailed on Jul. 7, 2014, 1 page (English Translation only).
Search Report received for Taiwanese Patent Application No. 101122110, mailed on Jun. 12, 2014, 1 page (English Translation only).
Search Report received for Taiwanese Patent Application No. 103126285, mailed on Nov. 20, 2015, 1 page (Official copy only).
Search Report received for Taiwanese Patent Application No. 104135140, mailed on Jun. 23, 2016, 2 pages (English Translation only).
Abileah et al., "Optical Sensors Embedded within AMLCD Panel: Design and Applications", ADEAC '06, SID (Atlanta), 2006, 5 pages.
Anonymous, "Biometric Smart Pen Project", Available online at: <http://www.biometricsmartpen.de/ . . .>, 2002, 7 pages.
Bobrov et al., "The Manufacture of a Thin-Film LCD", Optiva, Inc., San Francisco, CA, 2002, pp. 317-321.
Boer et al., "U.S. Appl. No. 60/736,708, filed Nov. 14, 2005, titled "Integrated light sensitive liquid crystal display"", 76 pages.
Brown et al., "7.2: A 2.6 inch VGA LCD With Optical Input Function Using a 1-Transistor Active-Pixel Sensor", ISSCC, 2007, 3 pages.
Echtler et al., "An LED-based Multitouch Sensor for LCD Screens", Cambridge, Massachusetts: ACM, Jan. 2010, pp. 227-230.
Pye, Andy, "Top Touch-Screen Options", Available online at: <http://www.web.archive.org/web/20010627162135. http://www.industrialtechnology.co.uk/2001/mar/touch.html>, [Retrieved on: Apr. 29, 2004], Oct. 29, 2001, pp. 1-2.
Yamaguchi et al., "Two-Dimensional Contact-Type Image Sensor Using Amorphous Silicon Photo-Transistor", The Japan Society of Applied Physics, vol. 32, No. 1S, Jan. 1993, pp. 58-60.

\* cited by examiner

TOUCH CONTROLLER ARCHITECTURE

CROSS-REFERENCE TO RELATED APPLICATIONS

This application is a continuation of U.S. patent application Ser. No. 16/953,303, filed on Nov. 19, 2020, and published on May 20, 2021 as U.S. Publication No. 2021-0149561, which is a continuation of U.S. patent application Ser. No. 14/333,457, filed Jul. 16, 2014, and issued on Nov. 24, 2020 as U.S. Pat. No. 10,845,901, which claims benefit of U.S. Provisional Application No. 61/860,816 filed Jul. 31, 2013, the contents of all of which are hereby incorporated by reference in their entireties for all purposes.

FIELD

This relates generally to a touch controller and, more specifically, to a touch controller architecture that can be configured according to a scan plan.

BACKGROUND

Many types of input devices are presently available for performing operations in a computing system, such as buttons or keys, mice, trackballs, joysticks, touch panels, touch screens and the like. Touch sensitive devices, and touch screens in particular, are quite popular because of their ease and versatility of operation as well as their affordable prices. A touch sensitive device can include a touch panel, which can be a clear panel with a touch sensitive surface, and a display device such as a liquid crystal display (LCD) that can be positioned partially or fully behind the panel so that the touch sensitive surface can cover at least a portion of the viewable area of the display device. The touch sensitive device can allow a user to perform various functions by touching or hovering over the touch panel using a finger, stylus or other object at a location often dictated by a user interface (UI) being displayed by the display device. In general, the touch sensitive device can recognize a touch or hover event and the position of the event on the touch panel, and the computing system can then interpret the event in accordance with the display appearing at the time of the event, and thereafter can perform one or more actions based on the event.

Touch sensitive devices are being developed to recognize more and more types of touch and hover events. Device circuitry needs to be developed to perform the increasing number of events in a timely and accurate manner.

SUMMARY

This relates to a touch controller that can configure touch circuitry according to a scan plan, which can define a sequence of scan events to be performed on a touch panel. The touch controller can include a configurable transmit section to generate stimulation signals to drive the panel, a configurable receive section to receive and process touch signals from the panel, and a configurable memory to store the touch signals. The touch controller can also include a programmable scan engine to configure the transmit section, the receive section, and the memory according to the scan plan. The touch controller can advantageously provide more robust and flexible touch circuitry to handle various types of touch events at the panel. This also relates to an active stylus that can generate stimulation signals that can be detected by the touch controller during scan events at the panel.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to a touch controller that can configure touch circuitry according to a scan plan, which can define a sequence of scan events to be performed on a touch panel. The touch controller can include a configurable transmit section to generate stimulation signals to drive the panel, a configurable receive section to receive and process touch signals from the panel, and a configurable memory to store the touch signals. The touch controller can also include a programmable scan engine to configure the transmit section, the receive section, and the memory according to the scan plan. The touch controller can advantageously provide more robust and flexible touch circuitry to handle various types of touch events at the panel. This also relates to an active stylus that can generate stimulation signals that can be detected by the touch controller during various scan events at the panel.

Figure 1:
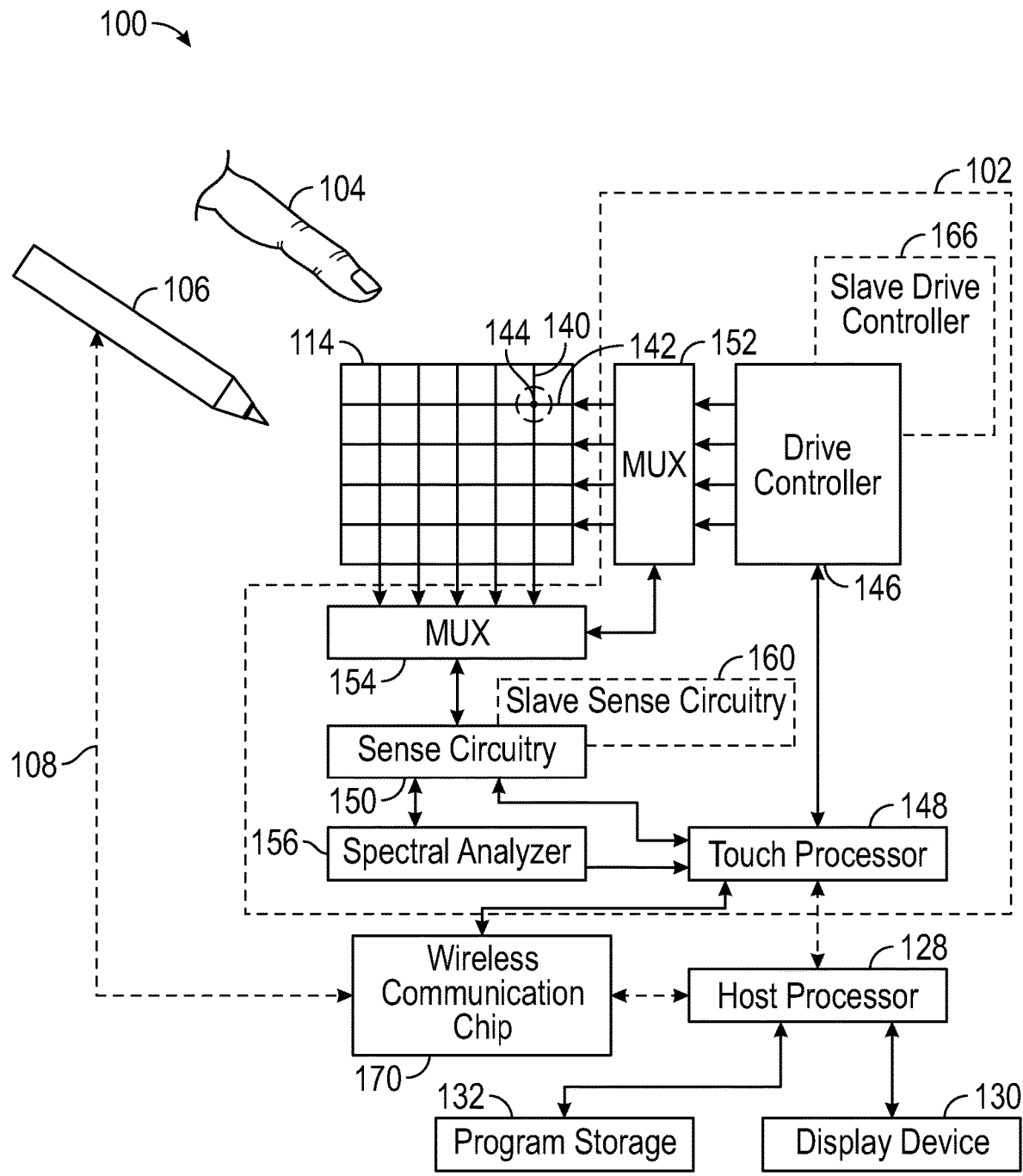
FIG. 1 illustrates an exemplary computing system implementing an exemplary touch controller that can detect both touch and hover events caused by objects such as a finger or a stylus according to examples of the disclosure.

FIG. 1 illustrates an exemplary computing system 100 implementing a touch controller 102 that can detect both touch and hover events caused by objects such as finger 104, and signals from a stylus 106 according to examples of the disclosure. Computing system 100 can include a touch sensor panel 114 to detect touch or hover events at a touch sensitive device, such as a mobile phone, tablet, touchpad, portable or desktop computer, portable media player, wearable device or the like. Touch sensor panel 114 can include an array of touch nodes 144 that can be formed by a two-layer electrode structure separated by a dielectric material, although in other examples the electrodes can be formed on the same layer. For example, touch nodes 144 can be formed at the crossing points between row electrodes and column electrodes, separated by a dielectric material. The row electrodes can form drive lines 142 and the column electrodes can form sense lines 140, although it should be understood that the row/drive line and column/sense line associations can be only exemplary. The sense lines 140 can intersect the drive lines 142 in a variety of manners. For example, the sense lines 140 can be perpendicular to the drive lines 142 and can form touch nodes 144 with x and y coordinates. However, other coordinate systems can also be used, and the coordinates of the touch nodes 144 can be defined differently. Although FIG. 1 illustrates four drive lines 142 and five sense lines 140, it should be understood that touch sensor panel 114 can include any number of drive lines 142 and any number of sense lines 140 to form the desired number and pattern of touch nodes 144.

Additionally, it should be understood that although the sensors described above include a pattern of row and column traces, in other examples, the sensors can be formed from any suitable one-dimension, two-dimension or three-dimension pattern of electrodes. For example in some one-dimensional arrangements, all electrodes can be row electrodes or all electrodes can be column electrodes. One-dimensional arrangements can be used for self-capacitance scans, row-row and column-column mutual capacitance scans, stylus scans and spectral analysis scans. A two-dimensional arrangement, for example, can include an array of row and column electrodes forming touch nodes as discussed above or pixilated electrodes (i.e. a matrix of conductive material). A three-dimensional arrangement, for example, can include a combination of two-dimensional arrangements (e.g. sensors in the X-Y, X-Z and Y-Z planes).

The capacitance between the drive lines 142 and local system ground and the capacitance between sense lines 140 and local system ground can appear as a stray capacitance Cstray, and the capacitance at the touch nodes 144 can appear as a mutual capacitance Csig when the given drive line is stimulated with an alternating current (AC) signal. During a mutual capacitance scan, for example, the presence of a finger 104 or other object near or on the touch sensor panel 114 can be detected by measuring changes to a signal present at the nodes being touched, which can be a function of Csig. Various touch and stylus detection scans are described in more detail below.

Computing system 100 can include one or more processors, which can execute software or firmware implementing at least portions of the touch controller 102 according to examples of the disclosure. Touch controller 102 can also include peripherals (not shown) such as random access memory (RAM) or other types of memory or storage, watchdog timers and the like. Additionally, touch controller 102 can include a drive controller 146 and sense circuitry 150. In one example, drive controller 146 can be coupled to each of the drive lines 142 and drive controller 146 can provide a stimulation signal (e.g., voltage) to the drive lines 142. The sensing circuitry 150 can be coupled to each of the sense lines 140, and the sensing circuit 150 can detect changes in capacitance at the touch nodes 144. During a mutual capacitance scan, for example, stimulation signals can be applied to one or more of the drive lines 142, and due to the capacitive coupling between the one or more drive lines 142 and sense lines 140, a charge can be coupled onto the sense lines 140 at each of the touch nodes 144. The sensing circuit 150 can then detect changes in capacitance at each of the touch nodes 144. In some examples, drive lines 142 can be switchably configured to operate as sense lines 140, and thus sensing circuitry 150 and multiplexer 154 can be coupled to the drive lines 142 similar to sense lines 140 depicted in FIG. 1.

The sensing circuitry 150 can include one more sense channels that can communicate sense data to touch processor 148. In one example, the sensing circuitry 150 can convert the analog capacitive signals to digital data and then transmit the digital data to the touch processor 148. In other examples, the sensing circuitry 150 can transmit the analog capacitance signals to the touch processor 148, which can then convert the data to a digital form. Further, it should be noted that the sensing circuitry 150 can include individual channels for each sense line 140 or a single sense channel for all of the sense lines 140. The sensing circuitry 150 can report a location of the touch node 144, as well as the intensity of the capacitance (or changes thereof) at the touch node 144.

In some examples, the touch controller 102 can include one or more multiplexers. For example, during various touch sensing scans, the sensing circuitry 150 can also include a multiplexer configured to perform time multiplexing for the sense lines 140. For example, the sensing circuitry 150 can receive signals from each of the touch nodes 144 along the sense lines 140 at approximately the same time. The incoming signals can be stored in the sensing circuitry 150 and the multiplexer can then can be used to release the signals sequentially to the touch processor 148 one at a time or in groups.

In some examples, touch processor 148, drive controller 146, and sense circuitry 150 can be integrated into a single application specific integrated circuit (ASIC). In some examples, touch controller 102 can be implemented using a master-slave configuration, described in more detail below. The master-slave configuration can include a slave drive controller 166 and slave sense circuitry 160.

In addition to the multiplexers that may be used during a touch sensing scan to process touch signals, the computing system can also include a drive multiplexer 152 and/or a sense multiplexer 154. These two input device multiplexers 152, 154 can be coupled with the respective drive lines 142 and sense lines 140 to switch functionality depending on the scan operation performed, as will be discussed in more detail below. For example, the drive lines 142 can be coupled to sense circuitry to detect a signal coupled onto the drive lines 142. In this manner, the drive lines 142 can be configured to act as sense lines 140.

The touch controller 102 can also include a spectral analyzer 156 for finding frequencies that have minimal noise. A different spectral scan can be used for touch sensing and stylus scan frequencies as described below in more detail.

Computing system 100 can also include host processor 128. Host processor 128 can receive outputs from touch processor 148 and perform actions based on the received outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware for implementing the touch controller according to examples of the disclosure. Host processor 128 can also perform additional functions that can be unrelated to touch sensor panel processing, and can be coupled to program storage 132 and display device 130 such as an LCD display for providing a UI to a user of the device. Display device 130 together with touch sensor panel 114, when located partially or entirely under the touch sensor panel, can form a touch screen. The computing system 100 can process the outputs from the touch sensor panel 114 to perform actions based on detected touch or hover events and the displayed graphical user interface on the touch screen.

Computing system 100 can also include a wireless communication chip 170, implementing wireless communication standards such as a WiFi®, BLUETOOTH™ or the like. Wireless communication chip 170 can be used to communicate information from the touch processor 148 or host processor 128 to stylus 106 or to communicate information from the stylus 106 to touch processor 148 or host processor 128 via a wireless communication channel 108. In other examples, the wireless communication functionality can be incorporated in other components of computing system 100, rather than in a dedicated chip.

Note that one or more of the functions described above can be performed by firmware stored in memory and executed by touch processor 148, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the system is not limited to the components and configuration of FIG. 1, but can include other or additional components in multiple configurations according to various examples. Additionally, the components of computing system 100 can be included within a single device, or can be distributed between multiple devices.

Figure 2:
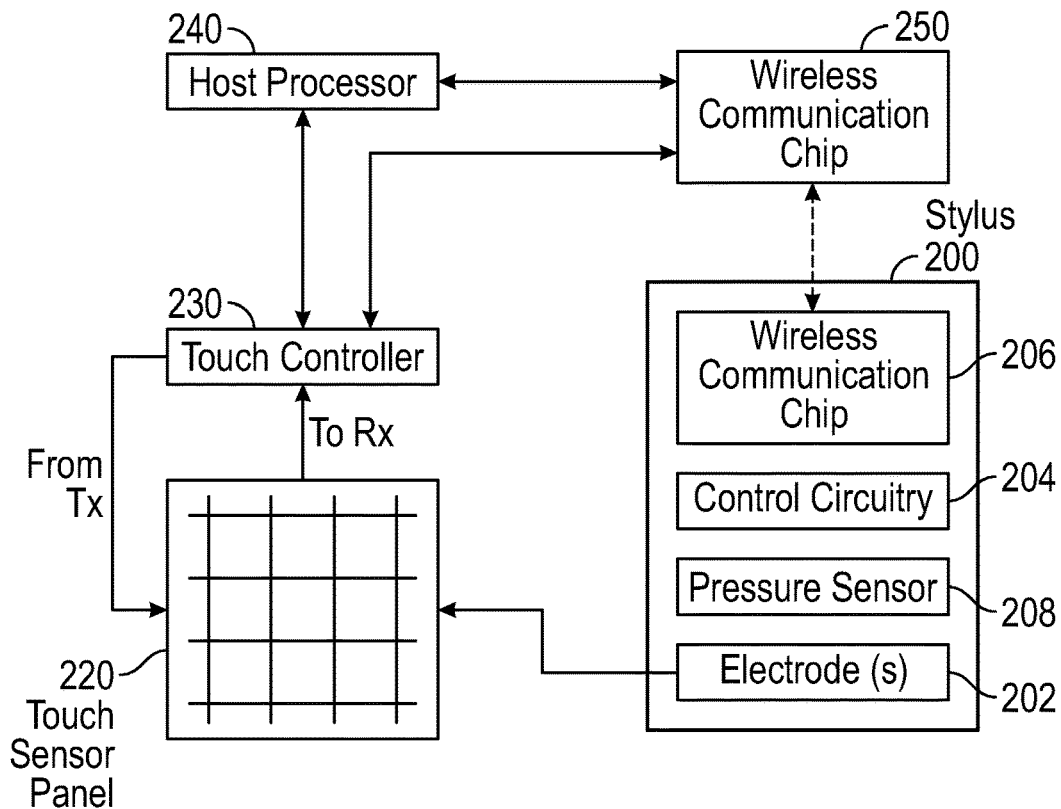
FIG. 2 illustrates an exemplary stylus and exemplary communication between the stylus and a computing system according to examples of the disclosure.

As discussed above (and in more detail below), computing system 100 can perform various stylus scans and communicate with a stylus. FIG. 2 illustrates an exemplary stylus and exemplary communication between the stylus and an exemplary computing system according to examples of the disclosure. Stylus 200 can include one or more electrodes 202, which can be located, for example, at the stylus tip. Stylus 200 can be an active stylus and include control circuitry 204 to generate one or more stimulation signals at the one or more electrodes 202 to stimulate a touch sensor panel 220 of computing system 100. For example, the stylus can have two electrodes 202 located in the stylus tip and control circuitry 204 that can generate stimulation signals at the two electrodes at frequencies $f_1$ and $f_2$. As described in more detail below, touch sensor panel 220 can receive stimulation signals coupled from stylus 200 to the row and column traces of touch sensor panel 220 and the received signals can be processed by the touch controller 230. Received touch signals can be used to determine a location of stylus 200 on the touch sensor panel 220. The location of stylus 200 can be communicated from touch controller 230 to host processor 240.

In some examples, the control circuitry 204 can include one or more processors. In some examples, one or more of the stylus functions described herein can be performed by firmware stored in memory or in program storage and executed by control circuitry 204.

Stylus 200 can also include a force sensor 208 to detect the amount of force at the tip of the stylus 200. When the stylus tip is touching the touch sensor panel 220, the force sensor 208 can measure the force at the stylus tip. The force information can be stored in the stylus and/or wirelessly transmitted to the computing system 100. The force information can be communicated to host processor 240 in computing system 100. Force information and corresponding location information can be processed together by host processor 240.

Stylus 200 can also include a wireless communication chip 206, although in some examples the wireless communication functionality can be incorporated into other modules within the stylus 200. Wireless communication chip 206 can transmit the above described force sensor information from the stylus 200 to the wireless communication chip 250 of computing system 100 (although as described above, the wireless communication functionality can be incorporated in other components of computing system 100). The wireless communication chip 206 can also receive other information including, but not limited to, information about stylus stimulus frequencies, scan plan information and clock synchronization information. In some examples, information, such as information about stylus stimulation frequencies and scan event plans, can be transmitted from touch controller 230 to wireless communication chip 250 via host processor 240. In other examples, information such as clock synchronization information can be communicated directly from touch controller 230 to wireless communication chip 250.

In some examples, stylus 200 can operate asynchronously from the computing system 100. In an asynchronous example, the stylus can continuously generate stimulation signals or generate stimulation signals at various intervals. In other examples, wireless communication chips 206 and 250 can be used to synchronize the stylus 200 and computing system 100. For example, the stylus 200 can receive clock synchronization information and scan event plans from computing system 100 such that it will only generate stimulation signals when the computing system expects such stimulation signals from the stylus. Additionally, in some examples, the computing system 100 and stylus 200 can synchronize their communication to regular time intervals such that both the computing system 100 and stylus 200 can save power.

Figure 3:
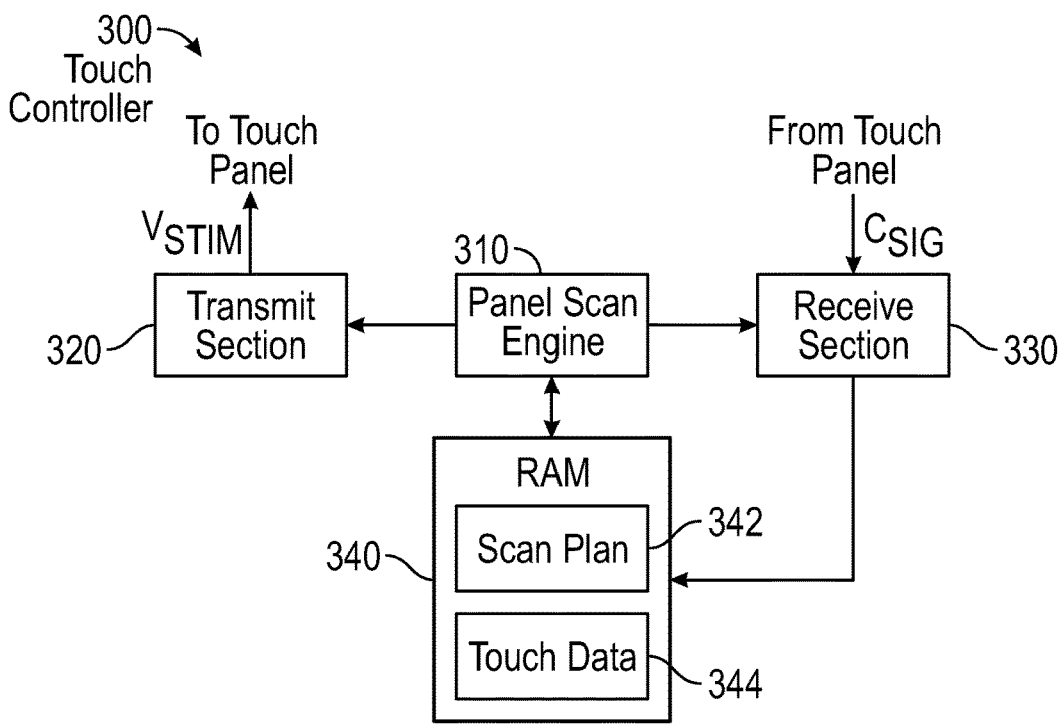
FIG. 3 illustrates an exemplary touch controller that can control the various scan operations on a touch sensor panel according to examples of the disclosure.

FIG. 3 illustrates an exemplary touch controller that can control the various scan operations on a touch sensor panel according to examples of the disclosure. In the example of FIG. 3, touch controller 300 can include transmit section 320 to generate stimulation signals Vstim at various frequencies, phases (e.g., polarities), and magnitudes that can be selectively applied to touch nodes 144 of the touch sensor panel 114 to drive the touch nodes to detect, for example, a touch or hover event. The touch controller 300 can also include receive section 330 to receive and process touch signals (e.g., mutual capacitance Csig) from the touch sensor panel 114, the touch signals indicative of the detected touch or hover event. The touch controller 300 can further include random access memory (RAM) 340 or other memory or storage for storing touch data 344, which can include the processed touch signals, and scan plan 342, which can define a sequence of scan events to be performed at the touch panel. Each scan event can perform one or more scans of the touch panel to detect, for example, touch or hover events caused by an object, and capture the touch signals indicative of the touch or hover event. The scan plan 342 will be described in more detail below.

The touch controller 300 can also include panel scan engine 310 to access the RAM 340 to retrieve and execute the scan plan 342 so as to configure the transmit section 320, the receive section 330, and the RAM 340 to perform the scan sequence defined in the scan plan 342. The scan engine 310 can control the transmit section 320 to generate the stimulation signals Vstim, the receive section 330 to receive and process the touch signals, and where in RAM 340 to store the touch data 344. The scan engine 310 can be programmed to execute the scan plan 342.

It should be understood that the touch controller 300 is not limited to that shown in FIG. 3, but can include other and/or additional components that can configure and control touch circuitry so as to perform various scan events at a touch panel.

As discussed above, the touch controller can configure touch circuitry according to a scan plan, which can define a sequence of scan events to be performed on a touch sensor panel. Several different scan events can be performed at the touch sensor panel 114 including at least one or more of: a mutual capacitance row-to-column or column-to-row scan, a mutual capacitance row-to-row scan, a mutual capacitance column-to-column scan, a self-capacitance row scan, a self-capacitance column scan, a stylus scan, a stylus spectral analysis scan, and a touch spectral analysis scan, although it is to be understood that other scan events can also be performed. The scan engine 310 can configure the transmit section 320, the receive section 330, and the RAM 340 according to the needs of the particular scan event.

Figure 4A:
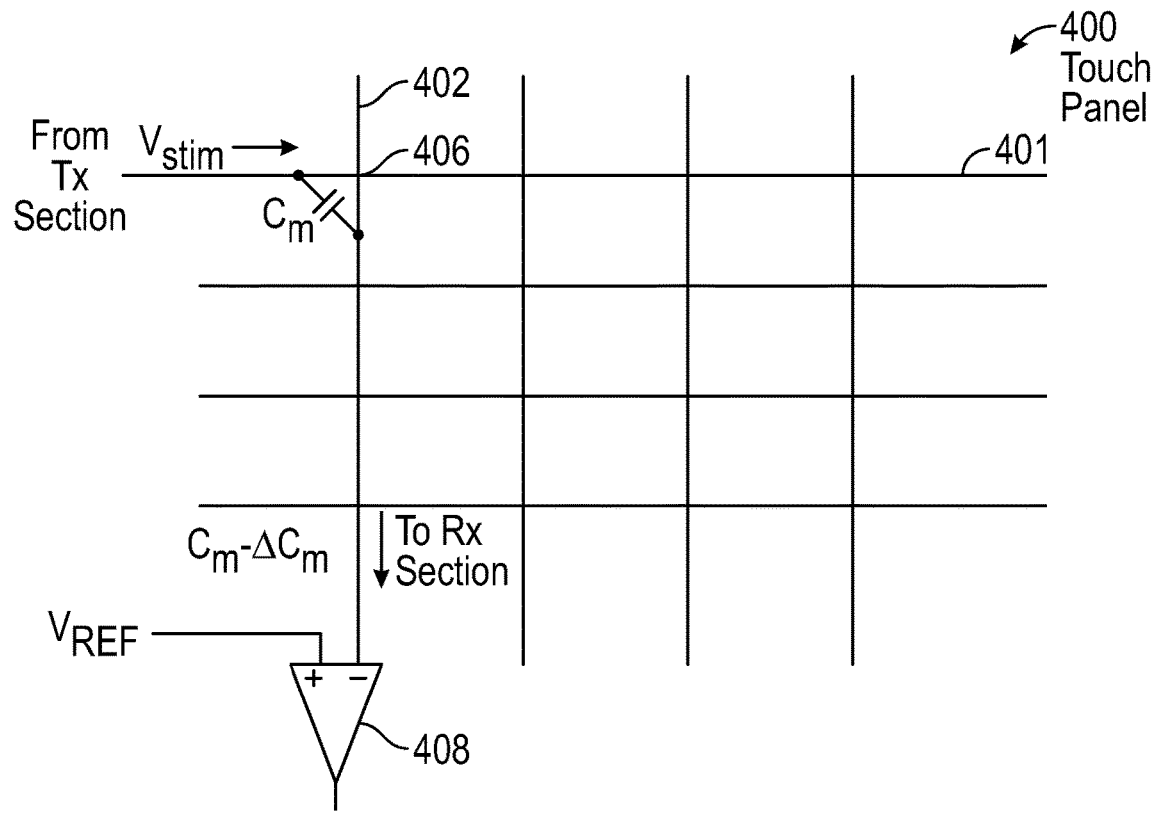
FIG. 4A illustrates an exemplary touch sensor panel operable with an exemplary touch controller to perform a mutual capacitance row-to-column scan according to examples of the disclosure.

FIG. 4A illustrates an exemplary touch sensor panel operable with the touch controller of FIG. 3 to perform a mutual capacitance row-to-column scan according to examples of the disclosure. In the example of FIG. 4A, touch sensor panel 400 can include an array of touch nodes 406 formed at the crossing points of row traces 401 and column traces 402, although as discussed above it should be understood that other touch node configurations can be used. During a mutual capacitance row-to-column scan, a row trace 401 can be coupled to the transmit section 320 to act as a drive line to stimulate the row trace 401 to drive the touch sensor panel 400. One or more column traces 402 can be coupled to the receive section 330 to act as sense lines to transmit mutual capacitance signals thereto. Touch nodes 406 can have a mutual capacitance Cm at the touch nodes 406 when there is no object touching or hovering over touch nodes 406. When an object touches or hovers over the touch node 406 (e.g. a finger or a passive stylus), the mutual capacitance Cm can be reduced by ΔCm, i.e., (Cm−ΔCm), corresponding to the amount of charge shunted through the object to ground. This mutual capacitance change can be transmitted to sense amplifier 408 in the receive section 330, which can be coupled to the column trace 402, to indicate the touch or hover event and its location.

Figure 4B:
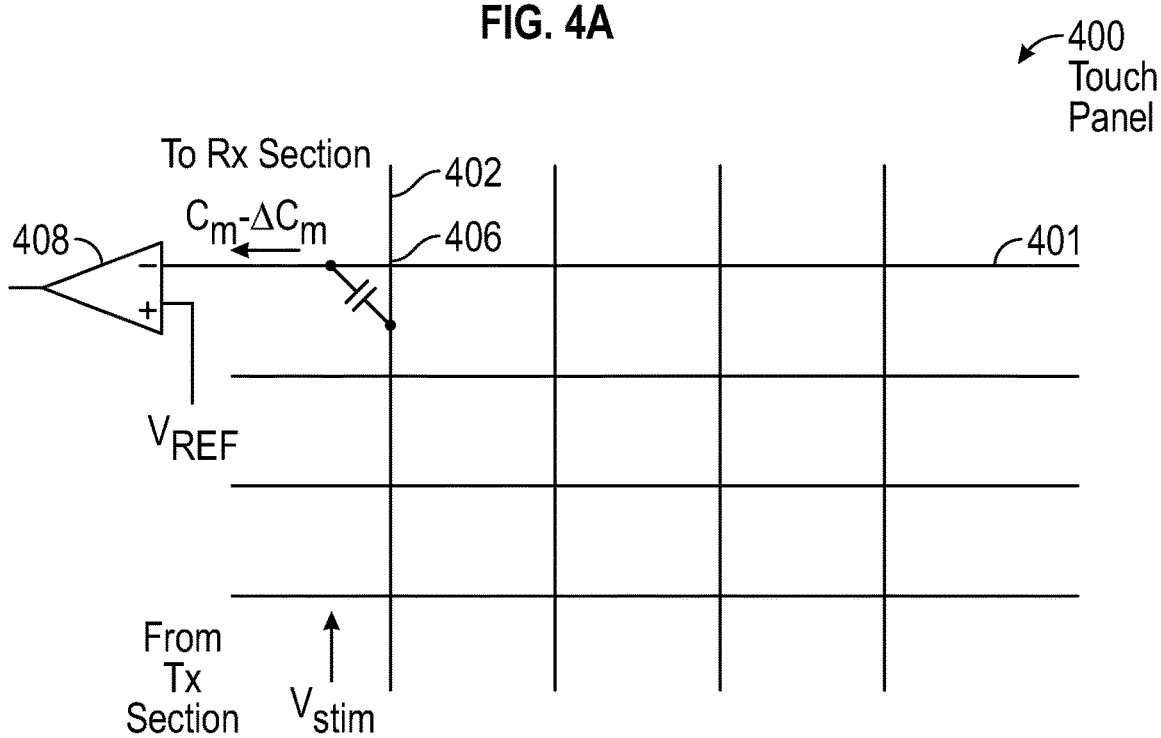
FIG. 4B illustrates an exemplary touch sensor panel operable with the touch controller of FIG. 3 to perform a mutual capacitance column-to-row scan according to examples of the disclosure.

FIG. 4B illustrates an exemplary touch sensor panel operable with the touch controller of FIG. 3 to perform a mutual capacitance column-to-row scan according to examples of the disclosure. In a mutual capacitance column-to-row scan, the column trace 402 can be coupled to the transmit section 320 to act as a drive line to stimulate the column trace 402 and one or more row traces 401 can be coupled to the receive section 330 to act as sense lines to transmit mutual capacitance signals thereto. When an object touches or hovers over the touch node 406, the mutual capacitance Cm can be reduced by ΔCm, i.e., (Cm−ΔCm), corresponding to the amount of charge shunted through the object to ground. This mutual capacitance change can be transmitted to sense amplifier 408 in the receive section 330, which can be coupled to the row trace 401, to indicate the touch or hover event and its location.

In some examples, the row traces 401 or column traces 402 can be stimulated one at a time. In other examples, multiple row traces 401 or column traces 402 can be stimulated simultaneously.

Figure 5A:
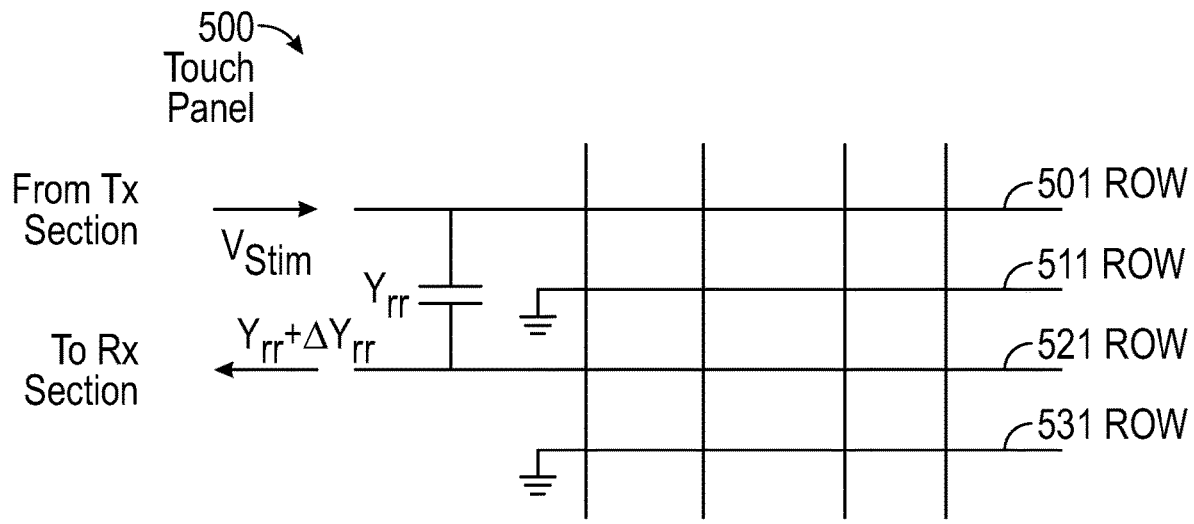
FIGS. 5A and 5B illustrate an exemplary touch sensor panel operable with an exemplary touch controller to perform a mutual capacitance row-to-row scan according to examples of the disclosure.
Figure 5B:
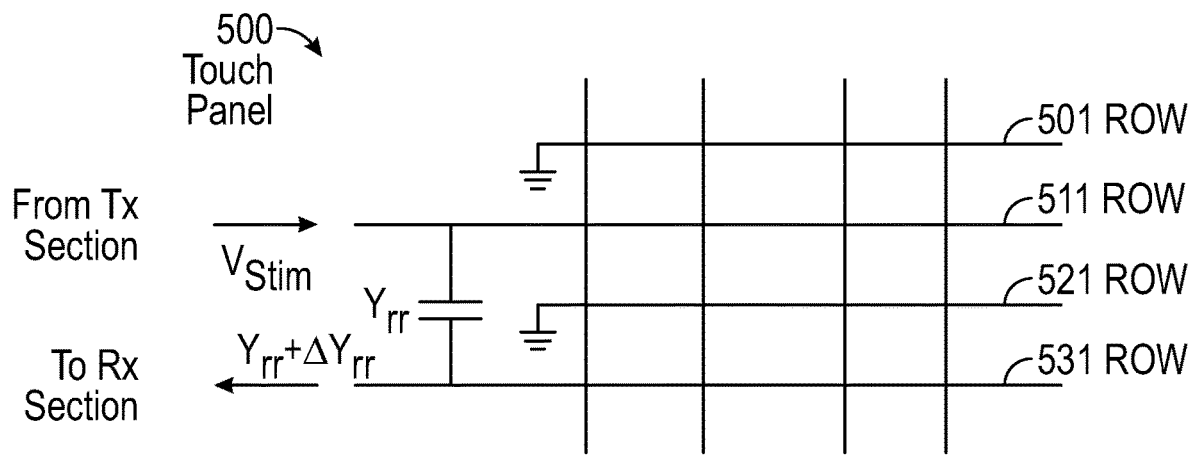

FIGS. 5A and 5B illustrate an exemplary touch sensor panel operable with the touch controller of FIG. 3 to perform a mutual capacitance row-to-row scan according to examples of the disclosure. Touch sensor panel 500 can be configured to form a row-to-row electrode pattern of the first row 501 as a drive trace, the second row 511 as a ground trace, the third row 521 as a sense trace, the fourth row 531 as another ground trace, and the pattern repeated for the remaining rows. The row drive and sense traces 501, 521 can form mutual capacitance Yrr therebetween. The row drive trace 501 can be stimulated by stimulation signals Vstim provided by transmit section 320 (not shown) and the row sense trace 521 can transmit mutual capacitance Yrr to receive section 330 (not shown). When an object touches or hovers over or in between row drive trace 501 and row sense trace 521, the mutual capacitance Yrr can be increased by ΔYrr, i.e., (Yrr+ΔYrr), corresponding to the charge shunted through the object to ground. To ensure that mutual capacitances can be measured for all the rows, the touch sensor panel 500 can be configured to form another row-to-row electrode pattern of the first row 501 as a ground trace, the second row 511 as a drive trace, the third row 521 as another ground trace, the fourth row 531 as a sense trace, and the pattern repeated for the remaining rows, as illustrated in FIG. 5B. Like the previous pattern, the row drive trace 511 can be stimulated and the row sense trace 531 can transmit the mutual capacitance Yrr. Accordingly, the mutual capacitances Yrr can be measured in a first operation at one row-to-row electrode pattern, followed by a second operation at the other row-to-row electrode pattern. In some examples, the row drive traces can be stimulated one at a time. In some examples, multiple row drive traces can be stimulated at the same time. During the mutual capacitance row-to-row scan the column traces can be coupled to ground.

As illustrated in FIGS. 5A and 5B, a row trace can be configured as a ground or static common mode (e.g., DC) voltage trace to separate the row drive and sense traces. This can be done when the traces are very close together so as to avoid strong mutual capacitances between adjacent traces affected by a finger at or proximate thereto, which can adversely affect the trace-to-trace mutual capacitance measurements. In other examples, when the spacing between rows is sufficient, the ground traces can be omitted such that the row-to-row electrode pattern can include the first row as a drive trace, the second row as a sense trace, and the pattern repeated for the remaining rows. In other examples, it is possible to have more than one ground trace in between drive rows and sense rows.

Figure 6A:
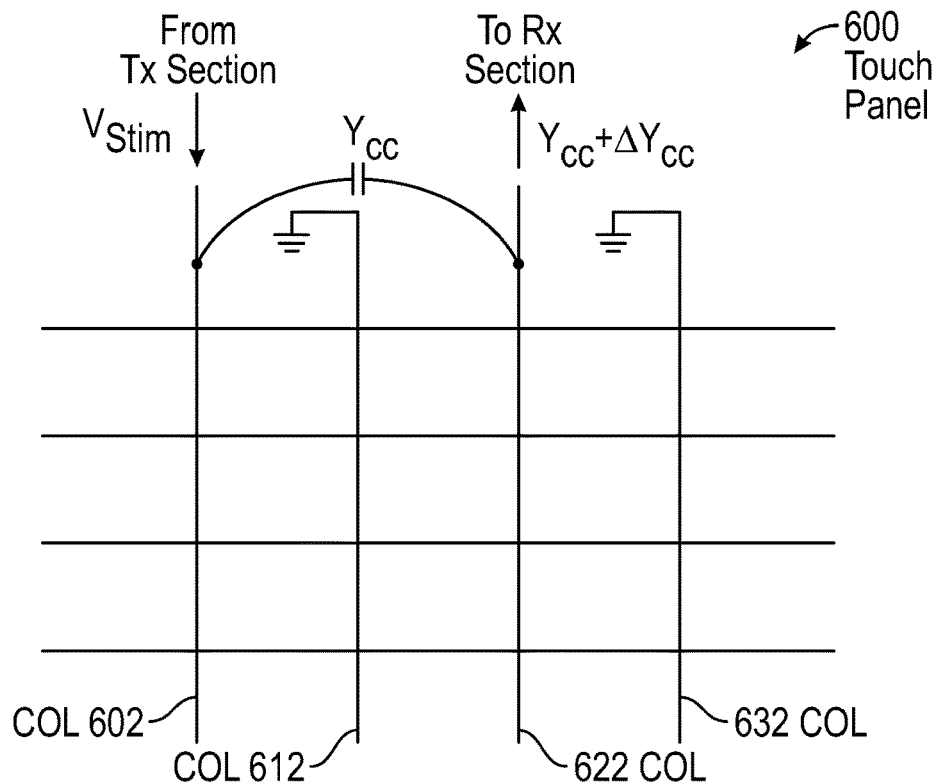
FIGS. 6A and 6B illustrate an exemplary touch sensor panel operable with an exemplary touch controller to perform a mutual capacitance column-to-column scan according to examples of the disclosure.
Figure 6B:
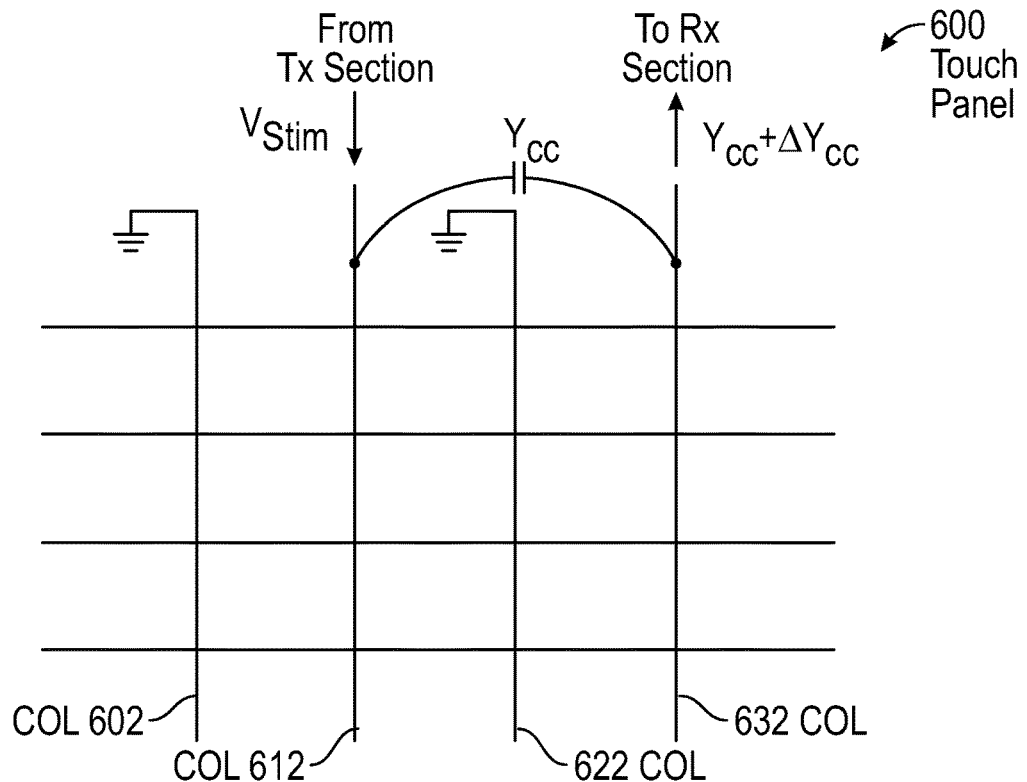

FIGS. 6A and 6B illustrate an exemplary touch sensor panel operable with the touch controller of FIG. 3 to perform a mutual capacitance column-to-column scan according to examples of the disclosure. Touch sensor panel 600 can be configured to form a column-to-column electrode pattern of the first column 602 as a drive trace, the second column 612 as a ground trace, the third column 622 as a sense trace, the fourth column 632 as another ground trace, and the pattern repeated for the remaining columns. The column drive and sense traces 602, 622 can form mutual capacitance Ycc therebetween. The column drive trace 602 can be stimulated by stimulation signals Vstim provided by transmit section 320 (not shown) and the column sense trace 622 can transmit mutual capacitance Ycc to receive section 330 (not shown). When an object touches or hovers over or in between column drive trace 602 and column sense trace 622, the mutual capacitance Ycc can be increased by ΔYcc, i.e., (Ycc+ΔYcc), corresponding to the charge shunted through the object to ground. To ensure that mutual capacitances can be measured for all the columns, the touch sensor panel 600 can be configured to form another column-to-column electrode pattern of the first column 602 as a ground trace, the second column 612 as a drive trace, the third column 622 as another ground trace, the fourth column 632 as a sense trace, and the pattern repeated for the remaining columns, as illustrated in FIG. 6B. Like the previous pattern, the column drive trace 612 can be stimulated and the column sense trace 632 can transmit the mutual capacitance Ycc. Accordingly, the mutual capacitances Ycc can be measured in a first operation at one column-to-column electrode pattern, followed by a second operation at the other column-column electrode pattern. In some examples, the column drive traces can be stimulated one at a time. In some examples, multiple column drive traces can be stimulated at the same time. During the mutual capacitance column-to-column scan the row traces can be coupled to ground.

As illustrated in FIGS. 6A and 6B, a column trace can be configured as a ground trace to separate the column drive and sense traces. This can be done when the traces are very close together so as to avoid strong mutual capacitances between adjacent traces affected by a finger at or proximate thereto, which can adversely affect the trace-to-trace mutual capacitance measurements. In other examples, when the spacing between columns is sufficient, the ground traces can be omitted such that the column-to-column electrode pattern can include the first column as a drive trace, the second column as a sense trace, and the pattern repeated for the remaining rows. In other examples, it is possible to have more than one ground trace in between drive columns and sense columns.

As discussed above with respect to a mutual capacitance row-to-column scan, in mutual capacitance row-to-row and mutual capacitance column-to-column scans, an object touching or hovering over touch nodes (e.g. a finger or a passive stylus) can reduce the mutual capacitance Yrr by ΔYrr or reduce the mutual capacitance Ycc by ΔYcc, corresponding to the amount of charge shunted through the object to ground. This mutual capacitance change can be transmitted to sense amplifiers in the receive section 330, which can indicate the touch or hover event and its location.

Figure 7A:
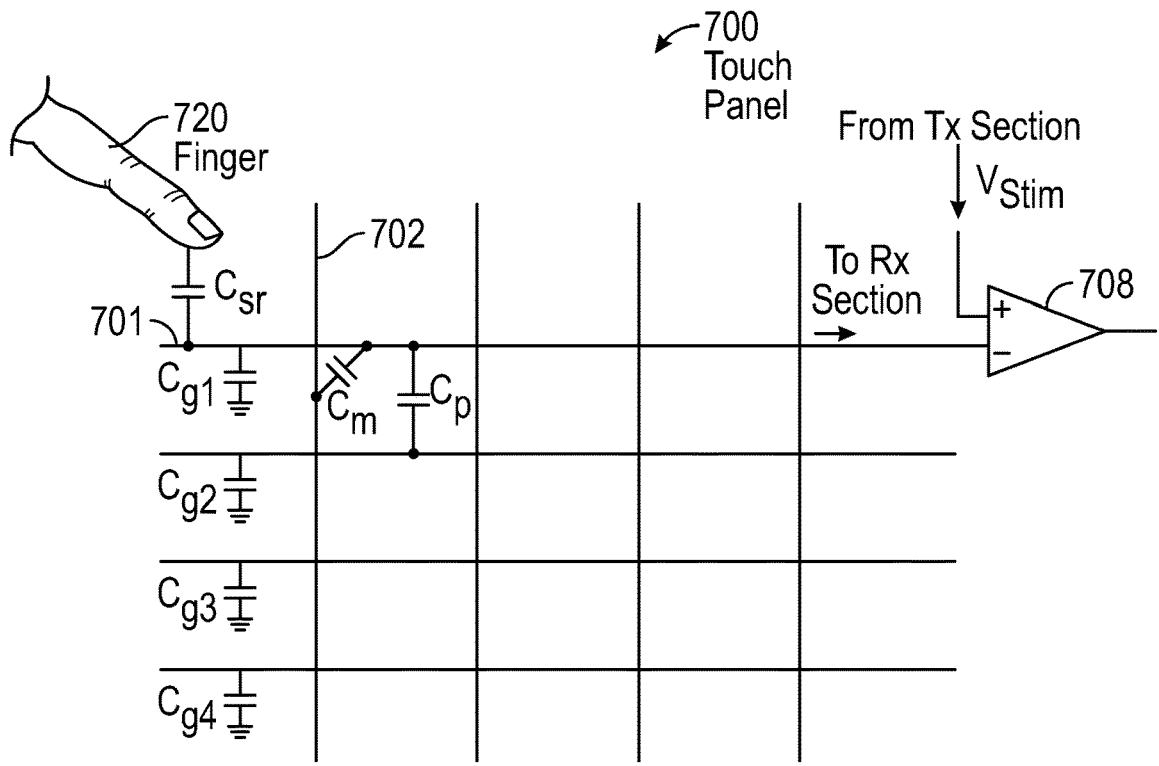
FIGS. 7A and 7B illustrate an exemplary touch sensor panel operable with an exemplary touch controller to perform self-capacitance row scans and self-capacitance column scans according to examples of the disclosure.
Figure 7B:
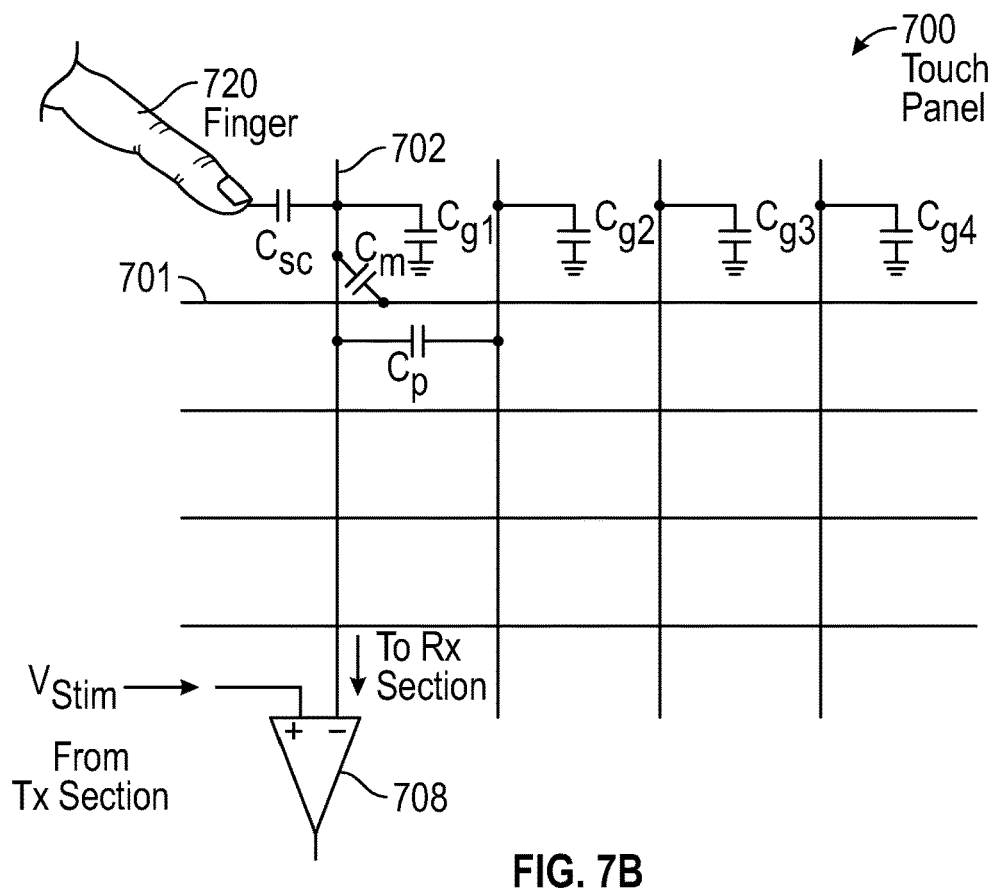

FIGS. 7A and 7B illustrate an exemplary touch sensor panel operable with the touch controller of FIG. 3 to perform self-capacitance row scans and self-capacitance column scans according to examples of the disclosure. During a self-capacitance row scan, the row traces 701 of touch sensor panel 700 can act as touch electrodes (or nodes). Row traces 701 can be coupled to the inverting input of sense amplifiers 708 in receive section 330. The non-inverting input of the sense amplifier 708 can be stimulated with an AC stimulus Vstim, which effectively induces Vstim on the row trace coupled to the inverting input of the sense amplifier. Row traces 701 can have a self-capacitance to ground Cg when no object touches or hovers over row trace 701. The self-capacitance to ground Cg can be different for each row trace 701. When an object, such as finger 720 (or a passive stylus), touches or hovers over a row trace 701, an additional self-capacitance Csr can form between the object and the row trace 701, thereby increasing the self-capacitance at the row trace 701. This self-capacitance change can be transmitted to sense amplifier 708 in receive section 330, which can be coupled to the row trace 701, to indicate the touch or hover event and its location.

Similarly, during a self-capacitance column scan, the column traces 702 of touch sensor panel 700 can act as touch electrodes (or nodes). Column traces 702 can be coupled to the inverting input of sense amplifiers 708 in receive section 330. The non-inverting input of the sense amplifier 710 can be stimulated with an AC stimulus Vstim. Column traces 702 can have a self-capacitance to ground Cg when no object touches or hovers over column traces 702. When an object, such as finger 720, touches or hovers over a column traces 702, an additional self-capacitance Csc can form between the object and the column trace 702, thereby increasing the self-capacitance at the column trace 702. This self-capacitance change can be transmitted to sense amplifier 708 in receive section 330, which can be coupled to the column trace 702, to indicate the touch or hover event and its location.

Although the self-capacitance row scan and self-capacitance column scan described above can occur as independent scans, in some examples, the self-capacitance row scans and self-capacitance column scans can occur as concurrent or partially concurrent scans. Additionally, although FIGS. 7A and 7B show all row traces stimulated simultaneously or all column traces stimulated simultaneously, in some examples some or all of the traces can be stimulated individually or in groups.

Parasitic capacitance Cp can be produced by various sources in and around the touch sensor panel and affect how accurately the receive section 330 can detect capacitance changes created by the touching or hovering object. The effects of parasitic capacitance can include lower signal-to-noise ratio of the desired signal, a decreased dynamic sensing range of the desired signal at the panel, higher power requirements, and the like. In FIG. 7A, for example, parasitic capacitance Cp can form between adjacent row traces 701 and can form between row traces 701 and column traces 702 (illustrated as Cm). In FIG. 7B, for example, parasitic capacitance Cp can form between adjacent column traces 702 and between row traces 701 and adjacent column traces 702 (illustrated as Cm). It is to be understood that other sources and locations of parasitic capacitance can also be possible. For example, parasitic capacitances can also form in between column traces or row traces and ground. In the case of self-capacitance scans, cancelation circuitry (not shown) can be located in the transmit section 320, the receive section 330, or both to cancel the effects of the parasitic capacitance Cp on the touch signals from the touch sensor panel 700. The cancellation circuitry can similar to the parasitic capacitance circuits described in U.S. patent application Ser. No. 14/067,870 (Shahparnia et al.) which is hereby incorporated by reference. The scan engine 310 can configure the cancelation circuitry to perform the parasitic capacitance Cp cancelation. In some examples, in conjunction with the self-capacitance row scan, the touch sensor panel can also perform a self-capacitance guard scan on the column traces to cancel parasitic capacitance Cp forming between row traces 701 and column traces 702. During the self-capacitance guard scan, column traces 702 can be coupled to the transmit section 320 to drive the column traces to cancel the parasitic capacitance Cp formed between the column trace 702 and the row traces 701. The self-capacitance guard scan can be similarly performed on row traces 701 during the self-capacitance column scan.

As discussed above, in the case of mutual capacitance row-to-row and column-to-column scans, rows between a driving row trace and a sensing row trace (e.g. row 511 in FIG. 5A) or columns between a driving column trace and a sensing column trace (e.g. column 612 in FIG. 6A) can be grounded such the adjacent rows or columns are not acting as driving and sensing traces to reduce parasitic capacitance effects.

Figure 8:
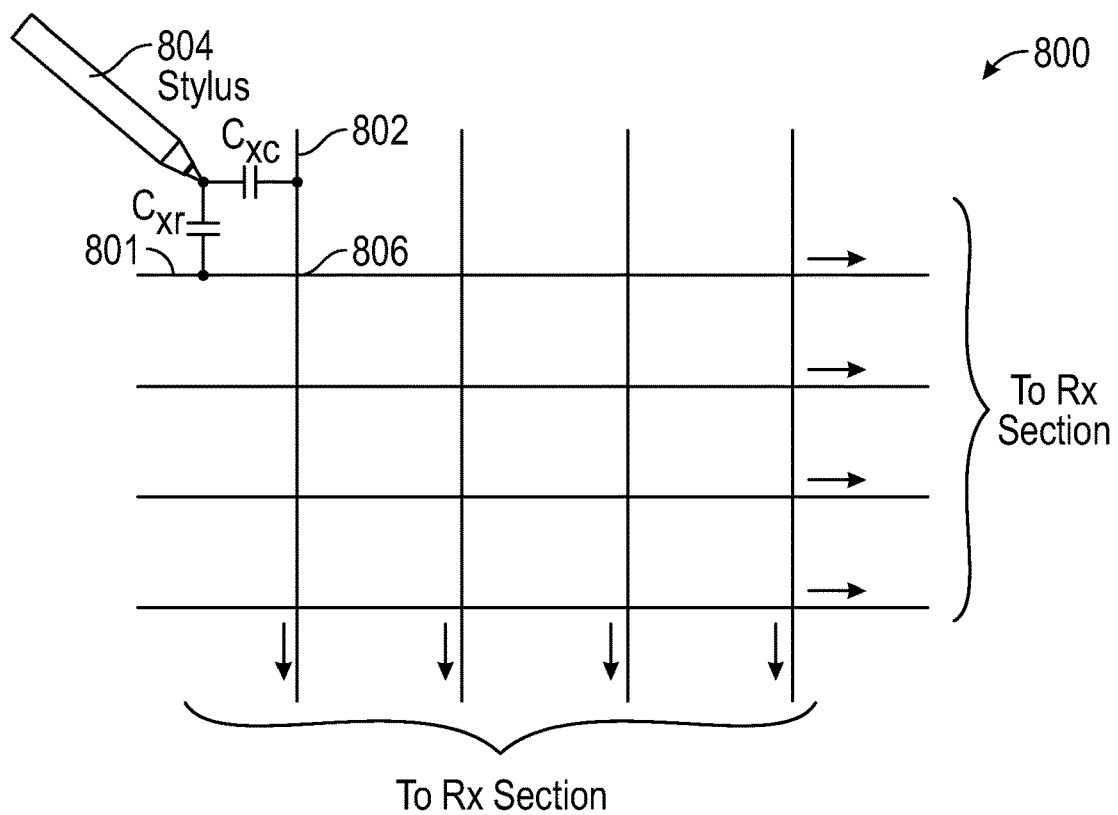
FIG. 8 illustrates an exemplary touch sensor panel operable with an exemplary touch controller to perform stylus scans according to examples of the disclosure.

FIG. 8 illustrates an exemplary touch sensor panel operable with the touch controller of FIG. 3 to perform stylus scans according to examples of the disclosure. During a stylus scan, one or more stimulation signals can be injected by stylus 804 at the touch node 806 and can create capacitive coupling Cxr between the stylus 804 and the row traces 801 and Cxc between the stylus 804 and the column traces 802 at the touch node 806. During the stylus scan, the transmit section 320 can be disabled, i.e., no stimulation signals Vstim sent to the touch sensor panel 800. The capacitive coupling can be transmitted to the receive section 330 by the row and column traces of the touch node 806 for processing. As described above, in some examples the one or more stylus stimulation signals can have one or more frequencies. The frequencies can be selected by the touch controller 102 using information from a stylus spectral analysis scan (described below in more detail). This frequency information can be wirelessly communicated to the stylus 804 so that the stylus 804 can generate stimulation signals at the appropriate frequency.

Figure 9:
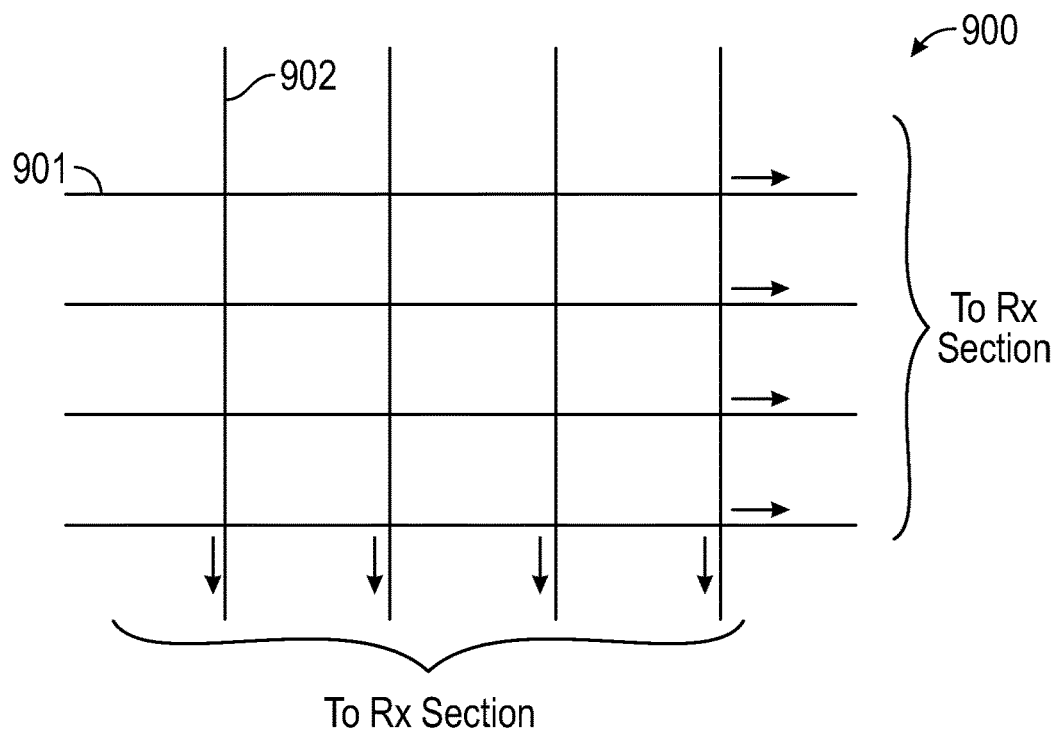
FIG. 9 illustrates an exemplary touch sensor panel operable with an exemplary touch controller to perform stylus spectral analysis scans or touch spectral analysis scans according to examples of the disclosure.

FIG. 9 illustrates an exemplary touch sensor panel operable with the touch controller of FIG. 3 to perform stylus spectral analysis scans or touch spectral analysis scans according to examples of the disclosure. During a stylus spectral analysis scan or a touch spectral analysis scan, the transmit section 320 can be disabled, i.e., no stimulation signals Vstim sent to the touch sensor panel 900, while some or all of the row traces 901 and column traces 902 can be coupled to the receive section 330. The receive section 330 can receive and process touch signals from some or all of the rows and columns of the touch sensor panel 900 in order to determine one or more low noise frequencies for use during subsequent self-capacitance and/or mutual capacitance scans and/or stylus scans. Stylus spectral analysis scans and touch spectral analysis scans are described in more detail below.

When the stylus 200 first connects or reconnects wirelessly to the computing system 100 it can receive frequency information from the computing system 100. A stylus spectral analysis scan can determine one or more clean frequencies for the stylus to use to generate one or more stimulation signals. The computing system 100 and stylus 200 can communicate (including, for example, performing a handshake between the two devices) and computing system 100 can transmit the frequency information to the stylus 200 such that the stylus knows the appropriate one or more frequencies to use to generate one or more stimulation signals.

The stylus 200 can change at least one stimulation frequency as a result of a stylus spectral analysis scan. In some examples the stylus 200 can be synchronous with the computing system 100. A synchronous stylus 200 can save power by generating stimulation signals only during a stylus scan event. Thus, a stylus spectral analysis scan can execute while the stylus 200 is predicted to not be generating a stimulation signal, e.g. when a stylus scan is not executing. After completing the stylus spectral analysis scan, the wireless communication chip 250 can communicate with the wireless communication chip 206 of stylus 200 (including, for example, performing a handshake between the two devices). The communication can cause the stylus 200 to change the one or more stimulation frequencies and indicate to the computing system 100 that the stylus 200 has switched frequencies or will switch frequencies at a known time. The computing system 100 can then switch the one or more frequencies used for demodulating stylus scan events.

In other examples, stylus 200 can be asynchronous such that the stylus 200 can generate one or more stimulation signals at one or more stimulation frequencies irrespective of the timing of the stylus scan event. As a result the stylus 200 can be stimulating the touch sensor panel 220 during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 100 can assume that stylus lift off will eventually occur and wait until lift off to initiate a stylus spectral analysis scan. The computing system 100 can predict a lift off condition using the results of other scans, e.g. stylus scans, or stylus force information to predict that the stylus is not on the panel, and then perform a stylus spectral analysis scan.

Figure 10:
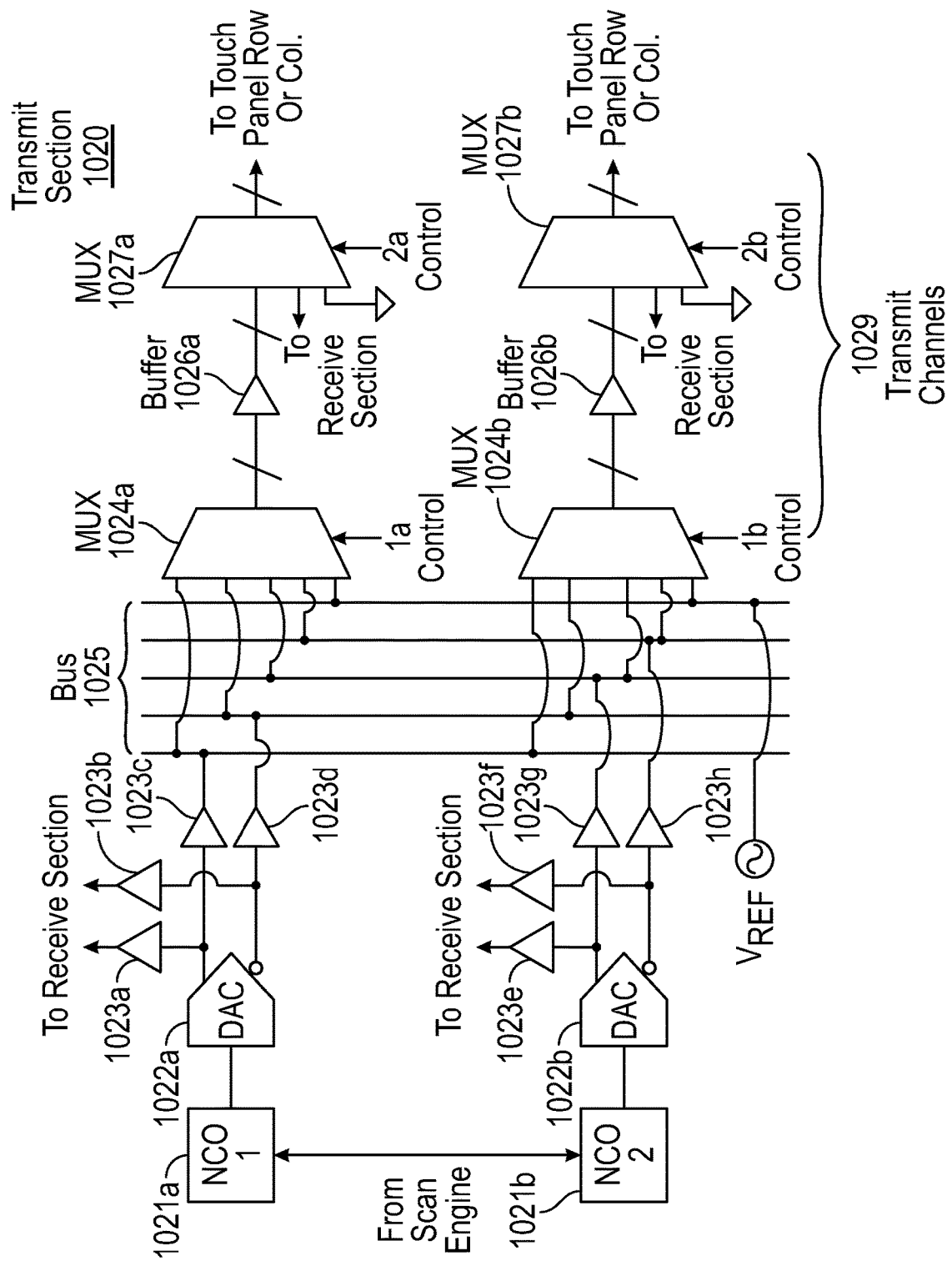
FIG. 10 illustrates an exemplary transmit section of an exemplary touch controller, where the transmit section can generate stimulation signals Vstim to drive the row or column traces of a touch panel according to examples of the disclosure.

FIG. 10 illustrates an exemplary transmit section of the touch controller of FIG. 2, where the transmit section can generate stimulation signals Vstim to drive the row or column traces of a touch panel according to examples of the disclosure. In the example of FIG. 10, transmit section 1020 can include transmit numerically-controlled oscillators (NCOs) 1021a, 1021b, transmit digital-to-analog converters (DACs) 1022a, 1022b, transmit buffers 1023a through 1023h, and multiple transmit channels 1029 coupled to bus 1025. The NCOs 1021a, 1021b can provide phase and frequency data for the stimulation signals Vstim, where NCO 1021a can provide one frequency and NCO 1021b, another frequency ω2, such that the stimulation signals Vstim can have different frequencies. The transmit DACs 1022a, 1022b can be coupled to the NCOs 1021a, 1021b and convert the stimulation signals from NCOs 1021a, 1021b from digital to analog and provide polarities (phases) for the stimulation signals. Accordingly, the transmit DAC 1022a can output a stimulation signal Vstim1+ with a frequency ω1 and a positive (+) polarity, and a stimulation signal Vstim1− with the frequency ω1 and a negative (−) polarity, while the transmit DAC 1022b can output a stimulation signal Vstim2+ with a frequency ω2 and a (+) polarity, and a stimulation signal Vstim2− with the frequency ω2 and a (−) polarity.

The transmit buffers 1023a through 1023h can be coupled to the transmit DACs 1022a, 1022b and buffer the outputted stimulation signals Vstim1+, Vstim1−, Vstim2+, Vstim2−. Transmit buffer 1023c can output Vstim1+ to the bus 1025, transmit buffer 1023d can output Vstim1− to the bus 1025, transmit buffer 1023g can output Vstim2+ to the bus 1025, and transmit buffer 1023h can output Vstim2− to the bus 1025. Similarly, transmit buffer 1023a can output Vstim1+ to the receive section, transmit buffer 1023b can output Vstim1− to the receive section, transmit buffer 1023e can output Vstim2+ to the receive section, and transmit buffer 1023f can output Vstim2− to the receive section, where the Vstim signals can be used to generate signals to cancel parasitic capacitance Cp in the touch signals and to stimulate the non-inverting input of sense amplifiers for self-capacitance row or column scans.

FIG. 10 illustrates two transmit channels 1029. One transmit channel 1029 can be coupled to the bus 1025 and can include multiplexer 1024a, buffer 1026a, and multiplexer 1027a. The first multiplexer 1024a can select which of the stimulation (Vstim) or reference (Vref) signals to transmit. A stimulation matrix (not shown) can provide data to control signal 1a to select which Vstim or Vref signal to transmit. The stimulation matrix can be part of the panel scan engine. The selected signal can be buffered at buffer 1026a and then outputted to the second multiplexer 1027a. The second multiplexer 1027a can select the coupling of a row or column trace during various scan events based on control signal 2a, which can be sent by the panel scan engine. For example, the panel scan engine can select a stimulation signal from multiplexer 1024a using control 1a and couple the signal to the touch sensor panel using the second multiplexer 1027a and control 2a. In some configurations, for example a mutual capacitance row-to-column configuration, coupling the signal to the touch panel can include coupling the stimulation signal to row traces or column traces to drive the touch sensor panel to perform a mutual capacitance scan. In some configurations, for example spectral analysis scans, the row and/or column traces of the touch sensor panel can be coupled to the receive section via multiplexers like multiplexer 1027a. In some configurations, for example, mutual capacitance row-to-row scans, the column traces can be unused and the second multiplexer 1027a can couple the column traces to ground. Although multiplexer 1027a can be a part of transmit channel 1029, in other examples, multiplexer 1027a can be implemented outside of transmit channel 1029.

Another of the transmit channels 1029 can be coupled to the bus 1025 and can include multiplexer 1024b, buffer 1026b, and multiplexer 1027b, which can operate in a similar manner as the transmit channel 1029 described previously. With the transmit channels of FIG. 10, different types of scans can be performed as discussed above. For example, Vstim signals from the transmit section shown in FIGS. 4A through 7B can be coupled to the respective rows, columns, or non-inverting sense amplifier inputs based on the type of scan to be performed.

In an example mutual capacitance row-column scan, the transmit section 1020 can perform as follows. The transmit NCOs 1021a, 1021b can generate digital stimulation signals. The transmit DACs 1022a, 1022b can convert the digital signals into analog signals and transmit the analog stimulation signals to the transmit channels 1029. The transmit channels 1029 can transmit the stimulation signals Vstim to corresponding row (drive) traces of the touch sensor panel. The polarities (and/or other signal parameters) of the stimulation signals Vstim transmitted by the transmit channels 1029 can be set based on data in a stimulation matrix. The stimulation matrix can be used to encode phases of the stimulation signals necessary for simultaneous multi-stimulation of the touch sensor panel. The panel scan engine 310 can configure the transmit section 1020 and control the timing of the stimulation signal transmissions to the drive traces using control signals 1*a* and 2*a*.

It should be understood that although each of the transmit channels 1029 are illustrated as having one multiplexer coupled to bus 1025 and one multiplexer coupled to a row or column trace, the number of multiplexers need not be determined based on the number of transmit channels. In some examples, the number of multiplexers coupled to bus 1025 can be the same as the number of DACs (i.e., one multiplexer per DAC). Thus, in the example illustrated in FIG. 10, there can be two transmit DACs 1022*a* and 1022*b* and two multiplexers 1024*a* and 1024*b*, but in a system with four DACs, for example, there can be four multiplexers connected to bus 1025. The analog stimulation signals can be transmitted from bus 1025 via the multiplexer to one or more transmit channels 1029. The output of multiplexers 1024*a* and 1024 are illustrated as a bus to indicate that the analog stimulation signals from the respective DACs can be transmitted to a plurality of different traces. The number of multiplexers coupled to row and column traces can be the same as the number of row and column traces (i.e., one multiplexer per trace). Thus, in the example illustrated in FIG. 10, there can be two transmit channels connected to two traces ("to touch row or col.") and two multiplexers 1027*a* and 1027*b*. In a system with 30 transmit channels, there can be 30 multiplexers like multiplexers 1027*a* and 1027*b*.

It should be understood that additional and/or other components of the transmit section 1020 can be used to generate stimulation signals Vstim to drive a touch panel.

Figure 11:
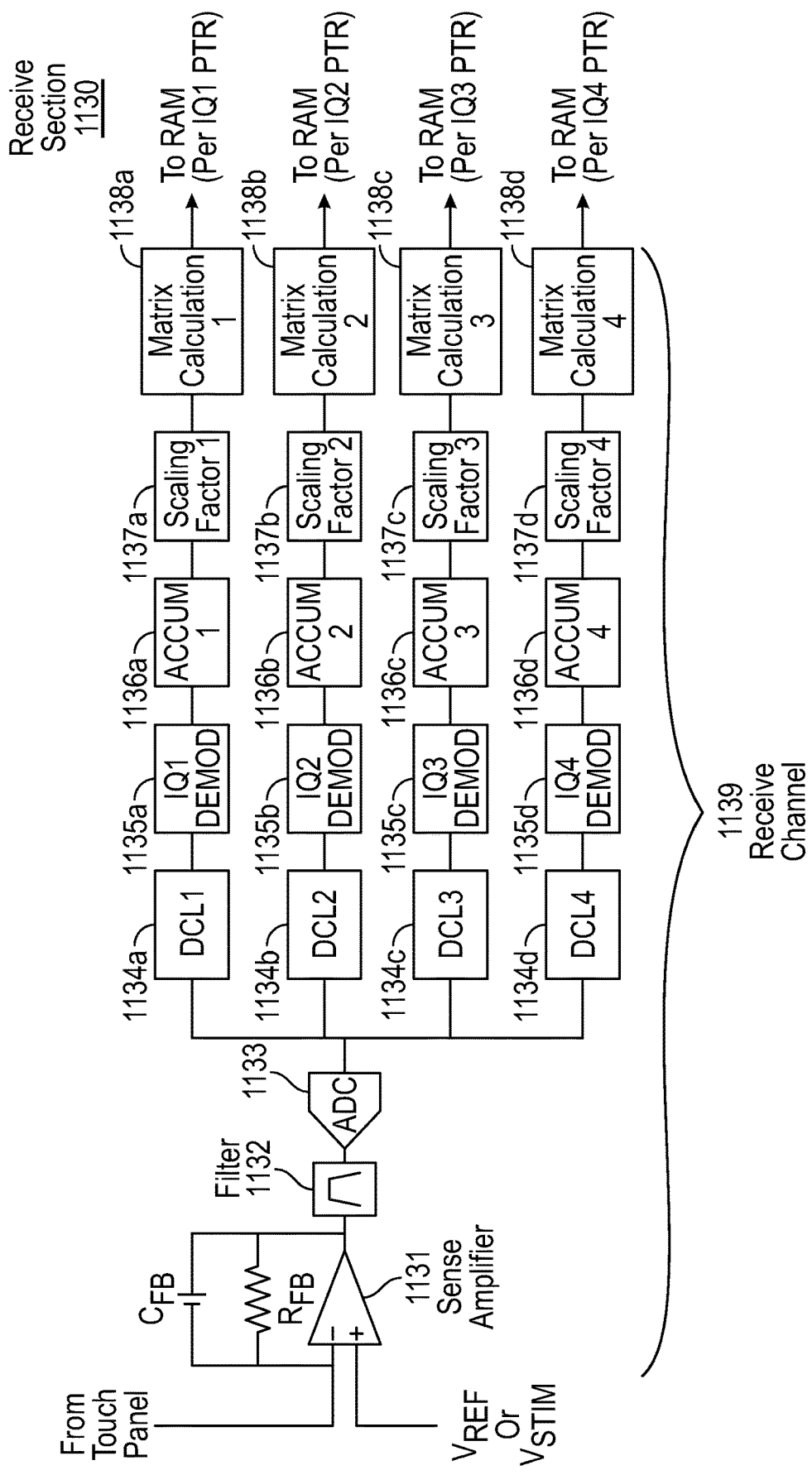
FIG. 11 illustrates an exemplary receive section of an exemplary touch controller, where the receive section can receive and process touch signals from a touch sensor panel according to examples of the disclosure.

FIG. 11 illustrates an exemplary receive section of the touch controller of FIG. 3, where the receive section can receive and process touch signals from a touch sensor panel according to examples of the disclosure. In the example of FIG. 11, receive section 1130 can include multiple receive channels 1139. FIG. 11 illustrates one of the receive channels 1139. The receive channel 1139 can include sense amplifier 1131 to receive and amplify the touch signal according to feedback capacitor Cfb and feedback resister Rfb. The sense amplifier 1131 can receive the touch signal at the inverting input and either Vref or Vstim at the non-inverting input. As described previously, to facilitate self-capacitance touch sensing, Vstim can be routed from the transmit section to the receive section, where it is inputted to the non-inverting input of the sense amplifier 1131. The receive channel 1139 can also include a low-pass or bandpass filter 1132 to filter the output of sense amplifier 1131 and analog-to-digital converter (ADC) 1133 to convert the analog touch signal to a digital signal.

The receive channel 1139 can further include one or more in-phase and quadrature (IQ) demodulators. For example, FIG. 11 illustrates a sense channel having four IQ demodulators 1135*a* through 1135*d* to demodulate the touch signals. Multiple demodulators can be advantageous because multiple scan events can be performed at the touch panel concurrently or at least partially concurrently with multiple demodulators as will be described in more detail below. IQ demodulators 1135*a* through 1135*d* can be coupled to delay compensation logic (DCLs) 1134*a* through 1134*d* and accumulators 1136*a* through 1136*d*. For example DCL 1134*a* can receive the digital touch signal from the ADC 1133 to perform any phase adjustments on the signal caused by circuit delays. The IQ demodulator 1135*a* can receive the touch signal from the DCL 1134*a* and demodulate the signal. In some examples, the demodulator 1135*a* can output the in-phase (I) component of the touch signal. In some examples, the demodulator 1135*a* can output the quadrature (Q) component of the touch signals. In some examples, the demodulator 1135*a* can output both the I and Q components. Accumulator 1136*a* can receive the demodulated touch signal from IQ demodulator 1135*a*. The accumulated signal can be scaled by scaling factor module 1137*a*. A scaling factor can be determined based on the path of a digital signal processor, for example. The accumulated signal can be operated on by a matrix calculation module 1138*a* and the signal can be sent to the RAM for storage. The DCLs, IQ demodulators, accumulators, scaling factor modules and matrix calculation modules of the other receive channels 1139 can operate similarly.

The matrix calculation module 1138*a* can be used to implement multistep accumulation. For example, each accumulated step can be multiplied by a constant and accumulated to the previous value. At the conclusion of a predefined number of steps, for example, the final result can be stored in memory. The constant value used to multiply an accumulation step for a given channel can be derived from the inverse matrix of the stimulation matrix used to encode phases of the stimulation signals. Thus, the matrix calculation can be necessary for decoding phases for a signals generated by simultaneous multi-stimulation of the touch sensor panel.

In an example operation, the receive section 1130 can perform as follows. The receive channels 1139 can receive the touch signals from the touch sensor panel at the sense amplifier 1131. The receive channels 1139 can filter the received touch signals with the bandpass filter 1132, convert the analog touch signals to digital signals with ADC 1133, and transmit the digital signals to the demodulators 1135*a* through 1135*d* for further processing. The demodulators 1135*a* through 1135*d* can receive phase-adjusted touch signals from DCLs 1134*a* through 1134*d* and output the demodulated touch signals to the accumulators 1136*a* through 1136*d*, where the touch signals can then be transmitted to the RAM for storage after being scaled and decoded by scaling factor modules 1137*a* through 1137*d* and matrix calculation module 1138*a* through 1138*d*. The panel scan engine 310 can configure the receive section 1130 and control the processing and transmission of the touch signals.

Although the DCLs illustrated in FIG. 11 can be implemented such that each IQ demodulator has its own DCL 1134*a* through 1134*d* applying the total individual delay for the specific demodulator path, in other implementations, a global delay can be applied to the output of the ADC and then the subsequent DCLs 1134*a* through 1134 can apply an incremental delay specific to each demodulator path. Thus, for example the total delay for each demodulator path can be the sum of the global delay plus a local delay applied by DCL 1134*a* through 1134*d*.

It should be understood that additional and/or other components of the receive section 1130 can be used to process touch signals from a touch sensor panel.

Figure 22A:
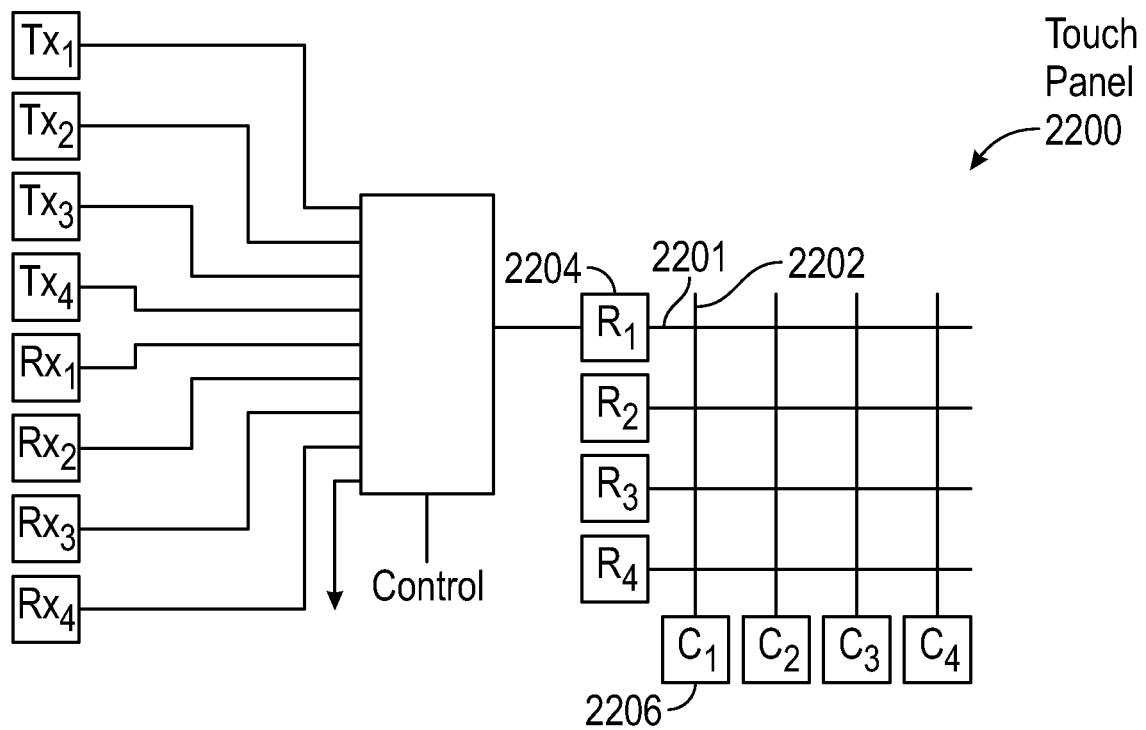
FIGS. 22A and 22B illustrate exemplary coupling between transmit/receive channels and row/column traces according to examples of the disclosure.
Figure 22B:
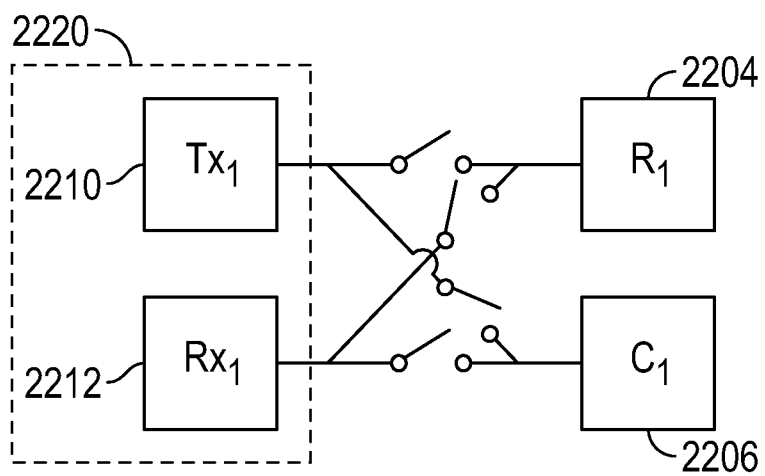

During a scan event, the scan engine can couple each row or column electrode to either the transmit section, the receive section or ground. FIGS. 22A and 22B illustrate exemplary coupling between transmit/receive channels and row/column traces according to examples of the disclosure.

In some examples, any row or column trace of the touch sensor panel can be coupled to any transmit channel or a receive channel. For example, FIG. 22A illustrates an exemplary touch sensor panel 2200 with four row traces and four column traces. Each row or column trace can be coupled via a multiplexer to one of four transmit channels (Tx1 through Tx4), four receive channels (Rx1 through Rx4) or ground. For example, row trace 2201 can be coupled to the output of multiplexer 2208 at pin R1 2204 and the scan engine can select which Tx, Rx or ground to couple to row trace 2201. Similarly, column trace 2202 can be coupled to a similar multiplexer at pin C1 2206 and the scan engine can select which Tx, Rx or ground to couple to the column trace 2202. In other examples, a given row or column trace can be coupled to fewer than all possible transmit or receive channels.

In other examples, pairs of traces can be coupled to a specific transmit channel and receive channel pair. FIG. 22B illustrates an exemplary pair of traces and an exemplary transmit channel and receive channel pair according to examples of the disclosure. Transmit channel and receive channel pair 2220 can include Tx1 2210 and Rx1 2212. The pair of traces can include row trace 2201 and column trace 2202 coupled to the transmit/receive channel pair 2220 at pins R1 2204 and C1 2206. R1 can be coupled to either Tx1 or Rx1 or ground (not shown) and C1 can be coupled to either Tx1 or Rx1 or ground (not shown). Using a transit/receive channel pair can allow for configuration of the touch sensor panel by axis rather than on a pin by pin basis. For example, if a scan event transmits stimulus signals on row traces (e.g. y-axis) and receives touch signals on column traces (e.g. x-axis), each transmit/receive channel pair 2220 can couple the row trace to the transmit section and the column trace to the receive section. Alternatively, if a scan event transmit stimulus signals on column traces and receives touch signals on row traces, each transmit/receive channel pair 2220 can couple the column trace to the transmit section and the row trace to the receive section.

Figure 12:
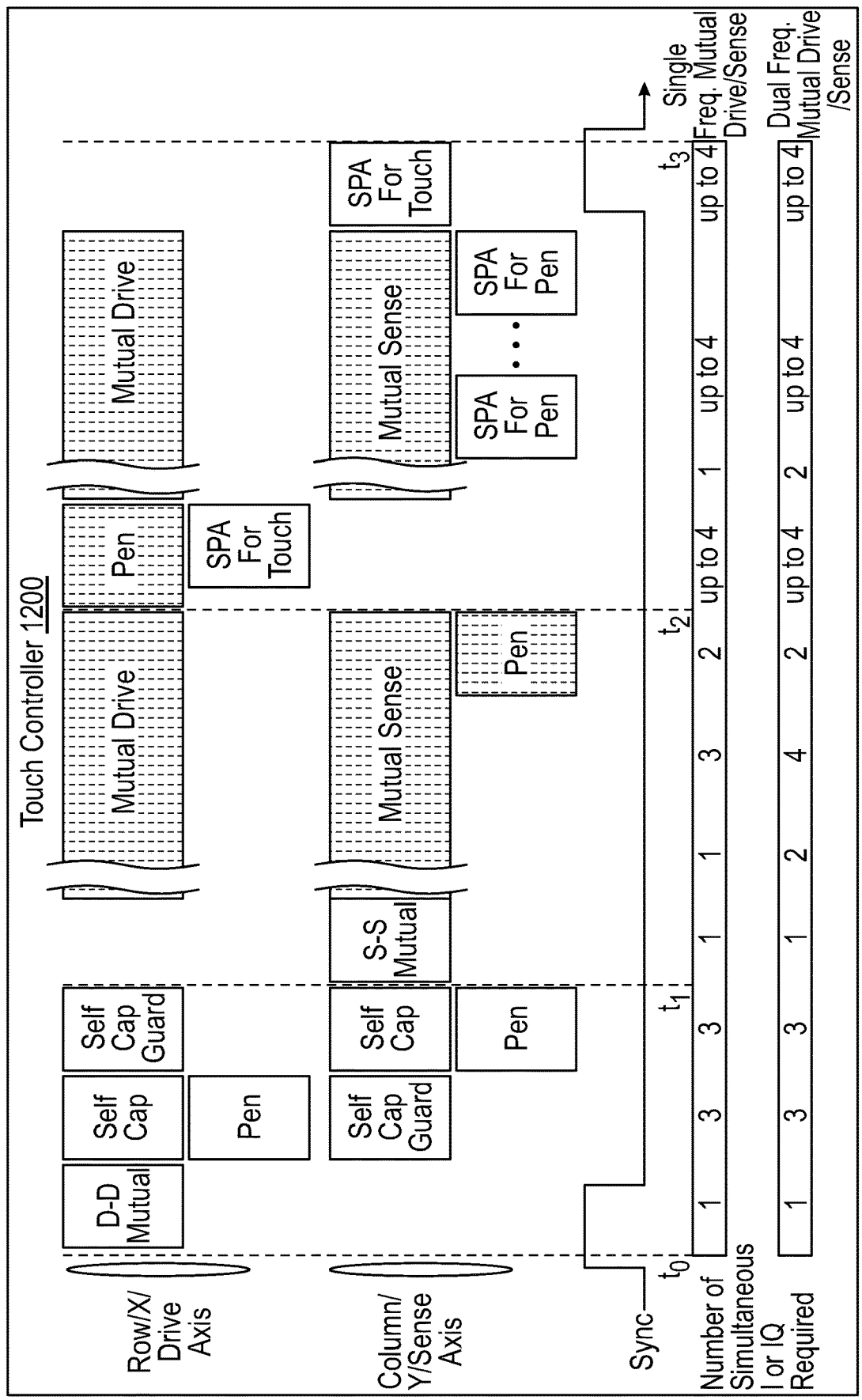
FIG. 12 illustrates an exemplary scan architecture of a touch controller in which various scan events can be performed at a touch sensor panel under the direction of the touch controller according to examples of the disclosure.

FIG. 12 illustrates an exemplary scan architecture of a touch controller, e.g., the touch controller 300 of FIG. 3, in which various scan events can be performed at a touch sensor panel under the direction of the touch controller according to examples of the disclosure. In the example of FIG. 12, a panel scan engine of the touch controller can execute a scan plan, which can define a sequence of scan events to be performed at a touch sensor panel, the timing of each scan event, and when the scan events can be interrupted so that a system processor can store scan results in RAM. The panel scan engine can await a SYNC signal from the host processor to begin the scan plan. In a device with an LCD display, for example, the SYNC signal can indicate that the display proximate to the touch sensor panel is in a blanking mode, before starting the scan sequence. In some cases, the display device can interfere with touch signals, particularly when scanning row electrodes, during a display mode. Accordingly, scan events that generate touch signals susceptible to interference from the display can be scheduled to execute during the display's blanking mode rather than its display mode. Alternatively, the firmware on the touch controller can generate an equivalent to the SYNC signals.

Upon receipt of the SYNC signal, the scan engine can start a scan timer and scan plan execution. Between t0 and t1, which can correspond to the display blanking period of the LCD display, the scan engine can configure the touch circuitry, e.g., the transmit section, the receive section, and the RAM, to perform a first scan event, a mutual capacitance row-to-row scan (labeled as "D-D Mutual"). As described above for mutual capacitance row-to-row scans, the scan engine can configure the transmit section to selectively drive the touch sensor panel row traces and the receive section to receive mutual capacitance touch signals on select row traces. The receive section can use one IQ demodulator to demodulate the touch signals.

After the mutual capacitance row-to-row scan completes, the scan engine can configure the second scan event, which can include at least partially concurrent events, including a self-capacitance row scan (labeled as "Self Cap"), a self-capacitance column guard scan (labeled as "Self Cap Guard"), and a stylus scan (labeled as "Pen"). As described above for self-capacitance scans and guard scans, the scan engine can configure the transmit section to drive the non-inverting inputs of sense amplifiers in the receive section with a Vstim to generate the self-capacitance touch signals for the row traces and drive the column traces with the same Vstim to cancel parasitic mutual capacitance Cm that might form between row and column traces. Vstim can have a frequency $f_1$. If a stylus is present, the stylus can inject one or more stimulation signals. For example, the stylus can inject two stimulation signals, one with frequency $f_2$ and one with frequency $f_3$. The scan engine can also configure the receive section to receive the self-capacitance touch signals and the stylus touch signals on the row traces.

Multiple IQ demodulators can be used to concurrently demodulate the touch signals resulting from concurrent or partially concurrent scan events. FIG. 12 illustrates the number of IQ demodulators that can be used below each scan event or concurrent scan events. For example, in the case that the stylus generates two stimulation signals, the receive section can use three IQ demodulators to demodulate the touch signals. One IQ demodulator can be tuned to $f_1$ to demodulate self-capacitance signals on the row traces, and the other two IQ demodulators can be tuned to $f_2$ and $f_3$ to demodulate stylus signals on the row traces.

After the first and second scans complete, the scan engine can then switch the touch circuitry to perform a third scan. The third scan can include a self-capacitance column scan, a self-capacitance row guard scan, and another stylus scan. As described above for self-capacitance scans and guard scans, the scan engine can configure the transmit section to drive the non-inverting inputs of sense amplifiers in the receive section with a Vstim to generate the self-capacitance touch signals for the column traces and drive the row traces with the same Vstim to cancel parasitic capacitance Cp that might form between row and column traces. Vstim can have a frequency $f_1$. The scan engine can also configure the receive section to receive the self-capacitance touch signals and the stylus touch signals on the column traces. As in the second scan event, if the stylus generates two stimulation signals, the receive section can use three IQ demodulators to demodulate the touch signals for the third scan event. One IQ demodulator can be tuned to $f_1$ to demodulate self-capacitance signals on the column traces, and the other two IQ demodulators can be tuned to $f_2$ and $f_3$ to demodulate stylus signals on the column traces.

At t1, which can correspond to the end of the blanking period, the scan engine can generate an interrupt command, signaling to the touch processor that the touch signals received during the previous scan events can be stored in the RAM. The scan engine can configure the RAM to store the touch signals in particular memory locations. To do so, the scan engine can generate a pointer block that can include multiple pointers to the particular memory locations. Accordingly, for the three scans described above between t0 and t1, the scan engine can generate a pointer to a memory location to store the mutual capacitance row-to-row touch signals, a second memory location to store the self-capacitance row touch signals, a third memory location to store the self-capacitance column touch signals, and a fourth memory location to store the stylus touch signals. The touch processor can then retrieve the touch signals from the receive section and store them as directed by the particular pointer.

Between times t1 and t2, the scan engine can direct more scan events. For example, the scan engine can configure the touch circuitry to perform fourth scan, a mutual capacitance column-to-column scan (labeled as "S-S Mutual"). As described above for mutual capacitance column-to-column scans, the scan engine can configure the transmit section to selectively drive the touch sensor panel column traces and the receive section to receive mutual capacitance touch signals on select column traces. The receive section can use one IQ demodulator to demodulate the touch signals. After the fourth scan completes, the scan engine can configure the touch circuitry to perform a fifth scan event, which can include at least partly concurrent scan events including a mutual capacitance row-to-column scan (labeled as "Mutual Drive," "Mutual Sense") and a stylus scan (labeled as "Pen"). During the mutual capacitance row-to-column scan, the scan engine can configure the transmit section to drive the row traces with a stimulation signal Vstim and the receive section to receive mutual capacitance touch signals Csig from the column traces. The mutual capacitance row-to-column scan can be performed in multiple steps. For example, a first scan step can stimulate a first row trace and touch signals can be captured on the corresponding column traces, a second step can stimulate a second row trace and touch signals can be captured on the corresponding column traces, a third step can stimulate a third row trace and touch signals can be captured on the corresponding column traces, and so on. In other examples, a scan step can simultaneously stimulate multiple rows with stimulus signals of different amplitude, phase and frequency. In one example, the rows in the upper half of the touch sensor panel can be stimulated using a first frequency $f_1$ and the rows in the lower half of the touch sensor panel can be stimulated using a second frequency $f_2$. In another example, the rows stimulated by frequency $f_1$ and $f_2$ can be interleaved. For example, a first row can be stimulated with frequency $f_1$, a second row can be stimulated with frequency $f_2$, a third row can be stimulated with frequency $f_1$, a fourth row can be stimulated with frequency $f_2$, and so on such that adjacent rows can be stimulated at different frequencies. Alternatively, banks of rows can be stimulated at the same frequency such that a first bank of rows can be stimulated with frequency $f_1$, a second bank of rows can be stimulated with frequency $f_2$, a third bank of rows can be stimulated with frequency $f_1$, an so on. As described above, the scan engine can also configure the receive section to receive the stylus touch signals on the column traces during the at least partially concurrent stylus scan.

The number of demodulators to simultaneously demodulate the partially concurrent scan can change depending on whether the scan events are concurrent or not at a given time. For example when the mutual capacitance row-column scan is occurring without a stylus scan, only one IQ demodulator can be used. However, once the partially concurrent stylus scan begins, additional IQ demodulators can be used to simultaneously demodulate the stylus touch signals. For example, if the stylus generates two stimulation signals, the receive section can use three IQ demodulators to demodulate the touch signals for the concurrent portion of the fifth scan event. One IQ demodulator can be tuned to $f_1$ to demodulate mutual capacitance signals on the column traces, and the other two IQ demodulators can be tuned to $f_2$ and $f_3$ to demodulate stylus signals on the column traces. In other examples, the mutual capacitance row-to-column scan can use two stimulation frequencies and can require two IQ demodulators to demodulate mutual capacitance signals on the column traces.

At t2, the scan engine can generate another interrupt command and generate a new pointer bank that can include pointers to the particular memory locations to store the mutual capacitance column-to-column touch signals, the mutual capacitance row-to-column touch signals, and another set of stylus touch signals. The touch processor can then retrieve the touch signals from the receive section and store them as directed by the particular pointer.

Between times t2 and t3, the scan engine can direct more scan events. The scan engine can configure the touch circuitry to perform a sixth scan event, which can include at least partly concurrent scan events including a stylus scan (labeled as "Pen") and a touch spectral analysis scan (labeled as "SPA for touch"). During both the stylus scan and the touch spectral analysis scan, the scan engine can configure the transmit section to not drive traces of the touch sensor panel. As discussed above for the touch spectral analysis scan, the receive section can be configured to process touch signals from some or all of the row and column traces in order to find a clean frequency for subsequent touch sensing. In one example, all the row and/or column traces can be configured to detect touch signals. The touch signals can be demodulated at various frequencies according to the number of IQ demodulators available. In one example, there can be eight possible frequencies for touch sensing. The touch signals can be stored and sequentially demodulated at the eight possible frequencies. In other examples, there can be more than one IQ demodulator available allowing for simultaneous demodulation at multiple frequencies. For example, as shown with the at least partially concurrent stylus scan, there can be two IQ demodulators available for the touch spectral analysis scan. As a result, the eight possible frequencies can be used to demodulate the touch signal in four processing steps rather than in eight sequential steps. The touch controller can determine the clean frequency that can be the frequency at which the touch signal can be minimized.

Figure 13:
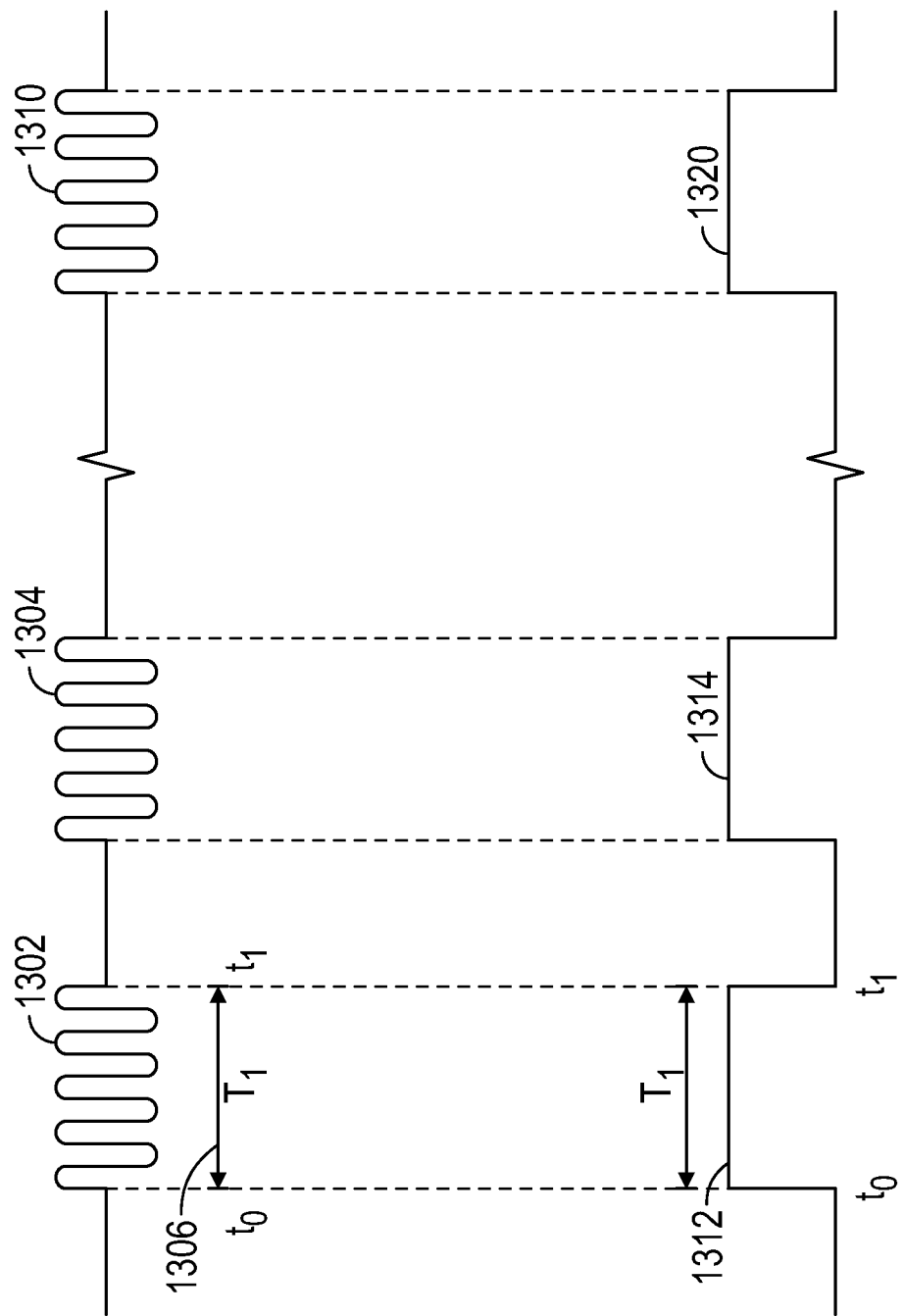
FIG. 13 illustrates the correspondence between an exemplary touch signal and the touch signal demodulation window according to examples of the disclosure.

In some examples of touch spectral analysis scans, the touch signals can be detected and demodulated using demodulation windows with durations and timing that match the stimulation signals of Vstim expected during a touch sensing scan such as a mutual capacitance scan. Demodulating the signal using the appropriate demodulation window can result in selecting a clean frequency that reflects noise that can be present in the system during a touch sensing operation. FIG. 13 illustrates the correspondence between an exemplary touch signal and the demodulation window according to examples of the disclosure. FIG. 13 illustrates an example stimulation signal waveform. The waveform can include one or more stimulation signals separated by periods of no stimulation. The stimulation signals can have any phase, though in some examples a phase of 0 or 180 degrees can useful. For example, the waveform can have stimulation signals 1302 and 1304, through a final stimulation signal 1310. Stimulation signal 1302, for example, can have a duration $T_1$. The remaining stimulation signals can have the same or a different duration. The demodulation window for received touch signals in a touch spectral analysis scan can correspond in both duration and timing to the expected stimulation signal waveform. For example, the touch spectral analysis scan can demodulate the received touch signal during demodulation window 1312 having the same duration $T_1$ as the expected stimulation signal waveform 1302. The touch spectral analysis scan can demodulate touch signals using the demodulation window corresponding to the duration and timing of each stimulation signal in the exemplary touch sensing scan waveform. For example, demodulation windows 1312, 1314 through 1320 can correspond to the stimulation signals 1302, 1304 through 1310.

During the stylus scan, the receive section can be configured to process touch signals from some or all of the row and/or column traces. In one example, the receive section can be configured to process touch signals from only the row traces or only the column traces. In other examples, the receive section can be configured to process touch signals from both the row and column traces simultaneously (assuming a sufficient number of receive channels). As described above, in some examples the stylus can generate two stimulation signals that can require two IQ demodulators per receive channel to demodulate the stylus touch signals.

The sixth scan event can use up to four IQ demodulators in a system equipped with four IQ demodulators per receive channel. As described above, two IQ demodulators can be tuned to $f_1$ and $f_2$ to demodulate stylus signals on the row and/or column traces, and one or more of the remaining two IQ demodulators can be tuned to various other frequencies to demodulate touch signals on the row/or column traces, to determine a clean frequency.

The scan engine can then configure the touch circuitry to perform the seventh scan event, which can include at least partly concurrent scan events including a mutual capacitance row-to-column scan (labeled as "Mutual Drive," "Mutual Sense") and a stylus spectral analysis scan (labeled "SPA for pen"). The mutual capacitance row-to-column scan can be executed as described above (i.e. configuring the transmit section to stimulate row traces and configuring the receive section to receive touch signals from the column traces). During the stylus spectral analysis scan, the scan engine can configure the receive section to demodulate touch signals from the column traces in order to find a clean frequency for subsequent stylus sensing. The touch signals can be demodulated at various frequencies according to the number of IQ demodulators available. In one example, there can be six possible frequencies for stylus sensing. The touch signals can be stored and sequentially demodulated at the six possible frequencies. In other examples, there can be more than one IQ demodulator available allowing for simultaneous demodulation at multiple frequencies. For example, as shown with the at least partially concurrent mutual capacitance row-to-column scan, there can be three IQ demodulators available for the stylus spectral analysis. As a result, the six possible frequencies can be used to demodulate the touch signal in two processing steps rather than in six sequential steps. The touch controller can determine the one or more clean frequencies that can be the frequencies at which the touch signal can be minimized. The one or more clean frequencies can be communicated to the stylus.

In some examples of stylus spectral analysis scans, the touch signals can be detected and demodulated using demodulation windows matching the duration and timing of the stimulation signals of the stylus during a stylus scan. As described above with regard to FIG. 13 for touch spectral analysis scan, the demodulation window for stylus spectral analysis scans can correspond in both duration and timing to stylus stimulation signals. Demodulating the signal using the appropriate demodulation window can result in selecting a clean frequency that reflects noise that can be present in the system during a stylus scan operation.

The scan engine can then configure the touch circuitry to perform the eighth scan event, a touch spectral analysis scan. The touch spectral analysis scan can execute like the touch spectral analysis scan described previously, with the receive section processing touch signals from the column traces to find a clean frequency. There can be four IQ demodulators available for the touch spectral analysis scan of the eight scan. As a result, the eight possible frequencies can be used to demodulate the touch signal in two processing steps rather than in eight sequential steps.

At t3, the scan engine can generate another interrupt command and generate a new pointer bank that can include pointers to the particular memory locations to store the spectral analysis results, another set of stylus touch signals, and another set of mutual capacitance row-to-column touch signals. The touch processor can then retrieve the results and touch signals from the receive section and store them as directed by the particular pointer. The scan engine can receive another SYNC signal, which can indicate that the LCD display is blanking again.

In some examples, the scan plan can be changed dynamically during execution. In one implementation, the scan plan can be changed in between frames, i.e. between scan events, but in other implementations, the scan plan can be changed at any time such that a scan event is interrupted. In other implementations, the scan plan can be double buffered by the hardware, such that a second copy of the scan plan can be stored in memory and at any point in time the active scan plan under execution can be swapped. In some examples, the active scan plan can be swapped at boundaries between scan events. In other examples the active scan plan can be swapped at any point, even in the middle of an event.

Figure 14:
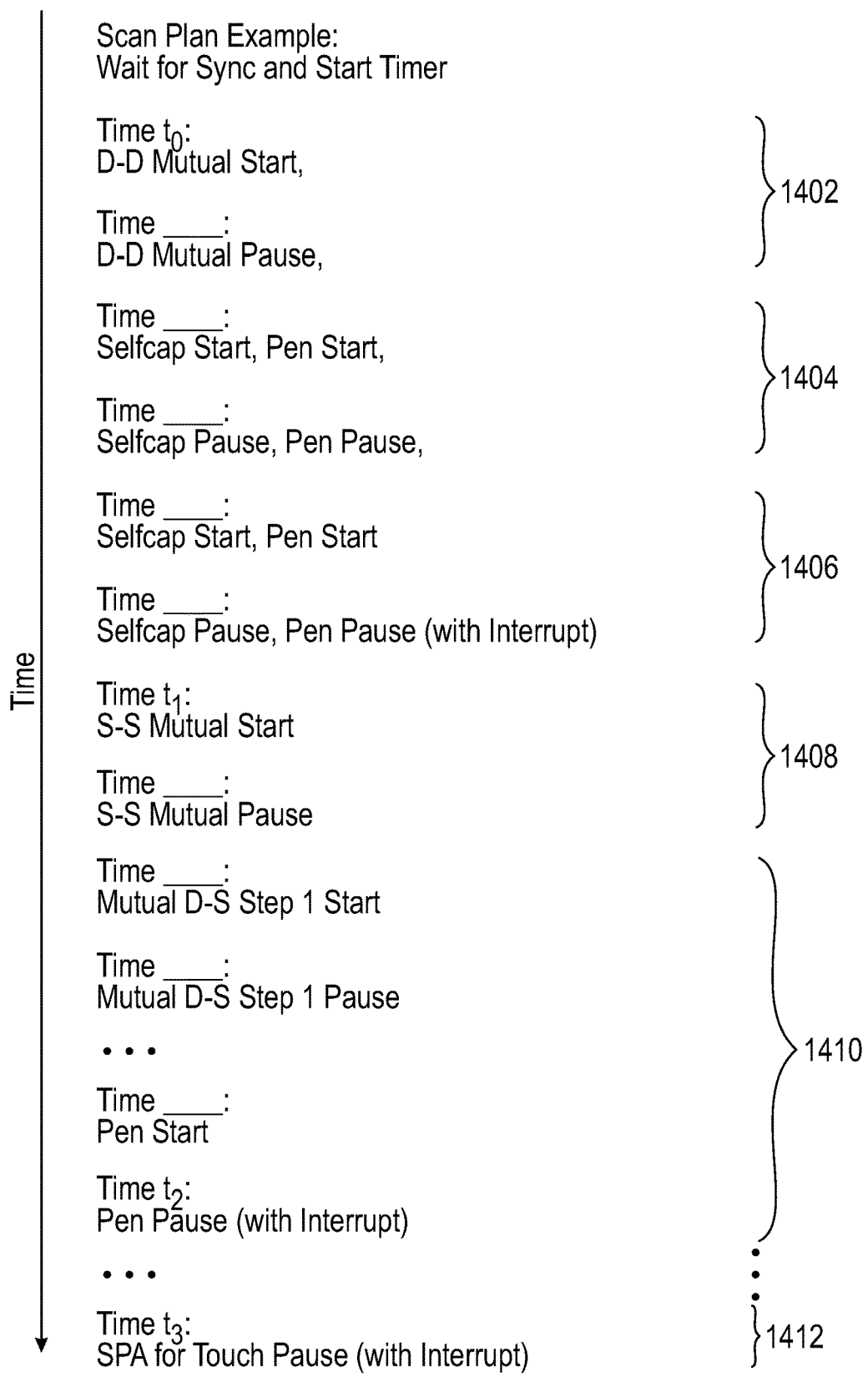
FIG. 14 illustrates an exemplary scan plan executed in FIG. 12 according to examples of the disclosure.

FIG. 14 illustrates the scan plan executed in FIG. 12 according to examples of the disclosure. In the example of FIG. 14, the scan events can be defined, including the start and pause times of the scan events and the interrupt times when the scan results can be stored in the RAM. For example, scan plan 1400 defines a first scan event 1402 corresponding to the mutual capacitance column-to-column scan of the first scan event illustrated in FIG. 12. Similarly, second scan event 1404, third scan event 1406, fourth scan event 1408, fifth scan event 1410, and so on through the conclusion of the eighth scan event 1412 correspond to the respective scan events illustrated in FIG. 12.

Figure 15:
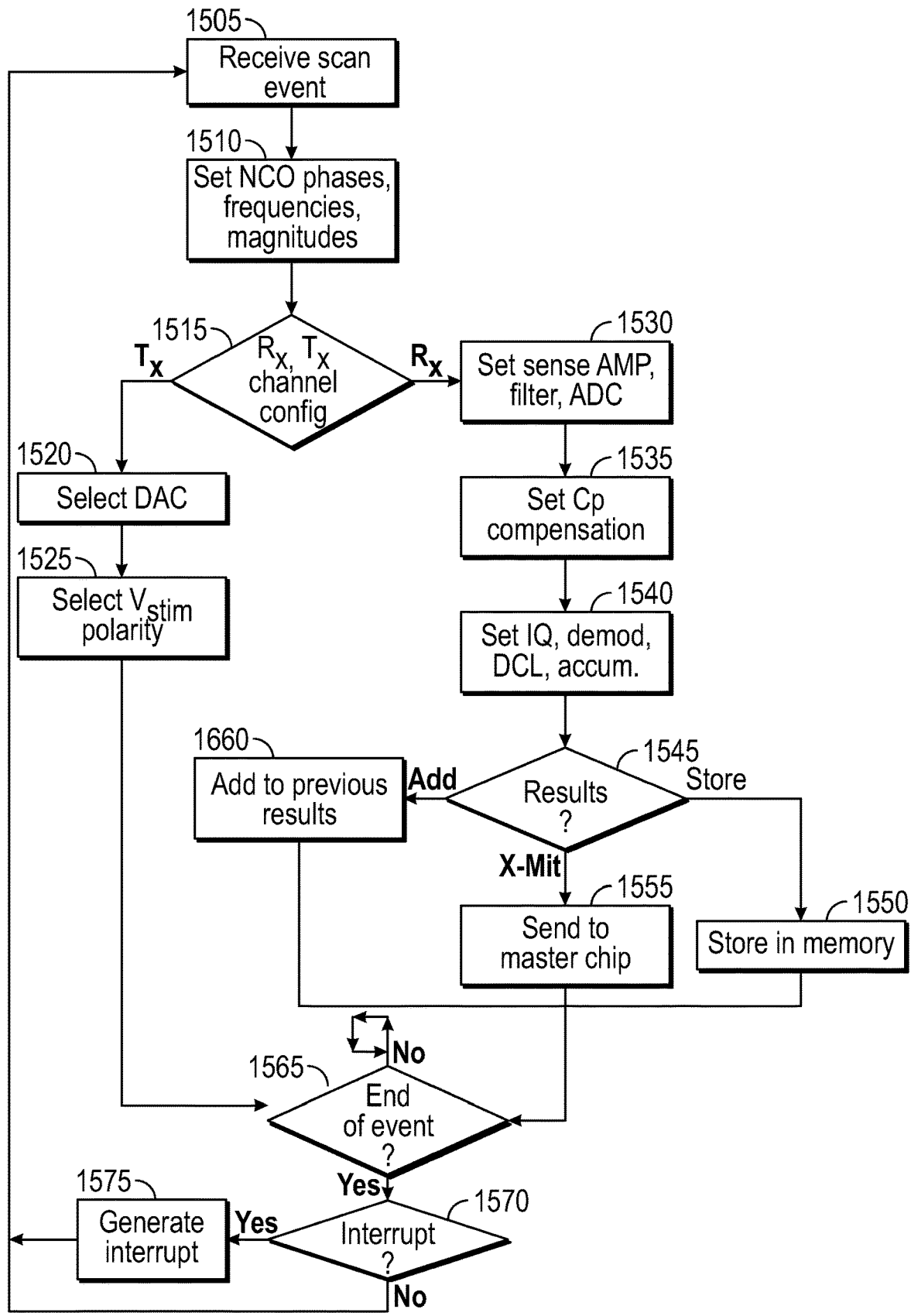
FIG. 15 illustrates an exemplary method for configuring components of the transmit section, receive section, and the RAM at a scan engine according to examples of the disclosure.

Each scan event can define operating parameters and/or settings for components of the transmit section, the receive section, and the RAM used to perform that scan event. The scan engine can then configure the components as defined as the engine executes the scan plan. FIG. 15 illustrates an exemplary method for configuring the components at a scan engine according to examples of the disclosure. In the example of FIG. 15, the scan engine can receive a scan event from a scan plan (1505). For explanatory purposes, the scan event can be assumed to be a touch sensing event, such as a mutual capacitance row-to-column scan, although it should be understood that other events can also be received. Based on the received scan event, the scan engine can then configure the operating parameters and/or settings for the components of the touch circuitry to perform the scan event. Accordingly, the scan engine can configure the transmit section by setting the NCO phases, frequencies, and magnitudes (1510). The scan engine can then configure transmit channels and/or receive channels and couple rows and/or columns to be appropriate transmit or receive channel (1515).

For transmit channels, the scan engine can select which DAC to use to send the stimulation signal Vstim to rows (1520). The scan engine can also set the polarity (+ or −) of the stimulation signal to drive the rows of the touch sensor panel (1525).

For receive channels, the scan engine can set operating parameters for the sense amplifiers, bandpass filters, and ADCs (1530). The scan engine can also set operating parameters for parasitic capacitance Cp cancelation circuitry (1535). The scan engine can set operating parameters for the IQ demodulators, the DCLs, and the accumulators (1540). If there are results from the scan event, e.g., touch signals or spectral analysis results, the scan engine can determine what to do with the results (1545). If the results are to be stored, the scan engine can generate a pointer bank with pointers to the particular storage locations in the RAM (1550). If the results are to be combined to previous results, the scan engine can combine the results (1560). In some cases, the touch circuitry can operate in a master-slave architecture (as will be described below). If the slave receive section has results from the scan event, the scan engine can transmit the results from the slave circuit to the master circuit for further processing.

After configuring the transmit and/or receive channels, the scan engine can determine whether the scan event has completed, i.e., the scan event has paused execution (1565). If not, the scan engine can wait until it does. If the scan event has completed, the scan engine can determine whether an interrupt command should be generated so that the touch processor can store the results to the RAM (1570). If not, the scan engine can receive the next scan event (1505). If so, the scan engine can generate the interrupt for the touch processor to process the results (1575).

It should be understood that additional and/or other methods can also be used that are capable of configuring touch circuitry in a touch sensor panel.

Figure 16:
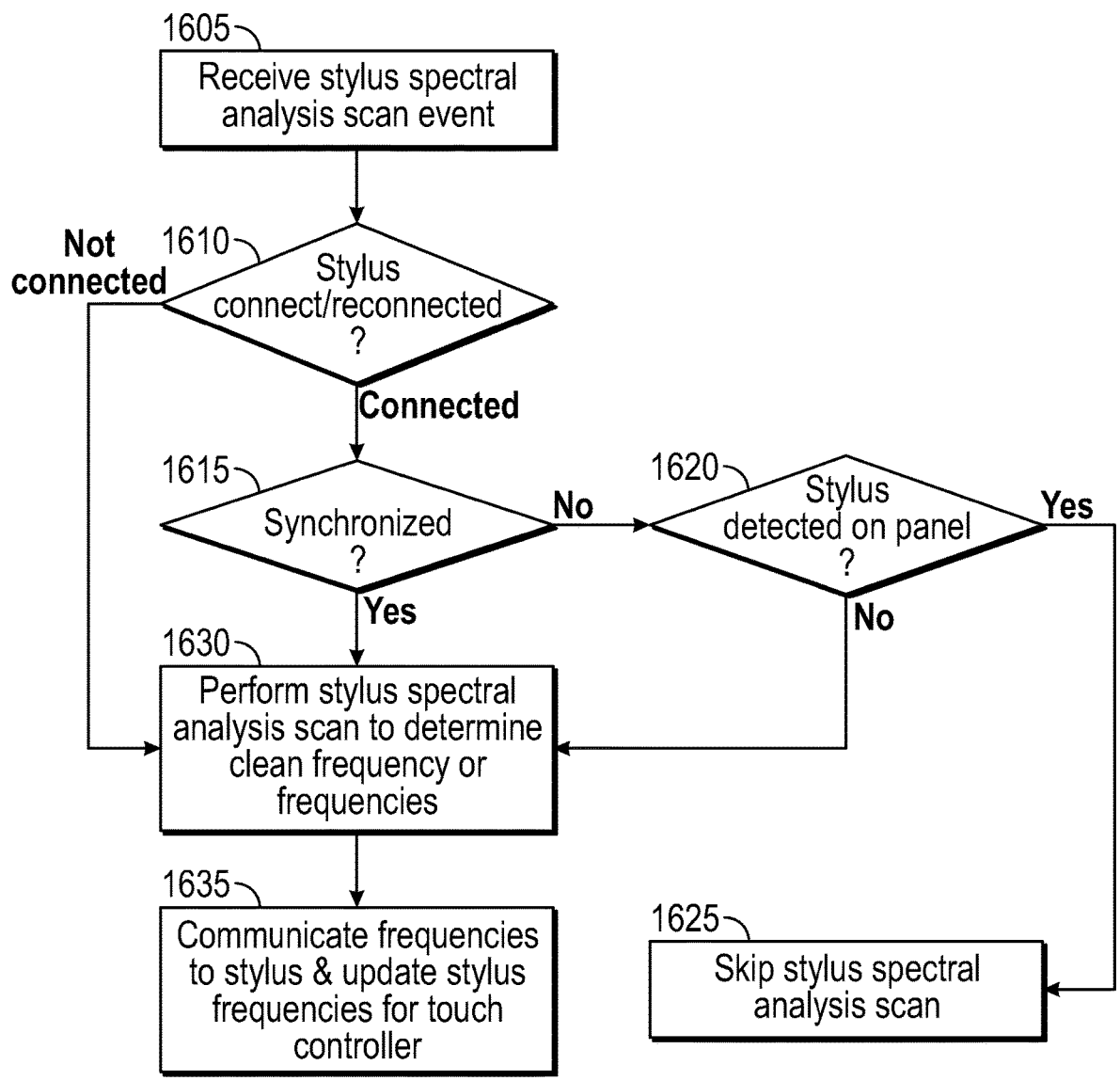
FIG. 16 illustrates an exemplary method for handling a stylus spectral scan event according to examples of the disclosure.

FIG. 16 illustrates an exemplary method for handling a stylus spectral scan event according to examples of the disclosure. In the example of FIG. 16, the scan engine can receive a stylus spectral analysis scan event from a scan plan (1605). The scan engine can then determine a stylus connection or reconnection status (1610). If the stylus is not connected or reconnected, the scan engine can configure the touch circuitry to perform the stylus spectral analysis scan to determine one or more clean frequencies for the stylus (1630) when the stylus is not transmitting. If the stylus is connected or reconnected, the scan engine can then determine whether the stylus is synchronous or asynchronous (1615). If the stylus is synchronous, the scan engine can configure the touch circuitry to perform a stylus spectral analysis scan (1630). If the stylus is asynchronous, the scan engine can determine if the stylus is detected on the panel (1620). If the stylus is detected on the panel, the scan engine can skip the stylus spectral analysis scan (1625). If the stylus is not detected on the panel, the scan engine can configure the touch circuitry to perform a stylus spectral analysis scan (1630). After performing the stylus spectral analysis scan, the computing system can communicate one or more clean stylus frequencies to the stylus and update the one or more stylus frequencies for detection in the touch controller (1635).

As described previously with reference to FIG. 11, each accumulator can receive demodulated touch signals from a corresponding IQ demodulator. For example, accumulator 1136*a* can receive demodulated touch signals from IQ demodulator 1135*a*. As described previously, multiple scan events can be performed at least partially concurrently and the touch signals can be simultaneously demodulated, for example, by different demodulators at different frequencies of interest. Accordingly, one accumulator can have touch signals from a stylus scan, while another accumulator can have touch signals from a mutual capacitance row-to-column touch scan, for example. Accordingly, the scan engine can generate the pointer bank to have pointers corresponding to the accumulator results, each pointer linked to a corresponding IQ demodulator and accumulator and then linked to the particular location in the RAM at which that scan event's results can be stored, as illustrated in FIG. 17.

Figure 17:
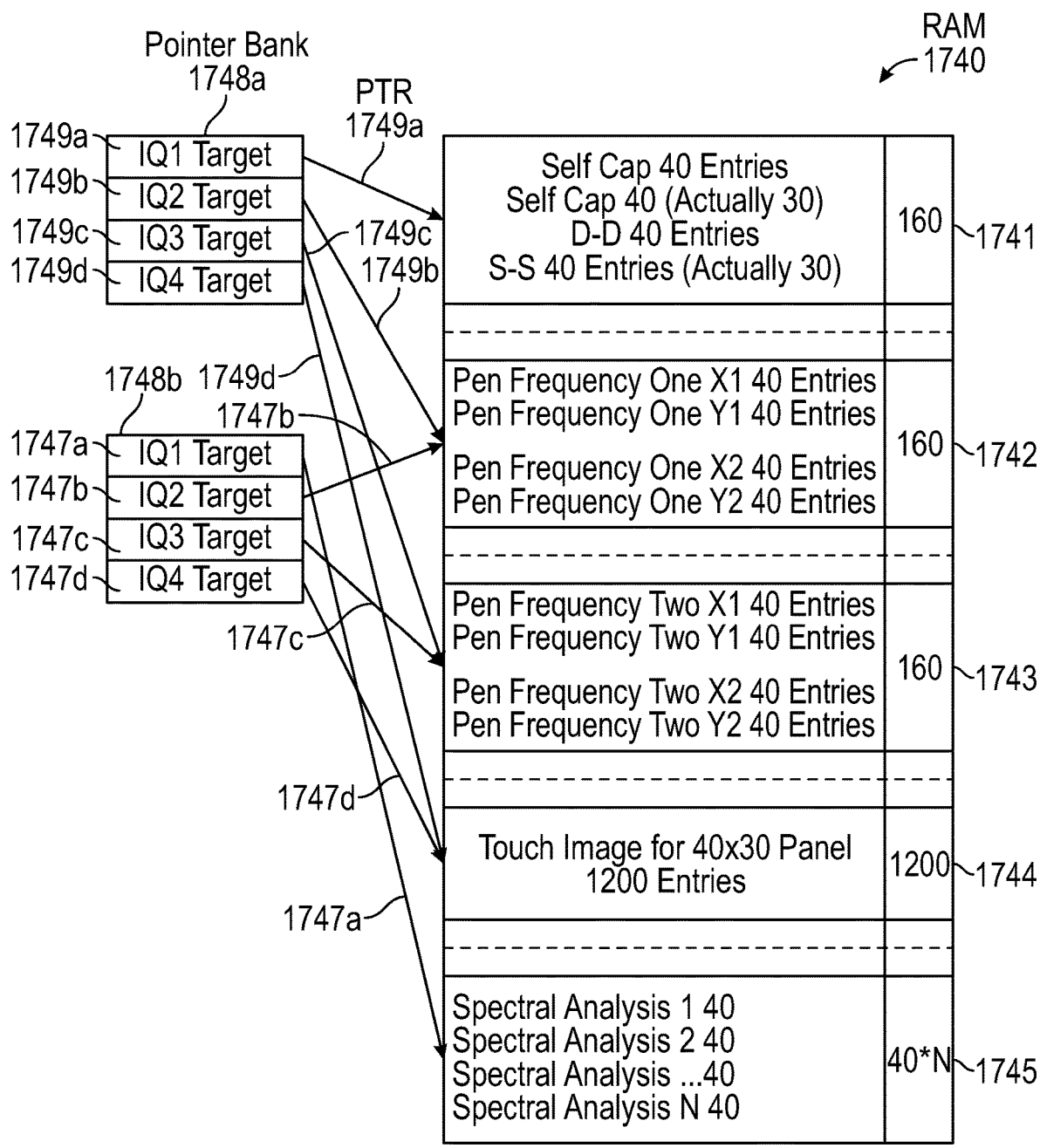
FIG. 17 illustrates an exemplary RAM configuration that can correspond to the scan events in FIG. 12 according to examples of the disclosure.

FIG. 17 illustrates an exemplary RAM configuration that can correspond to the scan events in FIG. 12 according to examples of the disclosure. In the example of FIG. 17, the scan engine can generate pointer bank 1748*a* with pointers linked to the corresponding IQ demodulator and accumulator, e.g., pointer 1749*a* can link to the first accumulator, pointer 1749*b* to the second accumulator, pointer 1749*c* to the third accumulator, and pointer 1749*d* to the fourth accumulator. From time t0 to t1 in FIG. 12, the scan engine can further link the pointers to the storage locations in the RAM allocated for those scan events. For example, during the first scan event, the scan engine can configure the first IQ demodulator to demodulate the mutual capacitance row-to-row touch signals (labeled as "D-D") and then link the first pointer 1749*a* to the storage location 1741 at which row-to-row scan results can be stored. During the second and third scan events, the scan engine can then configure the first demodulator to demodulate the self-capacitance row and column touch signals (labeled as "Self Cap"). Because the scan engine has previously linked the first pointer 1749*a* to the storage location 1741 during the first scan event, the scan engine can omit performing the linking again to store self-capacitance scan results. The scan engine can also configure the second and third demodulators to demodulate the stylus touch signals (labeled as "Pen Frequency One," "Pen Frequency Two") and then link the second pointer 1749*b* to the storage location 1742 and the third pointer 1749*c* to the storage location 1742 at which stylus scan results can be stored.

From time t1 to t2 in FIG. 12, the scan engine can again configure the first demodulator to demodulate the mutual capacitance column-to-column touch signals (labeled as "S-S") during the fourth scan event and keep the link of the first pointer 1749*a* to the storage location 1741 at which the column-to-column scan results can be stored. The scan engine can configure the fourth demodulator to demodulate the mutual capacitance row-to-column touch signals (labeled "Touch Image") during the fifth scan event and link the fourth pointer 1749*d* to the storage location 1744 at which mutual capacitance row-to-column scan results can be stored. The scan engine can configure the second demodulator to demodulate the next set of stylus touch signals (labeled as "Pen Frequency One") during the fifth scan event and retain the link between the second pointer 1749*b* and the storage location 1742.

From time t2 to t3 in FIG. 12, the scan engine can generate a new pointer bank 1748*b*, in which the first pointer 1749*a* linking the first accumulator to the storage location 1741 can be changed to link to the storage location 1745 so that the stylus and touch spectral analysis results (labeled "Spectral Analysis") can be stored in their allocated storage location.

The results stored in the RAM can be stored as in-phase and quadrature information, for example, or in other examples, the results can be stored using as magnitude and phase information. In some examples, the receive section can be configured to store results as in-phase and quadrature information for some scan steps and as magnitude and phase information for other steps. The scan engine can change between the two types of information by updating the pointers used to store the scan results. Magnitude and phase can be calculated by the receive section hardware. Magnitude can be calculated as the square root of the sum of the square of the in-phase component and the square of the quadrature component. Phase can be calculated as the inverse tangent of Q divided by I. Mathematically, the magnitude and phase calculations can be expressed as:

$$\text{magnitude} = \sqrt{I^2 + Q^2} \, ; \text{phase} = \tan^{-1}\frac{Q}{I}$$

Figure 18:
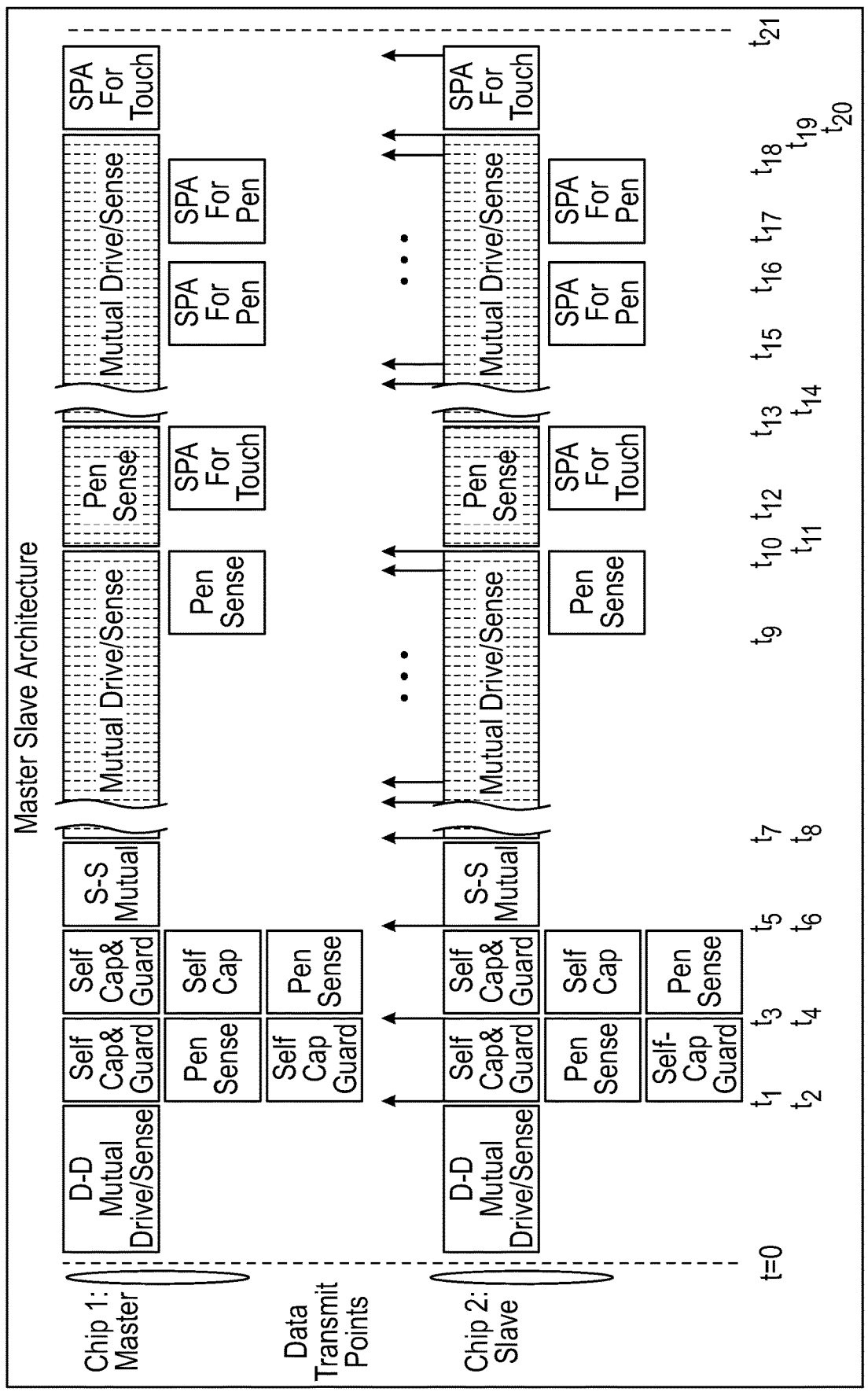
FIG. 18 illustrates an exemplary scan architecture for a touch controller configuring a master-slave circuit, which can include touch circuitry for a master touch circuit and touch circuitry for a slave touch circuit, according to examples of the disclosure.

As discussed above and illustrated with respect to FIG. 1, in some examples the touch controller 102 can be implemented using a master-slave configuration. For example, FIG. 18 illustrates an exemplary scan architecture for a touch controller configuring a master-slave circuit, which can include touch circuitry for a master touch circuit and touch circuitry for a slave touch circuit, according to examples of the disclosure. In some examples, the master-slave circuit can be a single package containing two touch controllers, while in other examples, the master-slave circuit can include two separate touch controller chips. In the example of FIG. 18, the scan engine can configure both the master and slave touch circuitry to execute a scan plan together. For example, the master and slave touch circuitry can drive and sense different row and column traces such that the combination scans all of the rows and columns of the touch sensor panel. As illustrated in FIG. 18, during the first scan event, both the master and slave circuitry can be configured to perform mutual capacitance column-column scans on the respective row and column traces. Similarly, the remaining scan events can be performed by the master and slave circuitry. When the panel scan engine generates an interrupt command, the slave circuit can transfer its scan event results to the master circuit, which can then send the results to the RAM for storage. In some examples, the master and slave touch controllers can provide for a bi-directional data transfer to enable both controllers to have the full image of touch. Master-slave configurations can allow for scanning high density touch sensor panels (e.g. a 40×30 array of rows and columns) with low density circuits (master and slave circuits can each stimulate 20 rows and sense touch signals generated by any of the 40 rows on 15 columns).

Figure 19:
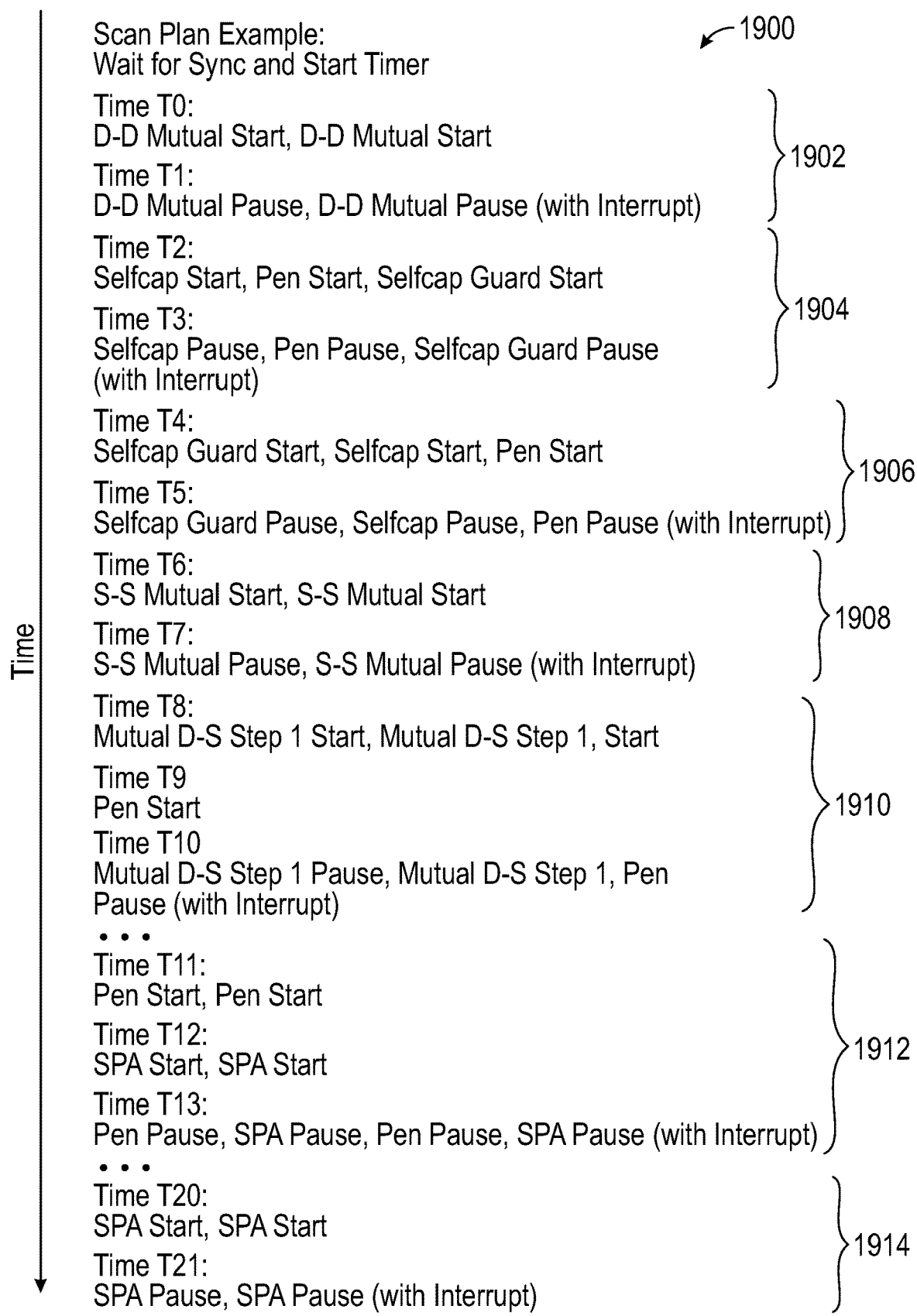
FIG. 19 illustrates an exemplary scan plan executed in FIG. 18 according to examples of the disclosure.

FIG. 19 illustrates the scan plan executed in FIG. 18 according to examples of the disclosure. In the example of FIG. 19, the scan plan can define the scan events (start and pause) executed by both the master and slave circuits and the interrupt times when the scan results from both the master slave circuits can be transferred to the RAM. In some examples, the data generated by the slave circuit's scan results can be transferred to the master circuit as soon as it is ready. Once the hardware has completed the transmission and processing steps for one or more scan events and the results are ready, an interrupt can be generated to store the scan results in memory. For example, scan plan 1900 defines a first scan event 1902 corresponding to the mutual capacitance column-to-column scan of the first scan event performed by the master and slave circuits illustrated in FIG. 18. Similarly second scan event 1904, third scan event 1906, fourth scan event 1908, fifth scan event 1910, sixth scan event 1912 and so on through eighth scan event 1914 correspond to the respective scan events performed by master and slave circuits illustrated in FIG. 18.

Figure 20:
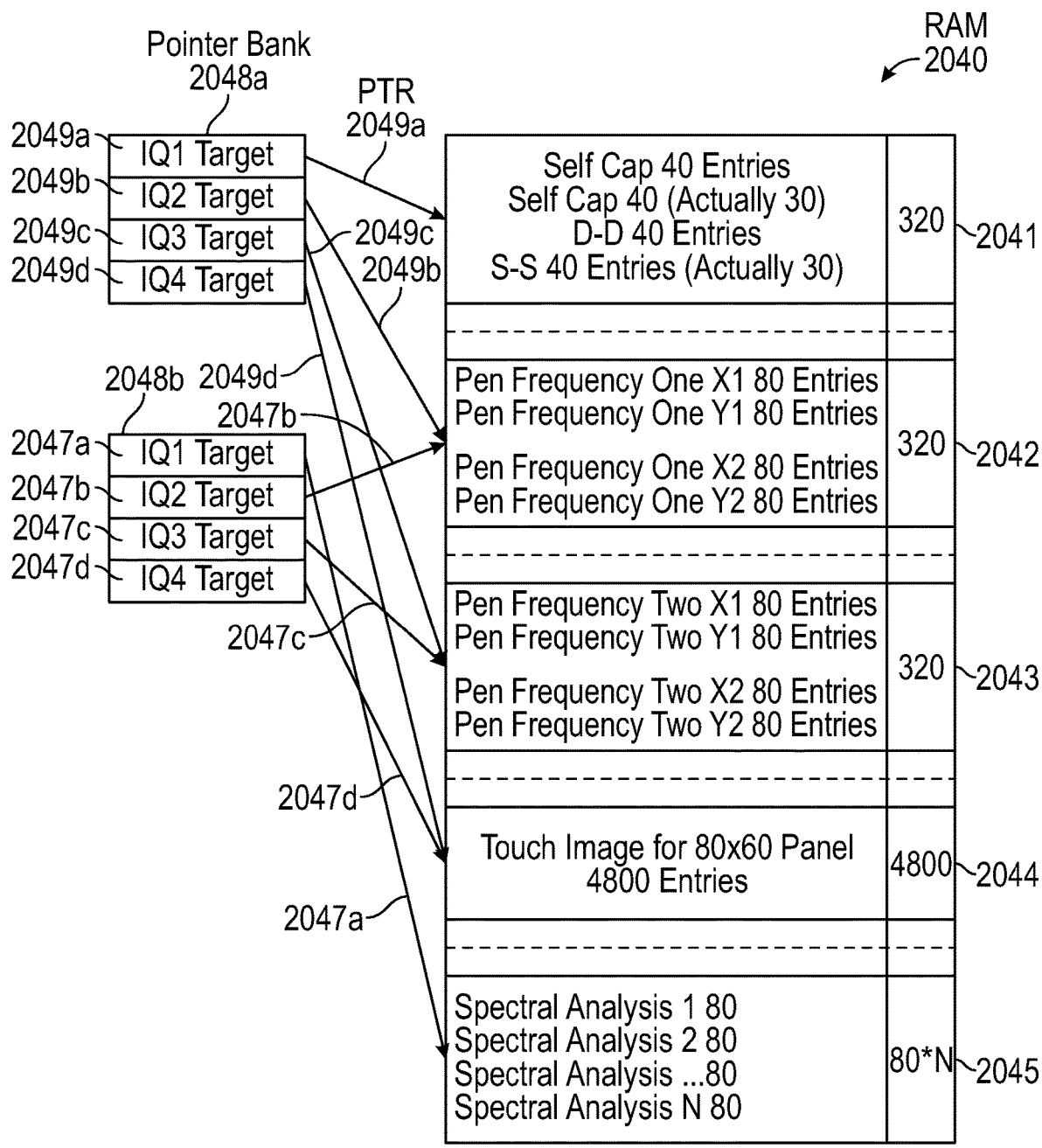
FIG. 20 illustrates an exemplary RAM configuration that can correspond to the scan events in FIG. 18 according to examples of the disclosure.

As described above, the panel scan engine can generate one or more pointer banks to have pointers corresponding to the accumulator results, each pointer linked to a corresponding IQ demodulator and accumulator and then linked to the particular location in the RAM at which that scan event's results are to be stored. FIG. 20 illustrates the RAM configuration when the scan events of FIG. 18 are performed. In the example of FIG. 20, both the master and slave scan results can be stored together in the particular storage locations allocated for the scan events.

FIG. 20 illustrates an exemplary RAM configuration that can correspond to the scan events in FIG. 18 according to examples of the disclosure. In the example of FIG. 20, the scan engine can generate pointer bank 2048a with pointers linked to the corresponding IQ demodulator and accumulator, e.g., pointer 2049a can link to the first accumulator, pointer 2049b to the second accumulator, pointer 2049c to the third accumulator, and pointer 2049d to the fourth accumulator. From time t0 to t21 in FIG. 18, the scan engine can further link the pointers to the storage locations in the RAM allocated for those scan events. For example, during the first scan event, the scan engine can configure the first IQ demodulator to demodulate the mutual capacitance row-to-row touch signals (labeled as "D-D") and then link the first pointer 2049a to the storage location 2041 at which mutual capacitance row-to-row scan results can be stored. During the second and third scan events, the scan engine can then configure the first demodulator to demodulate the self-capacitance row and column touch signals (labeled as "Self Cap"). Because the scan engine has previously linked the first pointer 2049a to the storage location 2041 during the first scan event, the scan engine can omit performing the linking again to store self-capacitance scan results. The scan engine can also configure the second and third demodulators to demodulate the stylus touch signals (labeled as "Pen Frequency One," "Pen Frequency Two") and then link the second pointer 2049b to the storage location 2042 and the third pointer 2049c to the storage location 2042 at which stylus scan results can be stored.

From time t6 to t10 in FIG. 18, the scan engine can configure the first demodulator to demodulate the mutual capacitance column-to-column touch signals (labeled as "S-S") during the fourth scan event and keep the link of the first pointer 2049a to the storage location 2041 at which the column-to-column scan results can be stored. The scan engine can configure the fourth demodulator to demodulate the mutual capacitance row-to-column touch signals (labeled "Touch Image") during the fifth scan event and link the fourth pointer 2049d to the storage location 2044 at which mutual capacitance row-to-column scan results can be stored. The scan engine can configure the second demodulator to demodulate the next set of stylus touch signals (labeled as "Pen Frequency One") during the fifth scan event and retain the link between the second pointer 2049b and the storage location 2042.

From time t11 to t21 in FIG. 18, the scan engine can generate a new pointer bank 2048b, in which the first pointer 2049a linking the first accumulator to the storage location 2041 can be changed to link to the storage location 2045 so that the stylus and touch spectral analysis results (labeled "Spectral Analysis") can be stored in their allocated storage location.

Figure 21A:
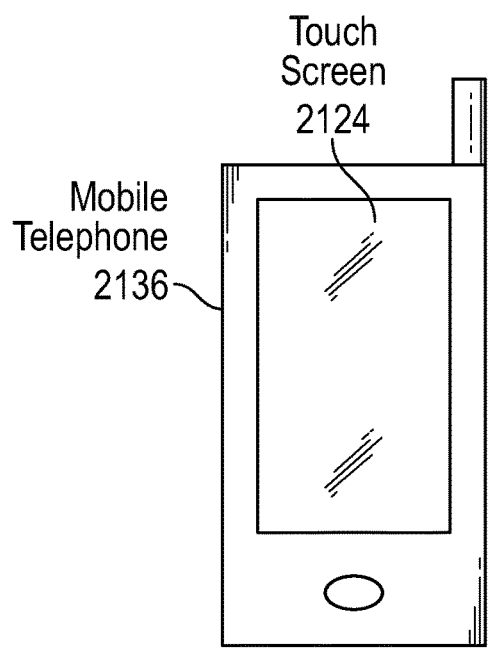
FIGS. 21A-21D illustrate example systems in which a touch controller according to examples of the disclosure can be implemented.
Figure 21B:
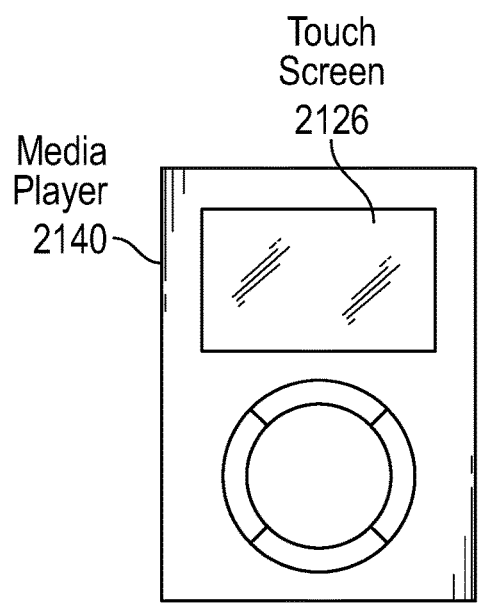
Figure 21C:
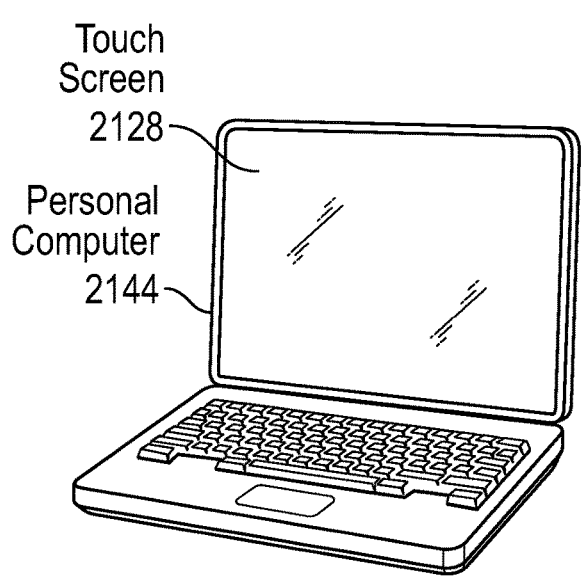
Figure 21D:
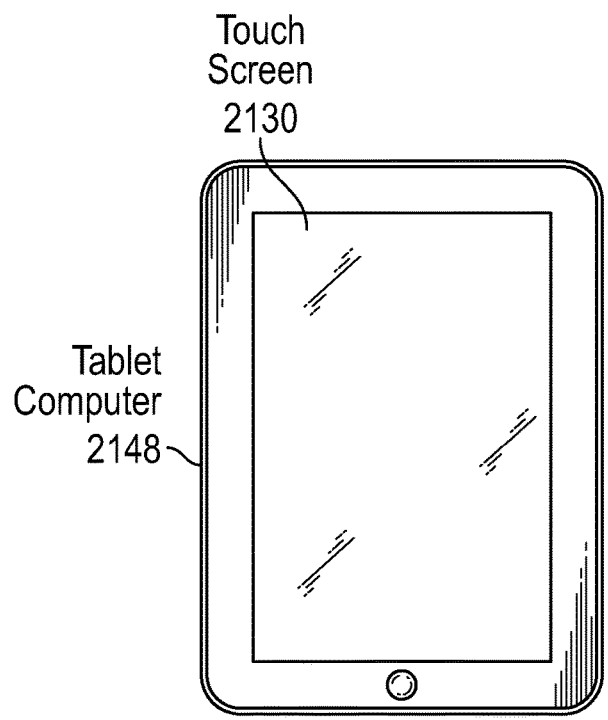

FIGS. 21A-21D illustrate example systems in which touch controller according to examples of the disclosure can be implemented. FIG. 21A illustrates an example mobile telephone 2136 that includes a touch screen 2124 and other computing system blocks that can be configured by a touch controller according to various examples. FIG. 21B illustrates an example digital media player 2140 that includes a touch screen 2126 and other computing system blocks that can be configured by a touch controller according to various examples. FIG. 21C illustrates an example personal computer 2144 that includes a touch screen 2128 and other computing system blocks that can be configured by a touch controller according to various examples. FIG. 21D illustrates an example tablet computing device 2148 that includes a touch screen 2130 and other computing system blocks that can be configured by a touch controller according to various examples. The touch screen and computing system blocks that can be configured by a touch controller can be implemented in other devices including in wearable devices.

The mobile telephone, media player, and personal computer of FIGS. 21A through 21D can advantageously provide more robust and flexible touch circuitry to handle various types of touch events at the panel by using a touch controller to configure the touch circuitry.

Therefore, according to the above, some examples of the disclosure are directed to a touch sensitive device. The touch sensitive device can comprise: a configurable circuit. The configurable circuit can be capable of switching a coupling of a touch sensor panel to components of the circuit in a transmit configuration or components of the circuit in a receive configuration. The circuit in the transmit configuration can be capable of generating stimulation signals having one or more phases and one or more frequencies to drive the touch sensor panel to detect a touch or hover event by an object. The circuit in the receive configuration can be capable of receiving and processing a touch signal indicative of the detected touch or hover event. The touch sensitive device can also comprise a scan engine. The scan engine can be capable of configuring the circuit according to a scan plan. The scan plan can define a sequence of scan events to be performed at the touch sensor panel. Each scan event can define the transmit configuration and the receive configuration for the scan event. Executing the scan plan can cause the sequence of scan events to be performed with the defined transmit and receive configurations for the scan events. Additionally or alternatively to one or more examples disclosed above, the circuit can be capable of driving a first portion of the touch sensor panel with one of the stimulation signals having a first frequency and receiving at least a first touch signal from the first portion, and simultaneously driving a second portion of the touch sensor panel with another of the stimulation signals having a second frequency and receiving at least a second touch signal from the second portion. Additionally or alternatively to one or more examples disclosed above, the touch sensor panel can comprise a plurality of touch nodes. Each touch node can be capable of receiving the stimulation signals from the components of the circuit in the transmit configuration and transmitting the touch signals to components of the circuit in the receive configuration. Additionally or alternatively to one or more examples disclosed above, the touch sensor panel can comprise a plurality of row traces and a plurality of column traces. Additionally or alternatively to one or more examples disclosed above, the scan engine can be capable of configuring the circuit to transmit the stimulation signals to the plurality of row traces in the transmit configuration and to receive the touch signal from the plurality of column traces in the receive configuration. The touch signal can indicate a mutual capacitance between the row traces and the column traces. Additionally or alternatively to one or more examples disclosed above, the scan engine can be capable of configuring the circuit to transmit the stimulation signals to a first set of the row traces in the transmit configuration and to receive the touch signal from a second set of the row traces in the receive configuration. The touch signal can indicate a mutual capacitance between the first and second sets of the row traces. Additionally or alternatively to one or more examples disclosed above, the scan engine can be capable of configuring the circuit to ground one or more row traces between the first set of row traces in the transmit configuration and the second set of row traces in the receive configuration. Additionally or alternatively to one or more examples disclosed above, the scan engine can be capable of configuring the circuit to transmit the stimulation signals to a first set of the column traces in the transmit configuration and to receive the touch signal from a second set of the column traces in the receive configuration. The touch signal can indicate a mutual capacitance between the first and second sets of the column traces. Additionally or alternatively to one or more examples disclosed above, the scan engine can be capable of configuring the circuit to ground one or more column traces between the first set of column traces in the transmit configuration and the second set of column traces in the receive configuration. Additionally or alternatively to one or more examples disclosed above, the scan engine can be capable of configuring the circuit to transmit the stimulation signals to the non-inverting input of sense amplifiers and to receive the touch signal from the row traces in the receive configuration, the row traces in the receive configuration coupled to the inverting input of the sense amplifiers. The touch signal can indicate a self-capacitance between the row traces and an object proximate to the panel. Additionally or alternatively to one or more examples disclosed above, the scan engine can be further capable of configuring the circuit to transmit a guard signal to the column traces in the transmit configuration, the column traces acting as a guard to block interference to the touch signal at the row traces. Additionally or alternatively to one or more examples disclosed above, the scan engine can be capable of configuring the circuit to transmit the stimulation signals to the non-inverting input of sense amplifiers and to receive the touch signal from the column traces in the receive configuration, the column traces in the receive configuration coupled to the inverting input of the sense amplifiers. The touch signal can indicate a self-capacitance between the row traces and an object proximate to the panel. Additionally or alternatively to one or more examples disclosed above, the scan engine can be further capable of configuring the circuit to transmit a guard signal to the row traces in the transmit configuration, the row traces acting as a guard to block interference to the touch signal at the column traces. Additionally or alternatively to one or more examples disclosed above, the object can be a finger or a stylus. Additionally or alternatively to one or more examples disclosed above, the device can further comprise: a display capable of displaying first data and updating to display second data. The scan engine can be capable of receiving a display signal indicating that the display is updating and configuring the circuit to operate on the touch sensor panel during the updating of the display. Additionally or alternatively to one or more examples disclosed above, the circuit can be capable of switching the components to a cancelation configuration, the cancelation configuration being capable of canceling parasitic capacitance from the touch signal. Additionally or alternatively to one or more examples disclosed above, the circuit can comprise two configurable circuits coupled together in a master-slave configuration. Each of the two circuits can be capable of operating in a transmit configuration and a receive configuration. Additionally or alternatively to one or more examples disclosed above, the scan engine can be capable of configuring the circuit to receive a noise signal from the plurality of column traces in the receive configuration and the plurality of row traces in the receive configuration when the circuit is not generating stimulation signals. Additionally or alternatively to one or more examples disclosed above, the noise signal can be demodulated at one or more frequencies. Additionally or alternatively to one or more examples disclosed above, the noise signal can be demodulated using one or more in-phase (I) and quadrature (Q) demodulators. Additionally or alternatively to one or more examples disclosed above, the noise signal can be demodulated using a demodulation window corresponding to stimulation signals generated during a scan event. Additionally or alternatively to one or more examples disclosed above, a noise value can be generated from the demodulated noise signal at the one or more frequencies and one or more low noise frequencies can be determined by selecting the one or more frequencies with the smallest noise value. Additionally or alternatively to one or more examples disclosed above, the device can further comprise wireless communication circuitry capable of transmitting, to a peripheral device, at least one of information about the one or more low noise frequencies, information about the scan plan, or device clock information. Additionally or alternatively to one or more examples disclosed above, the wireless communication circuitry is further capable of receiving force information from the peripheral device. Additionally or alternatively to one or more examples disclosed above, configuring the circuit can include coupling the plurality of row traces and the plurality of column traces to transmit or receive channels. Additionally or alternatively to one or more examples disclosed above, a row trace and a column trace can be paired with a transmit channel and receive channel pair, such that one of the row trace and the column trace can be coupled to a transmit channel of the transmit channel and receive channel pair and the other of the row trace and the column trace can be coupled to a receive channel of the transmit channel and receive channel pair.

Other examples of the disclosure are directed to a method for performing one or more scan events on a touch sensitive device, the method can comprise defining a plurality of scan events; defining a transmit configuration and a receive configuration for each scan event; defining a scan plan that orders and establishes a timing of the plurality of scan events; and performing the plurality of scan events according to the scan plan. Additionally or alternatively to one or more examples disclosed above, the scan engine performs the plurality of scan events at predefined times. Each scan event having associated therewith specific configurations of a transmit section, a receive section, and a memory.

Other examples of the disclosure are directed to a non-transitory computer readable storage medium. The non-transitory computer readable storage medium can have stored therein a scan plan for configuring a touch circuit in a touch sensitive device that when executed by a scan engine can causes the scan engine to: configure a portion of the touch circuit to be a transmit section, the transmit section capable of driving a touch sensor panel to detect a touch or hover event; configure another portion of the touch circuit to be a receive section, the receive section capable of processing the detected touch or hover event; configure a memory having multiple memory locations, the memory capable of storing a touch signal indicative of the processed touch event; and direct a scan sequence at the touch sensitive device according to the scan plan, the scan plan defining the scan sequence. Additionally or alternatively to one or more examples disclosed above, the scan engine can direct the scan sequence including one or more scan events at predefined times. Each scan event can have associated therewith specific configurations of the transmit section, the receive section, and the memory.

Other examples of the disclosure are directed to a touch controller. The touch controller can comprise a configurable transmit section capable of generating one or more stimulation signals having one or more phases and one or more frequencies to drive a touch sensor panel; a configurable receive section capable of receiving and processing one or more touch signals; and a programmable scan engine capable of configuring at least one of the transmit section or the receive section according to a scan plan. The scan plan can define a sequence of scan events to be performed at the touch sensor panel. Each scan event can define at least one of first settings for first components of the transmit section or second settings for second components of the receive section. Additionally or alternatively to one or more examples disclosed above, the controller can further comprise a configurable memory capable of storing the one or more touch signals. The programmable scan engine can be capable of configuring the memory according to the scan plan and a scan event can define storage allocations in the memory. Additionally or alternatively to one or more examples disclosed above, the transmit section can comprise one or more oscillators capable of generating the stimulation signals at one or more frequencies, one or more digital-to-analog converters (DACs) coupled to the oscillators and capable of generating the stimulation signals at one or more phases; and one or more channels coupled to the DAC converters. Each channel can include a first multiplexer capable of selecting one of the stimulation signals having one of the phases and one of the frequencies. The scan engine can also be capable of configuring the first settings for the oscillators, the DAC converters, and the first multiplexers of the one or more channels. Additionally or alternatively to one or more examples disclosed above, the transmit section can further comprise: a second multiplexer capable of routing the selected stimulation signal outputted from the first multiplexer to a row or column trace of the touch sensor panel. The scan engine can be capable of configuring the first settings for the second multiplexers of the one or more channels. Additionally or alternatively to one or more examples disclosed above, the second multiplexer can be capable of coupling the row or column trace of the touch sensor panel to at least one of the selected stimulation signal outputted from the first multiplexer, the receive section, or ground. Additionally or alternatively to one or more examples disclosed above, the receive section can comprises: one or more channels coupled to the touch sensor panel. Each channel can include a sense amplifier capable of receiving at least one touch signal from the touch sensor panel; and one or more demodulators capable of demodulating the at least one touch signal to output at least one of an in-phase (I) component, a quadrature (Q) component, or an in-phase-quadrature (IQ) component. The scan engine can be capable of configuring the second settings for the sense amplifiers and the demodulators of the channels. Additionally or alternatively to one or more examples disclosed above, each demodulator can be capable of demodulating the at least one touch signal at a phase and frequency of interest corresponding to the phase and frequency of at least one stimulation signal or at least one stylus stimulation signal. Additionally or alternatively to one or more examples disclosed above, the memory can comprise: a pointer bank including one or more pointers. Each pointer can be capable of pointing to locations allocated in the memory to store the touch signal. The scan engine can be capable of configuring the pointer bank and the locations allocated in the memory. Additionally or alternatively to one or more examples disclosed above, the one or more touch signals can include at least one of a mutual capacitance signal or a self-capacitance signal. Additionally or alternatively to one or more examples disclosed above, the scan events can include at least one of a mutual capacitance scan, a self-capacitance scan, or a stylus scan. Additionally or alternatively to one or more examples disclosed above, the scan engine can be capable of executing the scan plan so as to cause the sequence of scan events to be performed at the configurations for the scan events. Additionally or alternatively to one or more examples disclosed above, the scan engine can be capable of dynamically changing the scan plan during execution. Additionally or alternatively to one or more examples disclosed above, the scan events can include at least one mutual capacitance scan. The scan engine can be capable of configuring the transmit section to stimulate a plurality of row traces and configuring the receive section to receive touch signals from a plurality of column traces. The touch signals can be indicative of a mutual capacitance between the row and column traces. Additionally or alternatively to one or more examples disclosed above, the scan engine can be capable of configuring the transmit section to stimulate the plurality of column traces and configuring the receive section to receive touch signals from the plurality of row traces. The touch signals can be indicative of a mutual capacitance between the row and column traces. Additionally or alternatively to one or more examples disclosed above, the scan engine can be capable of configuring the transmit section to stimulate a first set of the plurality of row traces and configuring the receive section to receive touch signals from a second set of the plurality of row traces. The touch signals can be indicative of a mutual capacitance between row traces in the first and second sets of the row traces. Additionally or alternatively to one or more examples disclosed above, the scan engine can be capable of configuring the transmit section to stimulate a first set of the plurality of column traces and configuring the receive section to receive touch signals from a second set of the plurality of column traces. The touch signals indicative of a mutual capacitance between column traces in the first and second sets of the column traces. Additionally or alternatively to one or more examples disclosed above, the scan events can include at least one self-capacitance scan. The scan engine can be capable of configuring the transmit section to stimulate a non-inverting input of sense amplifiers in the receive section and configuring the receive section to receive touch signals from a plurality of row traces, the plurality of row traces coupled to the inverting input of the sense amplifiers. The touch signal can be indicating a self-capacitance between the row traces and an object proximate to the panel. Additionally or alternatively to one or more examples disclosed above, the scan engine can be capable of configuring the transmit section to stimulate a non-inverting input of sense amplifiers in the receive section and configuring the receive section to receive touch signals from a plurality of column traces, the plurality of column traces coupled to the inverting input of the sense amplifiers. The touch signal can be indicating a self-capacitance between the column traces and the object proximate to the panel. Additionally or alternatively to one or more examples disclosed above, the scan engine can further be capable of configuring the transmit section to apply a guard signal to unused row or column traces to block interference with the touch signals. Additionally or alternatively to one or more examples disclosed above, the scan events can include at least one of a touch spectral analysis scan, a stylus spectral analysis scan or a stylus scan. The scan engine can be capable of configuring the receive section to receive touch signals from one or more of row and column traces when the controller is not generating any stimulation signals. Additionally or alternatively to one or more examples disclosed above, the configurable transmit and receive sections can be implemented in a master-slave configuration, such that a first portion of the configurable transmit section and a first portion of the configurable receive section can be implemented in a master touch controller, and a second portion of the configurable transmit section and a second portion of the configurable receive section can be implemented in a slave touch controller. Additionally or alternatively to one or more examples disclosed above, the transmit section can be capable of driving a first portion of the touch sensor panel with first stimulation signals having a first frequency and simultaneously driving a second portion of the touch sensor panel with second stimulation signals having a second frequency.

Other examples of the disclosure are directed to a non-transitory computer readable storage medium. The non-transitory computer readable storage medium can have stored thereon a scan plan for configuring a touch controller in a touch sensitive device that when executed by a scan engine can cause the scan engine to: configure a portion of the touch controller to be a transmit section, the transmit section capable of driving a touch sensor panel to detect a touch or hover event; configure another portion of the touch controller to be a receive section, the receive section capable of processing the detected touch or hover event; and direct a scan sequence at the touch sensitive device according to the scan plan, the scan plan defining the scan sequence.

The non-transitory computer readable storage medium, wherein the scan engine directs the scan sequence including one or more scan events at predefined times, each scan event having associated therewith specific configurations of the transmit section and the receive section. Additionally or alternatively to one or more examples disclosed above, the scan engine can be capable of dynamically changing the scan sequence. Additionally or alternatively to one or more examples disclosed above, the transmit section can be capable of driving a first portion of the touch sensor panel with first stimulation signals having a first frequency and simultaneously driving a second portion of the touch sensor panel with second stimulation signals having a second frequency.

Other examples of the disclosure are directed to a method for configuring a touch controller in a touch sensitive device. The method can comprise: configuring portions of the touch controller to be a transmit section or a receive section. The transmit section can be capable of driving a touch sensor panel to detect a touch or hover event and the receive section can be capable of processing the detected touch or hover event. The method can also comprise, performing the one or more scan events according to a scan plan. The scan plan can define the scan sequence. Each scan event can define a transmit configuration and a receive configuration for that particular scan event. Additionally or alternatively to one or more examples disclosed above, the scan engine can perform the one or more scan events at predefined times. Each scan event can have associated therewith specific configurations of the transmit section and the receive section. Additionally or alternatively to one or more examples disclosed above, the scan engine can be capable of dynamically changing the scan sequence. Additionally or alternatively to one or more examples disclosed above, the transmit section can be capable of driving a first portion of the touch sensor panel with first stimulation signals having a first frequency and simultaneously driving a second portion of the touch sensor panel with second stimulation signals having a second frequency.

Other examples of the disclosure are directed to an active stylus. The active stylus can comprise one or more electrodes at a distal end of the stylus; control circuitry coupled to the one or more electrodes capable of generating one or more stimulation signals; and wireless communication circuitry coupled to the control circuitry capable of receiving information from a peripheral device. Additionally or alternatively to one or more examples disclosed above, the control circuitry can be capable of generating the one or more stimulation signals at a first frequency and at a second frequency. Additionally or alternatively to one or more examples disclosed above, the signals generated at the first frequency and the second frequency can generated simultaneously. Additionally or alternatively to one or more examples disclosed above, the received information can include one or more stimulation frequencies. Additionally or alternatively to one or more examples disclosed above, the received information can include clock information. Additionally or alternatively to one or more examples disclosed above, the received information can include information about one or more scan events. Additionally or alternatively to one or more examples disclosed above, the stylus can further comprise a force sensor at the tip of the stylus configured to detect an amount of force at the tip of the stylus. Additionally or alternatively to one or more examples disclosed above, the wireless communication circuitry can be capable of transmitting the amount of force to the peripheral device. Additionally or alternatively to one or more examples disclosed above, the one or more stimulation signals can be generated only during a stylus scan event. Additionally or alternatively to one or more examples disclosed above, the stylus can further comprise an internal clock coupled to at least one of the control circuitry or wireless communication circuitry. The internal clock can be capable of being synchronized with the peripheral device based the received clock information. Additionally or alternatively to one or more examples disclosed above, the wireless communication circuitry can be capable of being synchronized with the peripheral device such that the wireless communication circuitry can transmit or receive information at predetermined times. Additionally or alternatively to one or more examples disclosed above, the one or more stimulation frequencies can correspond to one or more low noise frequencies determined at the peripheral device.

Other examples of the disclosure are directed to a method for operating an active stylus capable of stimulating a touch sensitive device. The method can comprise: receiving information from the touch sensitive device via wireless communication circuitry in the stylus; generating, at control circuitry in the stylus, one or more stimulation signals based on the received information; and applying the one or more stimulation signals to one or more electrodes at a distal end of the stylus. Additionally or alternatively to one or more examples disclosed above, the one or more stimulation signals can include signals at a first frequency and at a second frequency. Additionally or alternatively to one or more examples disclosed above, the one or more stimulation signals at the first frequency and the second frequency can be generated simultaneously. Additionally or alternatively to one or more examples disclosed above, the received information can include one or more stimulation frequencies. Additionally or alternatively to one or more examples disclosed above, the received information can include clock information. Additionally or alternatively to one or more examples disclosed above, the received information can include information about one or more scan events. Additionally or alternatively to one or more examples disclosed above, the method can also comprise detecting, via a force sensor, an amount of force at the tip of the stylus. Additionally or alternatively to one or more examples disclosed above, the method can also comprise transmitting, via the wireless communication circuitry, the amount of force to the peripheral device. Additionally or alternatively to one or more examples disclosed above, the one or more stimulation signals can be generated only during a stylus scan event. Additionally or alternatively to one or more examples disclosed above, the method can also comprise, synchronizing a clock within the stylus based on the received clock information. Additionally or alternatively to one or more examples disclosed above, the wireless communication circuitry can be synchronized so as to transmit and receive information at predetermined times. Additionally or alternatively to one or more examples disclosed above, the one or more stimulation frequencies can correspond to one or more low noise frequencies determined at the touch sensitive device.

Other examples of the disclosure are directed to a non-transitory computer readable storage medium. The non-transitory computer readable storage medium can have stored therein instructions, which when executed by an active stylus capable of stimulating a touch sensitive device, can cause the stylus to perform a method. The method can comprise: receiving information from the touch sensitive device via wireless communication circuitry in the stylus; generating, at control circuitry in the stylus, one or more stimulation signals based on the received information; and applying the one or more stimulation signals to one or more electrodes at a distal end of the stylus.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:
1. A touch controller comprising:
drive circuitry configurable to generate stimulation signals to drive a touch sensor panel; and
sense circuitry configurable to sense the touch sensor panel;
wherein:
the drive circuitry and the sense circuitry are configured according to a scan plan defining a sequence of scan events including a first scan event and a second scan event to be performed at least partially concurrently at the touch sensor panel;
for the first scan event, the drive circuitry is configured to generate first stimulation signals at one or more first stimulation frequencies to drive the touch sensor panel and the sense circuitry is configured to sense the touch sensor panel to sense an object touching or in proximity to the touch sensor panel using the first stimulation signals; and for the second scan event, the sense circuitry is further configured to sense the touch sensor panel for stylus spectral analysis.

2. The touch controller of claim 1, wherein the scan plan further includes a third scan event to be performed at the touch sensor panel; and wherein for the third scan event, the sense circuitry is configured to sense the touch sensor panel to sense a stylus touching or in proximity to the touch sensor panel using second stimulation signals generated by the stylus at one or more second stimulation frequencies.

3. The touch controller of claim 2, wherein for the third scan event, the second stimulation signals are generated by the stylus at the one or more second stimulation frequencies without the drive circuitry generating the first stimulation signals at the one or more first stimulation frequencies.

4. The touch controller of claim 2, wherein the scan plan further including a fourth scan event to be performed at the touch sensor panel at least partially concurrently with the third scan event, the fourth scan event including a touch spectral analysis scan.

5. The touch controller of claim 1, wherein the sense circuitry comprises a plurality of sense channels, each of the plurality of sense channels including:

a sense amplifier configured to receive one or more signals sensed from the touch sensor panel; and a plurality of demodulators configured to demodulate the one or more sensed signals to output an in-phase (I) component, a quadrature (Q) component, or the I component and the Q component.

6. The touch controller of claim 5, wherein one of the plurality of demodulators is configured to demodulate sensed signals, from the first scan event and the second scan event performed at least partially concurrently, at a phase and a frequency corresponding to one of the first stimulation signals.

7. The touch controller of claim 6, wherein a second of the plurality of demodulators is configured to demodulate the sensed signals, from the first scan event and the second scan event performed at least partially concurrently, at a second phase and a second frequency corresponding to second stimulation signals for a stylus different from the first stimulation signals.

8. The touch controller of claim 7, wherein a third of the plurality of demodulators is configured to demodulate sensed signals, from the first scan event and the second scan event performed at least partially concurrently, at a third phase and a third frequency corresponding to the second stimulation signals for the stylus different from the first stimulation signals.

9. The touch controller of claim 5, wherein each of the plurality of sense channels includes:

a filter; and an analog-to-digital converter.

10. The touch controller of claim 7, wherein each of the plurality of sense channels includes:

a plurality of delay compensation logic circuits, each of the plurality of delay compensation logic circuits coupled to an input of one of the plurality of demodulators.

11. The touch controller of claim 5, wherein each of the plurality of sense channels includes:

a plurality of accumulators, each of the plurality of accumulators coupled to an output of one of the plurality of demodulators.

12. The touch controller of claim 1, wherein generating the first stimulation signals at the one or more first stimulation frequencies to drive the touch sensor panel comprises generating the first stimulation signals concurrently at two different frequencies of the one or more first stimulation frequencies and wherein the drive circuitry is further configured to drive a first plurality of electrodes of the touch sensor panel with the first stimulation signals at one frequency of the one or more first stimulation frequencies and drive a second plurality of electrodes of the touch sensor panel, different from the first plurality of electrodes, with the first stimulation signals at a second, different frequency of the one or more first stimulation frequencies.

13. The touch controller of claim 1, wherein the drive circuitry comprises:

one or more oscillators configured to generate signals at the one or more first stimulation frequencies;

one or more digital-to-analog converters (DACs) coupled to the one or more oscillators and configured to generate the first stimulation signals at one or more phases using the signals generated by the one or more oscillators; and one or more drive channels coupled to the one or more DACs, each of the one or more drive channels including a first multiplexer configured to select one of the first stimulation signals having one of the one or more phases and one of the one or more first stimulation frequencies and outputting the selected one of the first stimulation signals.

14. The touch controller of claim 1, wherein:

the scan plan further includes a third scan event corresponding to a self-capacitance guard scan; and for the third scan event, the drive circuitry is configured to drive a first plurality of electrodes of the touch sensor panel with the first stimulation signals and concurrently drive a second plurality of electrodes of the touch sensor panel, different from the first plurality of electrodes, with a guard signal.

15. A method comprising:

configuring drive circuitry according to a scan plan defining a sequence of scan events; and configuring sense circuitry according to the scan plan defining the sequence of scan events;

wherein:

the sequence of scan events including a first scan event and a second scan event to be performed at least partially concurrently at a touch sensor panel;

for the first scan event, the drive circuitry is configured to generate first stimulation signals at one or more first stimulation frequencies to drive the touch sensor panel and the sense circuitry is configured to sense the touch sensor panel to sense an object touching or in proximity to the touch sensor panel using the first stimulation signals; and for the second scan event, the sense circuitry is further configured to sense the touch sensor panel for stylus spectral analysis.

16. The method of claim 15, wherein the scan plan further includes a third scan event to be performed at the touch sensor panel; and Wherein for the third scan event, the sense circuitry is configured to sense the touch sensor panel to sense a stylus touching or in proximity to the touch sensor panel using second stimulation signals generated by the stylus at one or more second stimulation frequencies.

17. The method of claim 16, wherein for the third scan event the second stimulation signals are generated by the stylus at the one or more second stimulation frequencies without the drive circuitry generating the first stimulation signals at the one or more first stimulation frequencies.

18. The method of claim 16, wherein the scan plan further including a fourth scan event to be performed at the touch sensor panel at least partially concurrently with the third scan event, the fourth scan event including a touch spectral analysis scan.

19. The method of claim 16, wherein generating the first stimulation signals at the one or more first stimulation frequencies to drive the touch sensor panel comprises generating the first stimulation signals concurrently at two different frequencies of the one or more first stimulation frequencies and wherein the drive circuitry is further configured to drive a first plurality of electrodes of the touch sensor panel with the first stimulation signals at one frequency of the one or more first stimulation frequencies and drive a second plurality of electrodes of the touch sensor panel, different from the first plurality of electrodes, with the first stimulation signals at a second, different frequency of the one or more first stimulation frequencies.

20. The method of claim 16, wherein:
the third scan event corresponds to a self-capacitance guard scan; and
for the third scan event, the drive circuitry is configured to drive a first plurality of electrodes of the touch sensor panel with the first stimulation signals and concurrently drive a second plurality of electrodes of the touch sensor panel, different from the first plurality of electrodes, with a guard signal.

\* \* \* \* \*